US011815729B2

(12) United States Patent
Lee et al.

(10) Patent No.: US 11,815,729 B2
(45) Date of Patent: Nov. 14, 2023

(54) SYSTEM AND METHOD FOR INTERFERENCE FRINGE STABILIZATION

(71) Applicant: Meta Platforms Technologies, LLC, Menlo Park, CA (US)

(72) Inventors: Yun-Han Lee, Redmond, WA (US); Stephen Choi, Seattle, WA (US); Mengfei Wang, Kirkland, WA (US); Junren Wang, Kirkland, WA (US); Lu Lu, Kirkland, WA (US); Kyle Justin Curts, Carnation, WA (US)

(73) Assignee: META PLATFORMS TECHNOLOGIES, LLC, Menlo Park, CA (US)

( * ) Notice: Subject to any disclaimer, the term of this patent is extended or adjusted under 35 U.S.C. 154(b) by 99 days.

(21) Appl. No.: 17/229,852

(22) Filed: Apr. 13, 2021

(65) Prior Publication Data

US 2022/0326468 A1    Oct. 13, 2022

(51) Int. Cl.
*G03H 1/26*      (2006.01)
*G02B 7/00*      (2021.01)
*G02B 5/32*      (2006.01)
*G02B 5/18*      (2006.01)
*G03H 1/02*      (2006.01)
*G02B 27/28*     (2006.01)
*G02B 27/42*     (2006.01)

(52) U.S. Cl.
CPC ............ *G02B 7/003* (2013.01); *G02B 5/1823* (2013.01); *G02B 5/32* (2013.01); *G02B 27/286* (2013.01); *G02B 27/4233* (2013.01); *G03H 1/0248* (2013.01); *G02B 2005/1804* (2013.01)

(58) Field of Classification Search
CPC ........ G02B 7/003; G02B 5/1823; G02B 5/32; G02B 27/286; G02B 27/4233; G02B 5/1866; G02B 2005/1804; G03H 1/0248; G03H 1/0043; G02F 1/1347
USPC ...................... 349/96, 201, 202; 359/483, 22
See application file for complete search history.

(56) References Cited

U.S. PATENT DOCUMENTS

| 5,151,799 A * | 9/1992 | Ansley ..................... G02B 5/32 359/30 |
| 9,715,048 B2 * | 7/2017 | Tabirian ............... G02B 5/1866 |
| 2006/0146342 A1 * | 7/2006 | Doerband .......... G01B 9/02057 356/512 |

(Continued)

OTHER PUBLICATIONS

Oh, C., et al., "A new beam steering concept: Risley gratings," Proceedings of SPIE, vol. 7466, Advanced Wavefront Control: Methods, Devices, and Applications VII, pp. 74660J-1 to 74660J-8, Aug. 11, 2009 (8 pages).

(Continued)

*Primary Examiner* — Audrey Y Chang
(74) *Attorney, Agent, or Firm* — MILLBURN IP PLLC

(57) ABSTRACT

A system includes a diffractive optical element configured to receive a first beam and a second beam interfering with one another to generate a first interference pattern. The diffractive optical element is also configured to forwardly diffract the first beam and the second beam to output a third beam and a fourth beam. The third beam and the fourth beam interfere with one another to generate a second interference pattern. The system also includes a detector configured to detect the second interference pattern.

18 Claims, 20 Drawing Sheets

(56) References Cited

U.S. PATENT DOCUMENTS

2012/0188467 A1\* 7/2012 Escuti .................. G02F 1/1347
                                                      349/1
2020/0249626 A1\* 8/2020 Bouchal ............... G03H 1/0443

OTHER PUBLICATIONS

Schwarze, C., "A new look at Risley prisms," Photonics Spectra, Jun. 2006, available online at URL: https://www.photonics.com/Articles/A_New_Look_at_Risley_Prisms/a25652, retrieved on Apr. 12, 2021 (5 pages).

\* cited by examiner

900

Guiding a first beam and a second beam to a diffractive optical element, the first beam and the second beam interfering with one another to generate a first interference pattern — 910

Forwardly diffracting, by the diffractive optical element, the first beam and the second beam to output a third beam and a fourth beam at least partially overlapping with one another, wherein the third beam and the fourth beam interfere with one another to generate a second interference pattern — 920

Detecting, by a detector, the second interference pattern — 930

SYSTEM AND METHOD FOR INTERFERENCE FRINGE STABILIZATION

TECHNICAL FIELD

The present disclosure generally relates to systems and methods and, more specifically, to an interference system having a fringe stabilization mechanism.

BACKGROUND

Interference systems have been widely used for interference recording of holograms. An interference system may be an intensity interference system, which generates an intensity interference pattern having a plurality of interference fringes of varying intensities. An interference system may also be a polarization interference system, which generates a polarization interference pattern having a substantially uniform intensity and spatially varying orientations (or polarization directions) of linear polarizations. Polarization interference systems may be used for fabricating various liquid crystal polarization holograms ("LCPHs").

Interference recording of holograms may be sensitive to a change in the interference pattern due to, e.g., vibration from the environment in which the interference system is located. A slight vibration of the interference fringes or the orientations of linear polarizations may be recorded as noise, degrading the quality of a recorded hologram. In conventional technologies, an active fringe stabilizer is used to stabilize the interference pattern. The active fringe stabilizer includes a piezo-driven mirror (e.g., a bimorph mirror) disposed in one of two interference arms, a beam splitter, a detector, and a controller. Two recording beams interference with one another to generate an interference pattern, which is recorded in a sample (e.g., a recording medium layer). An angle between the two recording beams is relatively large when recording fine interference fringes (with a small period) in the sample. The beam splitter is disposed after the sample to combine the two recording beams transmitted through the sample to have a relatively small angle therebetween, generating coarse interference fringes (with a large period) for detection. The detector measures the vibration of the coarse interference fringes, and generates a signal based on the measurement. The controller receives the signal from the detector, and controls the piezo-driven mirror to compensate for the vibration of fringes.

SUMMARY OF THE DISCLOSURE

Consistent with a disclosed embodiment of the present disclosure, a system is provided. The system includes a diffractive optical element configured to receive a first beam and a second beam interfering with one another to generate a first interference pattern. The diffractive optical element is also configured to forwardly diffract the first beam and the second beam to output a third beam and a fourth beam. The third beam and the fourth beam interfere with one another to generate a second interference pattern. The system also includes a detector configured to detect the second interference pattern.

Consistent with another aspect of the present disclosure, a method is provided. The method includes guiding a first beam and a second beam to a diffractive optical element, the first beam and the second beam interfering with one another to generate a first interference pattern. The method also includes forwardly diffracting, by the diffractive optical element, the first beam and the second beam to output a third beam and a fourth beam. The third beam and the fourth beam interfere with one another to generate a second interference pattern. The method further includes detecting, by a detector, the second interference pattern.

Other aspects of the present disclosure can be understood by those skilled in the art in light of the description, the claims, and the drawings of the present disclosure. The foregoing general description and the following detailed description are exemplary and explanatory only and are not restrictive of the claims.

BRIEF DESCRIPTION OF THE DRAWINGS

The following drawings are provided for illustrative purposes according to various disclosed embodiments and are not intended to limit the scope of the present disclosure. In the drawings:

FIG. 9 illustrates a flowchart showing a method for stabilizing an interference pattern, according to an embodiment of the present disclosure.

DETAILED DESCRIPTION

Figure 1:
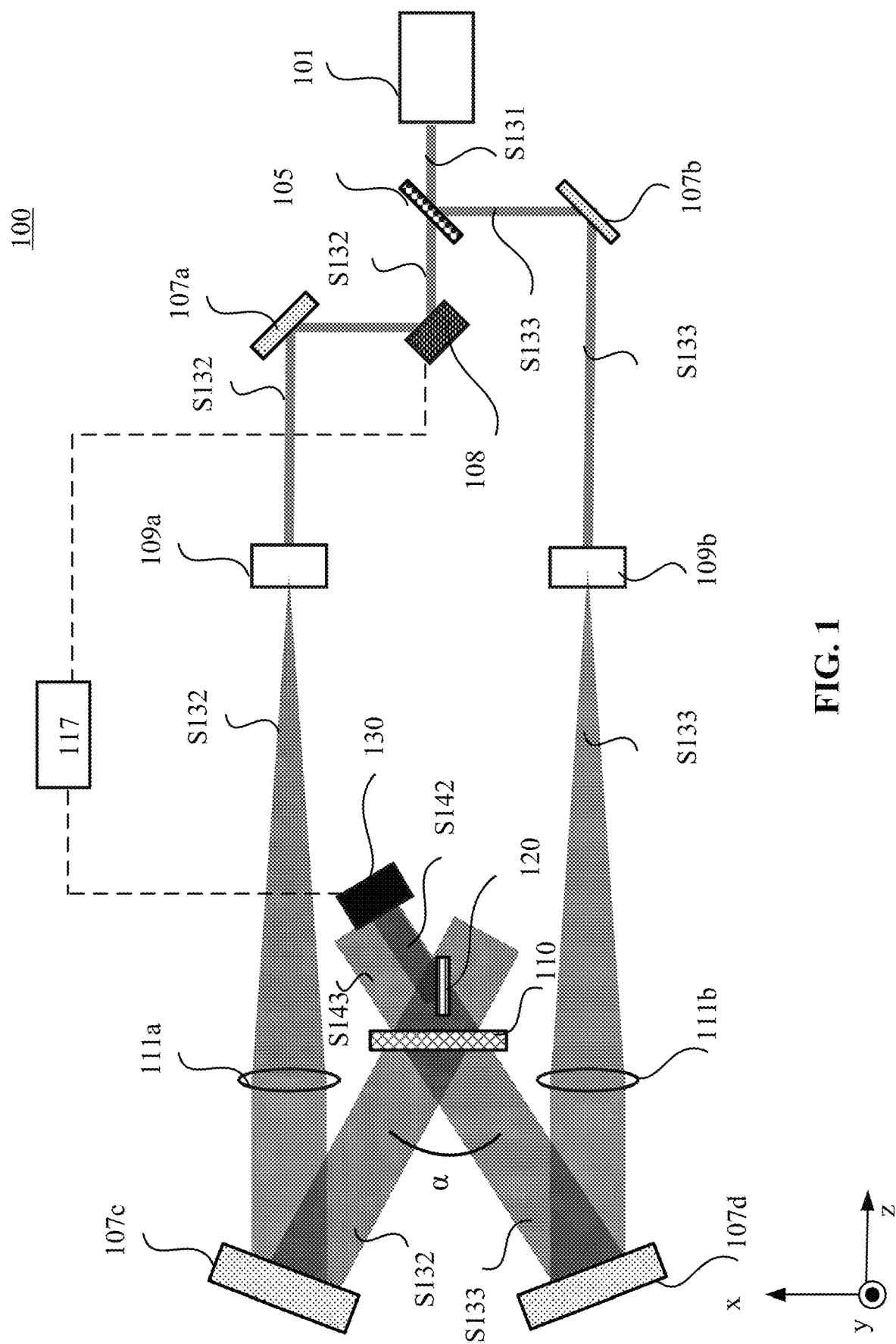
FIG. 1 schematically illustrates a conventional interference system having a fringe stabilization mechanism.

Embodiments consistent with the present disclosure will be described with reference to the accompanying drawings, which are merely examples for illustrative purposes and are not intended to limit the scope of the present disclosure. Wherever possible, the same reference numbers are used throughout the drawings to refer to the same or similar parts, and a detailed description thereof may be omitted.

Further, in the present disclosure, the disclosed embodiments and the features of the disclosed embodiments may be combined. The described embodiments are some but not all of the embodiments of the present disclosure. Based on the disclosed embodiments, persons of ordinary skill in the art may derive other embodiments consistent with the present disclosure. For example, modifications, adaptations, substitutions, additions, or other variations may be made based on the disclosed embodiments. Such variations of the disclosed embodiments are still within the scope of the present disclosure. Accordingly, the present disclosure is not limited to the disclosed embodiments. Instead, the scope of the present disclosure is defined by the appended claims.

As used herein, the terms "couple," "coupled," "coupling," or the like may encompass an optical coupling, a mechanical coupling, an electrical coupling, an electromagnetic coupling, or any combination thereof. An "optical coupling" between two optical elements refers to a configuration in which the two optical elements are arranged in an optical series, and a light output from one optical element may be directly or indirectly received by the other optical element. An optical series refers to optical positioning of a plurality of optical elements in a light path, such that a light output from one optical element may be transmitted, reflected, diffracted, converted, modified, or otherwise processed or manipulated by one or more of other optical elements. In some embodiments, the sequence in which the plurality of optical elements are arranged may or may not affect an overall output of the plurality of optical elements. A coupling may be a direct coupling or an indirect coupling (e.g., coupling through an intermediate element).

The phrase "at least one of A or B" may encompass all combinations of A and B, such as A only, B only, or A and B. Likewise, the phrase "at least one of A, B, or C" may encompass all combinations of A, B, and C, such as A only, B only, C only, A and B, A and C, B and C, or A and B and C. The phrase "A and/or B" may be interpreted in a manner similar to that of the phrase "at least one of A or B." For example, the phrase "A and/or B" may encompass all combinations of A and B, such as A only, B only, or A and B. Likewise, the phrase "A, B, and/or C" has a meaning similar to that of the phrase "at least one of A, B, or C." For example, the phrase "A, B, and/or C" may encompass all combinations of A, B, and C, such as A only, B only, C only, A and B, A and C, B and C, or A and B and C.

When a first element is described as "attached," "provided," "formed," "affixed," "mounted," "secured," "connected," "bonded," "recorded," or "disposed," to, on, at, or at least partially in a second element, the first element may be "attached," "provided," "formed," "affixed," "mounted," "secured," "connected," "bonded," "recorded," or "disposed," to, on, at, or at least partially in the second element using any suitable mechanical or non-mechanical manner, such as depositing, coating, etching, bonding, gluing, screwing, press-fitting, snap-fitting, clamping, etc. In addition, the first element may be in direct contact with the second element, or there may be an intermediate element between the first element and the second element. The first element may be disposed at any suitable side of the second element, such as left, right, front, back, top, or bottom.

When the first element is shown or described as being disposed or arranged "on" the second element, term "on" is merely used to indicate an example relative orientation between the first element and the second element. The description may be based on a reference coordinate system shown in a figure, or may be based on a current view or example configuration shown in a figure. For example, when a view shown in a figure is described, the first element may be described as being disposed "on" the second element. It is understood that the term "on" may not necessarily imply that the first element is over the second element in the vertical, gravitational direction. For example, when the assembly of the first element and the second element is turned 180 degrees, the first element may be "under" the second element (or the second element may be "on" the first element). Thus, it is understood that when a figure shows that the first element is "on" the second element, the configuration is merely an illustrative example. The first element may be disposed or arranged at any suitable orientation relative to the second element (e.g., over or above the second element, below or under the second element, left to the second element, right to the second element, behind the second element, in front of the second element, etc.).

When the first element is described as being disposed "on" the second element, the first element may be directly or indirectly disposed on the second element. The first element being directly disposed on the second element indicates that no additional element is disposed between the first element and the second element. The first element being indirectly disposed on the second element indicates that one or more additional elements are disposed between the first element and the second element.

The term "processor" used herein may encompass any suitable processor, such as a central processing unit ("CPU"), a graphics processing unit ("GPU"), an application-specific integrated circuit ("ASIC"), a programmable logic device ("PLD"), or any combination thereof. Other processors not listed above may also be used. A processor may be implemented as software, hardware, firmware, or any combination thereof.

The term "controller" may encompass any suitable electrical circuit, software, or processor configured to generate a control signal for controlling a device, a circuit, an optical element, etc. A "controller" may be implemented as software, hardware, firmware, or any combination thereof. For example, a controller may include a processor, or may be included as a part of a processor.

The term "non-transitory computer-readable medium" may encompass any suitable medium for storing, transferring, communicating, broadcasting, or transmitting data, signal, or information. For example, the non-transitory computer-readable medium may include a memory, a hard disk, a magnetic disk, an optical disk, a tape, etc. The memory may include a read-only memory ("ROM"), a random-access memory ("RAM"), a flash memory, etc.

The term "film," "layer," "coating," or "plate" may include rigid or flexible, self-supporting or free-standing film, layer, coating, or plate, which may be disposed on a supporting substrate or between substrates. The terms "film," "layer," "coating," and "plate" may be interchangeable.

The phrases "in-plane direction," "in-plane orientation," "in-plane rotation," "in-plane alignment pattern," and "in-plane pitch" refer to a direction, an orientation, a rotation, an alignment pattern, and a pitch in a plane of a film or a layer (e.g., a surface plane of the film or layer, or a plane parallel to the surface plane of the film or layer), respectively. The term "out-of-plane direction" or "out-of-plane orientation" indicates a direction or orientation that is non-parallel to the plane of the film or layer (e.g., perpendicular to the surface plane of the film or layer, e.g., perpendicular to a plane parallel to the surface plane). For example, when an "in-plane" direction or orientation refers to a direction or orientation within a surface plane, an "out-of-plane" direction or orientation may refer to a thickness direction or orientation perpendicular to the surface plane, or a direction or orientation that is not parallel with the surface plane.

The term "orthogonal" as used in "orthogonal polarizations" or the term "orthogonally" as used in "orthogonally polarized" means that an inner product of two vectors representing the two polarizations is substantially zero. For example, two lights (or beams) with orthogonal polarizations or two orthogonally polarized lights may be two linearly polarized lights with two orthogonal polarization directions (e.g., an x-axis direction and a y-axis direction in a Cartesian coordinate system) or two circularly polarized lights with opposite handednesses (e.g., a left-handed circularly polarized light and a right-handed circularly polarized light).

In the present disclosure, an angle of a beam (e.g., a diffraction angle of a diffracted beam or an incidence angle of an incident beam) with respect to a normal of a surface can be defined as a positive angle or a negative angle, depending on the angular relationship between a propagating direction of the beam and the normal of the surface. For example, when the propagating direction of the beam is clockwise from the normal, the angle of the propagating direction may be defined as a positive angle, and when the propagating direction of the beam is counter-clockwise from the normal, the angle of the propagating direction may be defined as a negative angle.

FIG. 1 schematically illustrates an x-z sectional view of a conventional interference system 100. The system 100 may be configured for generating a holographic two-beam-interference exposure on a recording medium 110. The recording medium 110 may be disposed on a substrate (not shown). As shown in FIG. 1, the system 100 may include a light source 101 configured to emit a beam S131 having a wavelength range within an absorption band of the recording medium 110. The system 100 may include a plurality of optical elements configured to split the beam S131 into a first beam S132 propagating in a first path (or arm) and a second beam S133 propagating in a second path (or arm). The plurality of optical elements may guide the first beam S132 and the second beam S133 to a beam interference zone to interfere with one another in space. For example, the plurality of optical elements may include a beam splitter 105, a plurality of mirrors 107a, 107b, 107c, 107d, and 108, and a plurality of lenses 109a, 109b, 111a, and 111b. The system 100 may also include other optical elements not shown in FIG. 1, e.g., polarizers, waveplates, etc. The first beam S132 and the second beam S133 may be referred to as two recording beams. The interference of the two recording beams S132 and S133 in the spatial beam interference zone may generate an interference pattern (also referred to as a recording interference pattern). The interference pattern may include at least one of an intensity interference pattern having a plurality of interference fringes of varying intensities, or a polarization interference pattern having a substantially uniform intensity and spatially varying orientations (or polarization directions) of linear polarizations. The recording medium 110 may be disposed within the beam interference zone, and may be exposed to the interference pattern. The interference pattern may be recorded in the recording medium 110.

The system 100 may also include a fringe stabilization mechanism configured to stabilize the interference pattern (e.g., to mitigate or suppress changes of the interference pattern due to a vibration from the environment and/or a vibration from the light source 101). The fringe stabilization mechanism may include a piezo-driven mirror (e.g., a bimorph mirror) disposed in one of two interference arms, which may be configured to compensate for the vibration (or change) of the interference pattern. In FIG. 1, the piezo-driven mirror may be the mirror 108 disposed in the first arm. The fringe stabilization mechanism may also include a beam splitter 120, a detector 130, and a controller 117. The recording medium 110 may have a first side and a second side opposite to the first side. The recording beams S132 and S133 may be incident onto the recording medium 110 from the first side, and may exit the recording medium 110 from the second side. The beam splitter 120 and the detector 130 may be disposed at the second side of the recording medium 110.

An angle α between the two recording beams S132 and S133 may be relatively large for generating and recording fine interference fringes (with a small period or pitch, e.g., smaller than 500 nm) in the recording medium 110. The period or pitch of the interference fringes recorded in the recording medium 110 may be referred to as a recording periodicity (or pitch). The beam splitter 120 may be disposed at the second side of the recording medium 110 where the recording beams S132 and S133 exits the recording medium 110. The beam splitter 120 may be configured to combine the two recording beams S132 and S133 transmitted through the recording medium 110, such that the beams S132 and S133 have a relatively small angle therebetween, thereby generating coarse interference fringes (with a large period or pitch, e.g., greater than 2 μm) for detection by the detector 130. For example, the beam splitter 120 may partially reflect the recording beam S132 transmitted through the recording medium 110 as a beam S142, and partially transmit the recording beam S133 transmitted through the recording medium 110 as a beam S143. The angle (not shown) between the beam S142 and the beam S143 may be relatively small, compared to the angle α between the two recording beams S132 and S133 incident onto the first side of the recording medium 110. Thus, the beam S142 and the beam S143 interference with one another to generate coarse interference fringes (with a large period or pitch, e.g., greater than 2 μm) for detection by the detector 130. The period or pitch of the interference fringes that are detected by the detector 130 may be referred to as a detecting periodicity. The detector 130 may be oriented to receive the coarse interference fringes generated by the beam S142 and the beam S143. The detector 130 may measure the vibration of the coarse interference fringes, and generate a signal based on the measurement. The controller 117 may be communicatively coupled with the detector 130 and the piezo-driven mirror 108. The controller 117 may receive the signal from the detector 130, and control an operation of the piezo-driven mirror 108 to compensate for the vibration of interference pattern. For example, the controller 117 may control a deformation of the piezo-driven mirror 108 to adjust a wavefront of the first beam S132 while reflecting the first beam S132, thereby stabilizing the interference pattern generated by the two recording beams S132 and S133.

In the conventional interference system 100, the beam splitter 120 and the detector 130 occupy a large space, resulting in a large form factor. In addition, an adjustment range of the angle α between the two recording beams S132 and S133 (referred to as a recording angle) is limited by the size of the beam splitter 120. For example, when the angle α is substantially large or small, the beam splitter 120 may not receive the two recording beam S132 and S133 transmitted through the recording medium 110, and may not direct the two recording beam S132 and S133 transmitted through the recording medium 110 as the beam S142 and the beam S143. Thus, coarse interference fringes (with a large period or pitch, e.g., greater than 2 μm) may not be generated by the two beams S142 and S143 for detection by the detector 130. In other words, an adjustment range of a periodicity of the interference fringes recorded in the recording medium 110 (referred to as a recording periodicity (or pitch)) is limited by the size of the beam splitter 120. To generate the coarse interference fringes for detection when the angle α is substantially large or small, the fringe stabilization mechanism needs a large-sized beam splitter 120, or needs an adjustment of the positions of the beam splitter 120 and the detector 130 with respect to the recording medium 110, which increases the cost and form factor.

In view of the limitations of the conventional technologies, the present discolored provides a fringe stabilization mechanism with an enhanced adjustment range of the recording angle. The disclosed fringe stabilization mechanism can reduce the form factor of the interference system. The interference system including the fringe stabilization mechanism also enhances the adjustment range of the recording periodicity in both intensity holograms (e.g. holographic optical elements, volume Bragg gratings, surface relief gratings, etc.) and polarization holograms (e.g., geometric phase elements, polarization volume holograms, etc.). The interference system including the fringe stabilization mechanism further increases the quality and yield of holograms in mass production.

In some embodiments, the present disclosure provides a system including a diffractive optical element configured to receive a first beam and a second beam interfering with one another to generate a first interference pattern. The diffractive optical element is also configured to forwardly diffract the first beam and the second beam to output a third beam and a fourth beam, wherein the third beam and the fourth beam interfere with one another to generate a second interference pattern. The system also includes a detector configured to detect the second interference pattern. In some embodiments, the diffractive optical element is configured to forwardly diffract the first beam in a counter-clockwise direction relative to a central axis of the diffractive optical element, and to forwardly diffract the second beam in a clockwise direction relative to the central axis. The central axis may extend in the thickness direction of the diffractive optical element, passing through a center of the diffractive optical element. In some embodiments, the central axis may be an optical axis of the diffractive optical element. In some embodiments, the central axis may coincide with a normal of a light outputting surface of the diffractive optical element. In some embodiments, the third beam and the fourth beam substantially overlap with one another. In some embodiments, the diffractive optical element includes a first grating and a second grating disposed in parallel with one another. Each of the first grating and the second grating may include a light outputting surface. A normal of the light outputting surface may coincide with the central axis of the diffractive optical element. In some embodiments, the first grating and the second grating may include a first central axis and a second central axis, respectively. The first central axis and the second central axis may coincide with the central axis of the diffractive optical element.

In some embodiments, the first grating is mounted on a first movable stage, and the second grating is mounted on a second movable stage, and each of the first movable stage and the second movable stage is independently controllable to adjust an orientation of the first grating or the second grating. In some embodiments, the first grating and the second grating are polarization selective gratings. In some embodiments, the first grating and the second grating include at least one of a surface relief grating, a transmissive polarization volume hologram grating, or a geometric phase polarization grating. In some embodiments, the first grating and the second grating are transmissive polarization volume hologram ("T-PVH") gratings. In some embodiments, the diffractive optical element includes a first grating set and a second grating set arranged in parallel with one another. At least one of the first grating set or the second grating set includes two or more stacked gratings. Each of the first grating set and the second grating set may include a light outputting surface. A normal of the light outputting surface may coincide with the central axis of the diffractive optical element. The central axis of the diffractive optical element may coincide with a first central axis of the first grating set and a second central axis of the second grating set.

In some embodiments, the system also includes a polarizer disposed between the diffractive optical element and the detector. In some embodiments, the polarizer is configured to transform the second interference pattern to a third interference pattern, and the detector is configured to detect the second interference pattern through detecting the third interference pattern. In some embodiments, the second interference pattern is a polarization interference pattern, and the third interference pattern is an intensity interference pattern. In some embodiments, the first interference pattern is an intensity interference pattern, and a periodicity of the third interference pattern is greater than a periodicity of the first interference pattern. In some embodiments, the first interference pattern is a polarization interference pattern, and a periodicity of the second interference pattern is greater than a periodicity of the first interference pattern. In some embodiments, the system also includes a plurality of optical elements configured to guide the first beam and the second beam to the diffractive optical element. In some embodiments, the system also includes a reconfigurable reflector disposed in an optical path of the first beam and configured to control a wavefront of the first beam while reflecting the first beam. In some embodiments, the system also includes a controller coupled with the detector and the reconfigurable reflector. In some embodiments, the detector is configured to generate a signal based on the detected second interference pattern. In some embodiments, the controller is configured to control the reconfigurable reflector based on the signal received from the detector to stabilize the first interference pattern.

The present disclosure also provides a method. The method includes guiding a first beam and a second beam to a diffractive optical element, the first beam and the second beam interfering with one another to generate a first interference pattern. The method also includes forwardly diffracting, by the diffractive optical element, the first beam and the second beam to output a third beam and a fourth beam at least partially overlapping with one another, wherein the third beam and the fourth beam interfere with one another to generate a second interference pattern. The method further includes detecting, by a detector, the second interference pattern. In some embodiments, forwardly diffracting, by the diffractive optical element, the first beam and the second beam to output the third beam and the fourth beam includes: forwardly diffracting the first beam in a counter-clockwise direction relative to a central axis of the diffractive optical element; and forwardly diffracting the second beam in a clockwise direction relative to the central axis. In some embodiments, the diffractive optical element includes a first grating and a second grating arranged in parallel with one another. Forwardly diffracting, by the diffractive optical element, the first beam and the second beam to output the third beam and the fourth beam includes: forwardly diffracting, by the first grating, the first beam in a counter-clockwise direction or a clockwise direction relative to a first central axis (or a first normal of a beam outputting surface) of the first grating, and outputting a fifth beam toward the second grating; forwardly diffracting, by the first grating, the second beam in the clockwise direction or the counter-clockwise direction relative to the first central axis (or the first normal), and outputting a sixth beam toward the second grating; forwardly diffracting, by the second grating, the fifth beam in the counter-clockwise direction relative to a second central axis (or a second normal of a beam outputting surface) of the second grating, and outputting the third beam; and forwardly diffracting, by the second grating, the sixth beam in the clockwise direction relative to the second central axis (or the second normal), and outputting the fourth beam.

In some embodiments, the method also includes transforming, by a polarizer disposed between the diffractive optical element and the detector, the second interference pattern to a third interference pattern; and detecting, by the detector, the second interference pattern through detecting the third interference pattern. In some embodiments, guiding the first beam and the second beam to the diffractive optical element includes guiding, by a plurality of optical elements, the first beam and the second beam to the diffractive optical element. The method also includes: generating, by the detector, a signal based on the detected second interference pattern; controlling, by a controller, a reconfigurable reflector disposed in an optical path of the first beam based on the signal received from the detector; and adjusting, by the reconfigurable reflector, a wavefront of the first beam while reflecting the first beam.

Figure 2A:
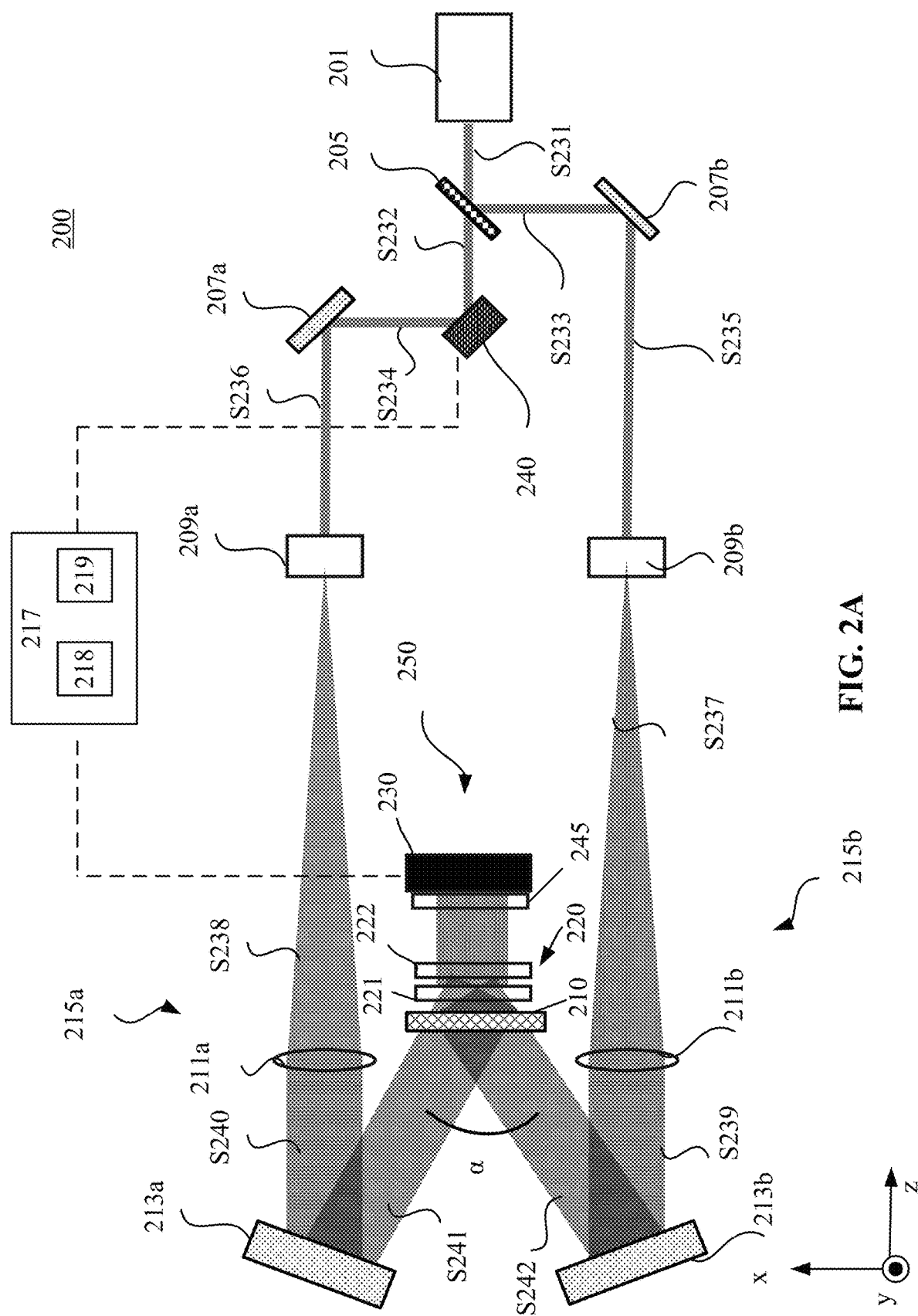
FIG. 2A schematically illustrates an interference system, according to an embodiment of the present disclosure.

FIG. 2A schematically illustrates an x-z sectional view of an interference system 200 for generating an interference pattern and recording the interference pattern at a recording medium 210, according to an embodiment of the present disclosure. The system 200 may include a fringe stabilization mechanism 250. The recording medium 210 may be disposed on a substrate (not shown). The system 200 may include a light source 201 configured to emit a beam S231 having a wavelength range (referred to as a recording wavelength range) within an absorption band of the recording medium 210. For example, the beam S231 may be an ultra-violet ("UV"), violet, blue, or green beam. In some embodiments, the light source 201 may be a laser light source, e.g., a laser diode, configured to emit a laser beam (e.g., a blue laser beam with a center wavelength of about 460 nm). In some embodiments, the light source 201 may be a light-emitting diode ("LED") light source, or an organic light-emitting diode ("OLED") light source. The system 200 may also include a plurality of optical elements configured to split the beam S231 into a first beam S232 propagating in a first path (or interference arm) and a second beam S233 propagating in a second path (or interference arm). The plurality of optical elements may also transform the first beam S232 into a first recording beam S241, and transform the second beam S233 into a second recording beam S242 interfering with the first recording beam S241. In some embodiments, the first recording beam S241 and the second recording beam S242 may be collimated beams. The interference of the first recording beam S241 and the second recording beam S242 may generate an interference pattern (or a first interference pattern), to which the recording medium 210 is exposed.

For example, in the embodiment shown in FIG. 2A, the system 200 may include a beam splitter 205 configured to split the beam S231 emitted from the light source 201 substantially evenly into two paths: the first beam S232 in the first path (or interference arm) and the second beam S233 in the second path (or interference arm). The system 200 may include a reflector (e.g., mirror) 207a and a reconfigurable reflector 240 disposed in the first path, and a reflector (e.g., mirror) 207b disposed in the second path. The reflector 207b disposed in the second path may reflect the second beam S233 as a beam S235. The reconfigurable reflector 240 disposed in the first path may reflect the first beam S232 as a beam S234, and the reflector 207a disposed in the first path may reflect the beam S234 as a beam S236 that is substantially parallel to the beam S235 in the second path. The reconfigurable reflector 240 disposed in the first path may be regarded as an element of the fringe stabilization mechanism 250.

In each of the first path and the second path, the system 200 may include a beam conditioning device (or spatial filtering device) 215a or 215b. The beam conditioning device 215a or 215b may be configured to condition (e.g., polarize, expand, collimate, filter, remove noise from, etc.) the beam S236 or S235, and transform the beam S236 or S235 into a collimated beam S240 or S239 with a predetermined beam size and a predetermined polarization. In some embodiments, the beam conditioning device 215a or 215b may include a first lens 209a or 209b, a pinhole aperture (not shown), and a second lens 211a or 211b arranged in an optical series. In some embodiments, one or more of the first lens 209a or 209b, the pinhole aperture, and the second lens 211a or 211b may be mounted on a movable mechanism for adjusting the relative distances therebetween. In some embodiments, the pinhole aperture may be coupled with an adjustment mechanism configured to adjust the size of the aperture. The first lens 209a or 209b may be configured to focus the beam S236 or S235 to an on-axis focal point where the pinhole aperture is located. For example, when the beam S236 or S235 is a diverging Gaussian beam, the first lens 209a or 209b may be configured to transform the Gaussian beam into a central Gaussian spot (on the optical axis) and side fringes representing unwanted "noise." The opening of the pinhole aperture may be configured to be centered on the central Gaussian spot, and the size of the opening of the pinhole aperture may be configured to pass the central Gaussian spot and block the "noise" fringes. Thus, the noise in the Gaussian beam S236 or S235 may be filtered by the pinhole aperture, and a "clean" Gaussian beam S238 or S237 may be output by the pinhole aperture and received by the second lens 211a or 211b. The second lens 211a or 211b may be configured to collimate and expand the beam S238 or S237 as a collimated beam S240 or S239 with a predetermined beam size. In some embodiments, the beam conditioning device 215a or 215b may also be referred to as a spatial filtering device.

In some embodiments, the beam conditioning device 215a or 215b may further include one or more optical elements (e.g., a polarizer, and/or a waveplate, etc.,) configured to change the polarization of the beam S236 or S235 or to polarize the beam S236 or S235, and output the collimated beam S240 or S239 with a predetermined polarization. The one or more optical elements may be disposed at suitable positions in the beam conditioning device 215a or 215b, e.g., before the first lens 209a or 209b, after the second lens 211a or 211b, or between the first lens 209a or 209b and the second lens 211a or 211b. In some embodiments, the beam S240 or S239 output from the beam conditioning device 215a or 215b may be a polarized beam. For example, the beam S240 or S239 may be a linearly polarized beam, a circularly polarized beam, or an elliptical polarized beam, etc. The beam S240 and the beam S239 may have the same polarization or different polarizations.

The system 200 may also include a reflector (e.g., mirror) 213a disposed in the first path and a reflector (e.g., mirror) 213b disposed in the second path. The reflector 213a may be configured to reflect the beam S240 as the first recording beam S241 toward the recording medium 210, and the reflector 213b may be configured to reflect the beam S239 as the second recording beam S242 toward the recording medium 210. The first recording beam S241 and the second recording beam S242 may intersect to interfere with one another in a spatial beam interference zone to generate an interference pattern (or the first interference pattern; also referred to as a recording interference pattern). The first interference pattern may include an intensity interference pattern or a polarization interference pattern. Although in FIG. 2A, the first recording beam S241 and the second recording beam S242 are shown as being incident onto the recording medium 210 from the same side of the recording medium 210, in some embodiments, the first recording beam S241 and the second recording beam S242 may be incident onto the recording medium 210 from different (e.g., opposite) sides of the recording medium 210 (i.e., incident onto opposite surfaces of the recording medium 210). The recording medium 210 may be disposed in the beam interference zone, and exposed to the first interference pattern. The first interference pattern may be recorded at (e.g., in and/or on) the recording medium 210. For convenience of description, the interference pattern may be referred to as being recorded "in" the recording medium 210. It is understood that the term "in" also encompasses "on" the recording medium 210.

The orientations of the reflectors 213a and 213b may be adjustable to change an angle α between the first recording beam S241 and the second recording beam S242 (also referred to as a recording angle α). For example, each of the reflector 213a and the reflector 213b may be mounted on a movable stage (not shown). The movable stage may be configured to be translatable and/or rotatable. In some embodiments, the movable stage may be rotatable around one or more local axes of the movable stage, such as an axis of rotation passing through the center of the movable stage, thereby rotating the reflector 213a or 213b around the axis of rotation of the movable stage. Thus, the angle α between the first recording beam S241 and the second recording beam S242 may be adjusted. In some embodiments, the movable stage may also be translatable in one or more linear directions, thereby translating or moving the reflector 213a or 213b in the one or more linear directions.

In the embodiment shown in FIG. 2A, the first recording beam S241 and the second recording beam S242 are presumed to be plane waves, and the angle α between the first recording beam S241 and the second recording beam S242 may be an angle between the propagation directions of the first recording beam S241 and the second recording beam S242. In some embodiments, at least one the first recording beam S241 or the second recording beam S242 may be a non-plane wave, e.g., a spherical wave, an aspherical wave, a cylindrical wave, or a freeform wave, etc. For example, the system 200 may include one or more lenses (e.g., spherical lenses, aspherical lenses, cylindrical lenses, or freeform lenses, etc.) disposed between the reflectors 213a or 213b and the recording medium 210, and configured to convert the first recording beam S241 or the second recording beam S242 into a non-plane wave. In such an embodiment, the angle α between the first recording beam S241 and the second recording beam S242 may be referred to as an angle between a predetermined ray of the first recording beam S241 and a predetermined ray of the second recording beam S242. Through adjusting the recording angle α (the recording wavelength is presumed to be fixed), a periodicity of the first interference pattern (or the recording interference pattern) generated by the first recording beam S241 and the second recording beam S242 may be adjustable. The periodicity of the first (or recording) interference pattern may also be referred to as a recording periodicity (or pitch).

In some embodiments, the first recording beam S241 and the second recording beam S242 may be two coherent recording beams having the same polarization, e.g., two coherent linearly polarized beams having the same linear polarization direction. In some embodiments, the first recording beam S241 and the second recording beam S242 may be incident onto the recording medium 210 from the same side of the recording medium 210. The first (or recording) interference pattern generated by the first recording beam S241 and the second recording beam S242 may include an intensity interference pattern including interference fringes of intensity maxima and intensity minima. A periodicity of the intensity interference pattern may be referred to as a distance between two neighboring fringes of intensity maxima (or intensity minima). In such an embodiment, the system 200 may be an intensity interference system, which may be configured to record intensity holograms (e.g. holographic optical elements, volume Bragg gratings, surface relief gratings, etc.) in the recording medium 210.

In some embodiments, the first recording beam S241 and the second recording beam S242 may be two coherent recording beams having different polarizations, e.g., two coherent circularly polarized beams having opposite handednesses. In some embodiments, the first recording beam S241 and the second recording beam S242 may be incident onto the recording medium 210 from the same side of the recording medium 210. In some embodiments, the first recording beam S241 and the second recording beam S242 may be two coherent recording beams having the same polarization, e.g., two coherent, circularly polarized beams having the same handedness. In some embodiments, the first recording beam S241 and the second recording beam S242 may be incident onto the recording medium 210 from two different sides of the recording medium 210. The position and the orientation of the recording medium 210 shown in FIG. 2A as being perpendicular to the z-axis is for illustrative purposes. The recording medium 210 may have other suitable position and suitable orientation, e.g., forming any suitable angle with respect to the z-axis. The first (or recording) interference pattern generated by the first recording beam S241 and the second recording beam S242 may include a polarization interference pattern having a substantially uniform intensity and spatially varying orientations (or polarization directions) of linear polarizations. A periodicity (or pitch) of the polarization interference pattern may be referred to as a distance over which the polarization direction of linear polarization changes by a predetermined number of degrees, such as 180 degrees. In such an embodiment, the recording medium 210 may be a polarization sensitive recording medium. The system 200 may be a polarization interference system that may be configured to record polarization holograms (e.g., geometric phase elements, polarization volume holograms, etc.) in the recording medium 210.

Figure 2B:
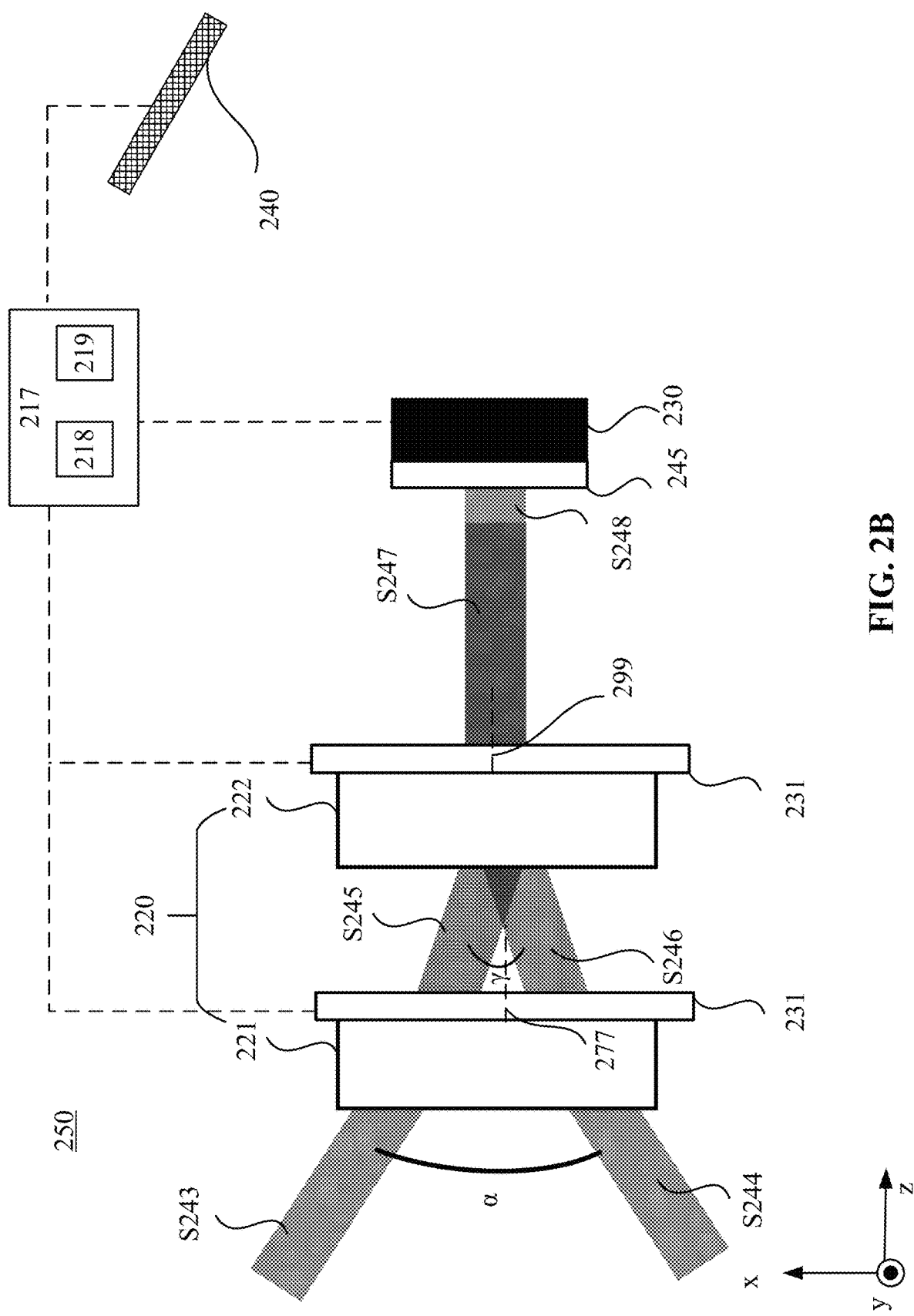
FIGS. 2B and 2C schematically illustrate a fringe stabilization mechanism that may be included in the interference system shown in FIG. 2A, according to an embodiment of the present disclosure.
Figure 2C:
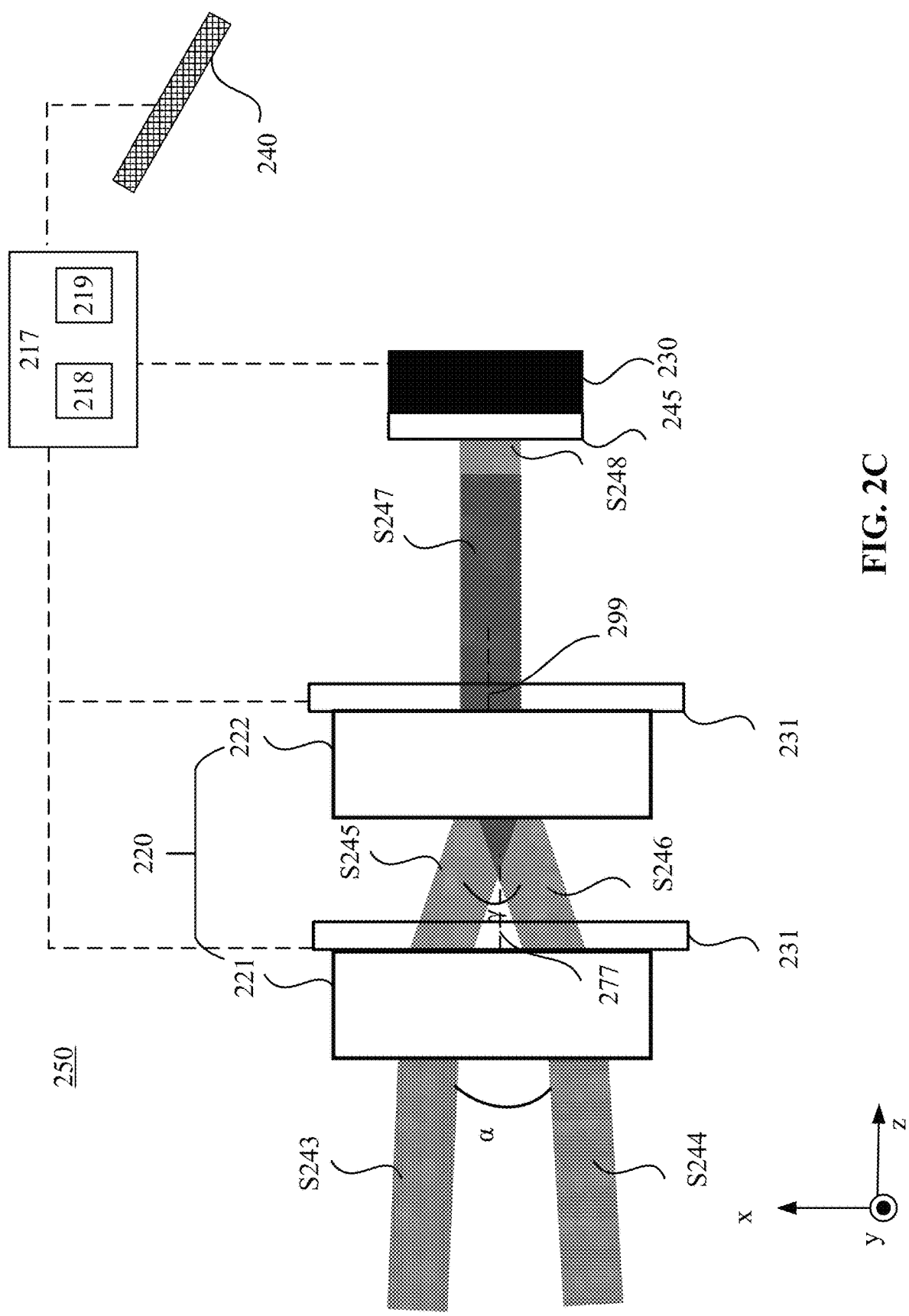

The fringe stabilization mechanism 250 may be configured to stabilize the interference of the first recording beam S241 and the second recording beam S242, thereby stabilizing the interference pattern (i.e., the first or the recording interference pattern) that is recorded at the recording medium 210. FIGS. 2B and 2C schematically illustrate an x-z sectional view of the fringe stabilization mechanism 250 included in the system 200 shown in FIG. 2A, according to an embodiment of the present disclosure. Referring to FIGS. 2A-2C, the fringe stabilization mechanism 250 may include the reconfigurable reflector 240, a diffractive optical element 220, a detector 230, and a controller 217. The reconfigurable reflector 240 may be disposed in one of the first path (or interference arm) or the second path (or interference arm) of the system 200. For illustrative purposes, FIG. 2A shows the reconfigurable reflector 240 is disposed in the first path (or interference arm) of the system 200. In some embodiments, the reconfigurable reflector 240 may be disposed in the second path (or interference arm) of the system 200.

In some embodiments, the recording medium 210 may have a beam incidence side where the recording beams S241 and S242 are incident onto the recording medium 210, and a beam exit side where the recording beams S241 and S242 exit the recording medium 210. The diffractive optical element 220 and the detector 230 may be disposed at the beam exit side of the recording medium 210. In some embodiments, the fringe stabilization mechanism 250 may also include a polarizer 245 disposed between the diffractive optical element 220 and the detector 230. In some embodiments, the polarizer 245 may be omitted. The controller 217 may be communicatively coupled with the reconfigurable reflector 240 and the detector 230, and other components included in the system 200. The controller 217 may include a processor or processing unit 218. The processor 218 may by any suitable processor, such as a central processing unit ("CPU"), a graphic processing unit ("GPU"), etc. The controller 217 may include a storage device 219. The storage device 219 may be a non-transitory computer-readable medium, such as a memory, a hard disk, etc. The storage device 219 may be configured to store data or information, including computer-executable program instructions or codes, which may be executed by the processor 218 to perform various controls or functions according to the methods or processes disclosed herein.

In some embodiments, the controller 217 may be communicatively coupled with the reconfigurable reflector 240 to control an operation of the reconfigurable reflector 240. For example, the controller 217 may control the reconfigurable reflector 240 to control or adjust a wavefront of a recording beam, e.g., the first recording beam S241 in the first path (or interference arm) or the second recording beam S242 in the second path (or interference arm), while reflecting the first recording beam S241 (or the second recording beam S242). For example, the reconfigurable reflector 240 may be configured to correct wavefront errors of the first recording beam S241 (or the second recording beam S242), and stabilize the wavefront of the first recording beam S241 (or the second recording beam S242), thereby stabilizing the first (or recording) interference pattern generated based on the two recording beams S241 and S242.

The term "stabilize" means that the item being stabilized (such as the wavefront or the interference pattern) experiences a fluctuation or error within a predetermined range or smaller than a predetermined threshold value, which may be defined based on specific applications. For example, when the interference pattern is stabilized, it may indicate that the change in the interference pattern, or a value indicating the change in the interference pattern, is within a predetermined range or smaller than a predetermined threshold value. Any suitable control algorithm, such as a close-loop feedback control algorithm may be encoded in the controller 217 for achieving an objective of stabilizing the interference pattern generated by the two recording beams S241 and S242. Although one reconfigurable reflector 240 is shown in FIG. 2A for illustrative purposes, in some embodiments, another reconfigurable reflector may be included in the second optical path to reflect the beam S233 toward the reflector 207b.

The reconfigurable reflector 240 may be any suitable reflector that is reconfigurable or deformable via any suitable mechanism. In some embodiments, the reconfigurable reflector 240 may include discreet segments that are individually or independently deformable. In some embodiments, the reconfigurable reflector 240 may include a continuous reflective surface that is locally deformable. For example, the reconfigurable reflector 240 may be a micro electromechanical system ("MEMS") deformable mirror, a piezoelectric deformable mirror, a liquid deformable mirror, or a reflective spatial light modulator, etc.

In some embodiments, the diffractive optical element 220 may be configured to forwardly diffract two input beams having a relatively small overlap (or without overlap) therebetween, and output two diffracted beams having a relatively a large overlap therebetween. For example, the diffractive optical element 220 may be configured to forwardly diffract two input beams having a relatively large angle therebetween, and output two intersecting (i.e., at least partially overlapping) diffracted beams having a relatively small angle therebetween. In some embodiments, the diffractive optical element 220 may forwardly diffract two input beams having a relatively large angle therebetween, and output two intersecting beams substantially overlapping with one another (e.g., the angle therebetween is about zero). In other words, the diffractive optical element 220 may function as a beam combiner (hence the diffractive optical element 220 may also be referred to as a beam combiner 220 for discussion purposes) configured to combine two input beams, via forward diffraction.

In some embodiments, the diffractive optical element 220 may diffract one of the two input beams in a clockwise direction away from a normal of a beam outputting (or exiting) surface of the diffractive optical element 220 (or away from a central axis of the diffractive optical element), and diffract the other one of the two input beams in a counter-clockwise direction away from the same normal (or away from the same central axis), thereby combing the two input beams at a reduced intersecting angle between the two input beams. The normal (or central axis) may extend between the two input beams and the two diffracted beams output from the diffractive optical element 220.

In some embodiments, the beam combiner 220 may include a pair of gratings, a first grating 221 and a second grating 222, with independently or individually adjustable orientations or clocking angles. An orientation of a grating may be referred to as an in-plane direction that is a direction of the periodicity of the grating. Alternatively, the in-plane direction may be a direction parallel to the direction of the periodicity of the grating. A clocking angle of a grating may be referred to as an angle formed between a predetermined in-plane reference direction and the orientation of the grating. In some embodiments, the first grating 221 and the second grating 222 may be disposed in parallel. In the embodiments shown in FIGS. 2B and 2C, the first grating 221 and the second grating 222 may be spaced apart from one another with a gap. In some embodiments, the first grating 221 and the second grating 222 may be disposed without a gap therebetween. In some embodiments, at least one (e.g., each) of the first grating 221 or the second grating 222 may be a transmissive grating.

In some embodiments, at least one (e.g., each) of the first grating 221 or the second grating 222 may be a transmissive polarization selective grating configured to provide a polarization selective diffraction. In some embodiments, at least one (e.g., each) of the first grating 221 or the second grating 222 may be circular polarization selective. For example, at least one (e.g., each) of the first grating 221 or the second grating 222 may be configured to operate at a first optical state for a circularly polarized light having a predetermined handedness, and operate at a second, different optical state for a circularly polarized light having a handedness that is opposite to the predetermined handedness. In some embodiments, the first and second gratings 221 and 222 may be configured with a high diffraction efficiency.

In some embodiments, at least one (e.g., each) of the first grating 221 or the second grating 222 may include a suitable sub-wavelength structure, a birefringent material (e.g., liquid crystals), a photo-refractive holographic material, or any combination thereof. In some embodiments, at least one (e.g., each) of the first grating 221 or the second grating 222 may be a surface relief grating. In some embodiments, a surface relief grating may be configured to forwardly diffract a circularly polarized beam having a predetermined handedness in a positive diffraction angle, and forwardly diffract a circularly polarized beam having a handedness that is opposite to the predetermined handedness in a negative diffraction angle. The positive and negative diffraction angles may be defined relative to the normal of the light outputting surface of the grating.

In some embodiments, at least one (e.g., each) of the first grating 221 or the second grating 222 may be a transmissive polarization volume grating ("PVG") or transmissive polarization volume hologram ("PVH") grating. In some embodiments, a transmissive PVG or transmissive PVH grating may be configured to substantially forwardly diffract a circularly polarized beam having a predetermined handedness, and substantially transmit a circularly polarized beam having a handedness that is opposite to the predetermined handedness, with negligible diffraction or no diffraction.

In some embodiments, at least one (e.g., each) of the first grating 221 or the second grating 222 may be a geometric phase ("GP") grating or Pancharatnam-Berry phase ("PBP") grating. In some embodiments, a PBP grating may include liquid crystal molecules with orientations exhibiting a periodically rotation in an in-plane direction (e.g., an x-axis direction). In some embodiments, a PBP grating may be configured to forwardly diffract a circularly polarized beam having a predetermined handedness in a positive diffraction angle, and forwardly diffract a circularly polarized beam having a handedness that is opposite to the predetermined handedness in a negative diffraction angle. In some embodiments, a PBP may be configured to provide a substantially high diffraction efficiency, e.g., equal to or greater than 95%. For example, when a PBP grating is configured to forwardly diffract a right-handed circularly polarized ("RHCP") beam in a positive diffraction angle (e.g., to a $+1^{st}$ order), and forwardly diffract a left-handed circularly polarized ("LHCP") beam in a negative diffraction angle (e.g., to a $-1^{st}$ order), 95% (or more) of the energy of the input RHCP beam may be output to the $+1^{st}$ order diffracted beam, and 95% (or more) of the energy of the input LHCP beam be output to the $-1^{st}$ order diffracted beam. A PBP grating may diffract an input RHCP (or LHCP) beam to a plurality of diffraction orders having positive diffraction angles, e.g., a $+1^{st}$ order, $+2^{nd}$ order, $+3^{rd}$ order, and so on. A PBP grating may diffract an input LHCP (or RHCP) beam to a plurality of diffraction orders having negative diffraction angles, e.g., a $-1^{st}$ order, $-2^{nd}$ order, $-3^{rd}$ order, and so on. In some embodiments, the diffraction efficiency of high order diffracted beams may gradually decrease. For discussion purposes, in the disclosed embodiments, only the $+1^{st}$ order and the $-1^{st}$ order diffracted beams are considered.

In some embodiment, the first grating 221 and the second grating 222 may be configured to be identical, e.g., being the same type of gratings of the same parameters and the same optical properties. For example, the first grating 221 and the second grating 222 may be configured with the same size and the same periodicity or pitch, and with the same diffraction efficiency. In some embodiment, the first grating 221 and the second grating 222 may be configured with different parameters and/or different optical properties.

The first grating 221 and the second grating 222 may be configured to be independently or individually rotatable to adjust orientations (or clocking angles) of the gratings, respectively. In some embodiments, as shown in FIGS. 2B and 2C, each of the first grating 221 and the second grating 222 may be mounted on a movable stage 231. The movable stage 231 may be configured to be rotatable, thereby rotating the first grating 221 or the second grating 222 around one or more rotation axes (e.g., the yaw, roll, and/or pitch axes) defined locally with respect to the movable stage 231. In the embodiments shown in FIGS. 2B and 2C, the orientation of the first grating 221 or the second grating 222 is shown as in the x-y plane, and the predetermined in-plane reference direction is presumed to be the +x-axis direction. A clocking angle of the first grating 221 or the second grating 222 may be referred to as an angle between the orientation of the first grating 221 or the second grating 222 and the +x-axis direction.

Through rotating, via the movable stage 231, the first grating 221 or the second grating 222 around a common axis (e.g., an axis passing through the centers of the first grating 221 and the second grating 222, or an axis parallel with the z-axis in FIG. 2B or FIG. 2C), the orientation (or the clocking angle) of the first grating 221 or the second grating 222 may be adjustable. In some embodiments, the movable stage 231 may also be configured to be translatable, translating the first grating 221 or the second grating 222 in one or more directions (e.g., in an x-axis direction, a y-axis direction, and/or a z-axis direction). For example, at least one of the movable stages 231 may be translated along the z-axis direction to adjust the distance between the first grating 221 and the second grating 222, the distance between the second grating 222 and the detector 230, or the distance between the first grating 221 and the detector 230. In some embodiments, the controller 217 may be communicatively coupled with the movable stages 231, and may control the orientations and/or movements of the movable stages 231.

Referring to FIGS. 2A-2C, the first recording beam S241 and the second recording beam S242 may be transmitted through the recording medium 210 as a beam S243 and a beam S244, respectively, which may be referred to as input beams of the beam combiner 220. The beams S243 and S244 may have the same polarizations as the beams S241 and S242, respectively. The beam combiner 220 including the gratings 221 and 222 may be configured to combine the input beams S243 and S244, while forwardly diffracting the input beams S243 and S244. In the embodiment shown in FIG. 2B, the angle $\alpha$ between the input beams S243 and S244 may be large, e.g., larger than or equal to a predetermined value. The first grating 221 may be configured to forwardly diffract the input beams S243 and S244 in the counter-clockwise and clockwise directions away from a same normal 277 of a beam outputting surface of the first grating 221. The normal 277 is also referred to as a first central axis 277 of the first grating 221. The normal 277 may be located between the two input beams S243 and S244, or between two diffracted beams S245 and S246 output from the first grating 221. As a result of the diffraction by the first grating 221, the angle $\gamma$ between the diffracted beams S245 and S246 may be smaller than the angle $\alpha$ between the input beams S243 and S244 (i.e., $\gamma<\alpha$).

In the embodiment shown in FIG. 2C, the angle $\alpha$ between the input beams S243 and S244 may be small, e.g., smaller than the predetermined value. The first grating 221 may be configured to forwardly diffract the input beams S243 and S244 in the clockwise and counter-clockwise directions toward the same normal 277 of the beam outputting surface of the first grating 221 (or the first central axis 277 of the first grating 221). As a result of the diffraction by the first grating 221, the angle $\gamma$ between the diffracted beams S245 and S246 may be larger than the angle $\alpha$ between the input beams S243 and S244 (i.e., $\gamma>\alpha$). The diffracted beams S245 and S246 may propagate toward the second grating 222, as shown in FIGS. 2B and 2C.

Figure 2D:
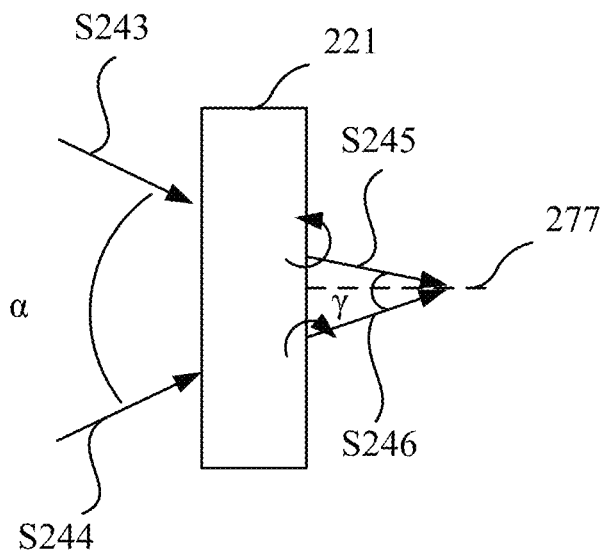
FIGS. 2D and 2E schematically illustrate diffraction of input beams by a first grating included in the fringe stabilization mechanism shown in FIGS. 2B and 2C, according to embodiments of the present disclosure.
Figure 2E:
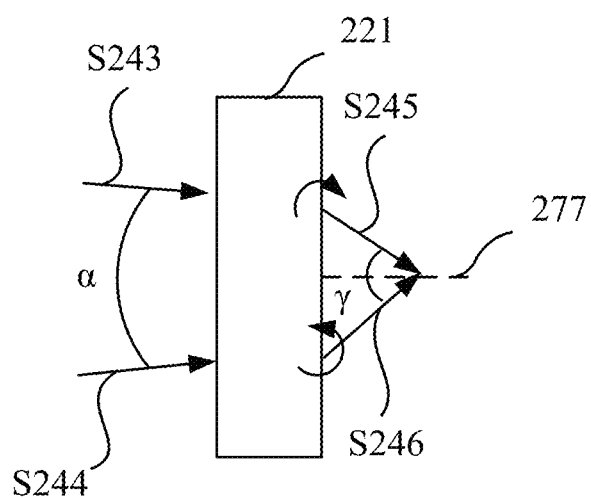

FIG. 2D and FIG. 2E schematically illustrate the diffractions of the input beams S423 and S244 by the first grating 221, according to various embodiments of the present disclosure. As shown in FIG. 2D, when the angle $\alpha$ between the input beams S243 and S244 is large, e.g., larger than the predetermined value, the first grating 221 may be configured to diffract the input beams S243 and S244 in counter-clockwise direction and clockwise direction away from the normal 277 (or the first central axis 277 of the first grating 221). Thus, the angle $\gamma$ between the diffracted beams S245 and S246 may be smaller than the angle $\alpha$ between the input beams S243 and S244 (i.e., $\gamma<\alpha$). As shown in FIG. 2E, when the angle $\alpha$ between the input beams S243 and S244 is small, e.g., smaller than the predetermined value, the first grating 221 may be configured to diffract the input beams S243 and S244 in clockwise direction and counter-clockwise direction toward the normal 277 (or the first central axis 277 of the first grating 221). Thus, the angle $\gamma$ between the diffracted beams S245 and S246 may be larger than the angle $\alpha$ between the input beams S243 and S244 (i.e., $\gamma>\alpha$). To achieve the different diffractions shown in FIG. 2D and FIG. 2E when the angle $\alpha$ between the input beams is at different values, the first grating 221 may be rotated to different clocking angles. Whether the first grating 221 forwardly diffract the input beams S243 and S244 in the counter-clockwise direction and the clockwise direction away from or towards the normal 277, as shown in FIG. 2D and FIG. 2E, may depend on the clocking angle of the first grating 221.

Referring back to FIG. 2B and FIG. 2C, the second grating 222 may be configured to further forwardly diffract the beams S245 and S246 received from the first grating 221. For example, the second grating 222 may diffract the beams S245 and S246 in the counter-clockwise direction and the clockwise direction, respectively, away from a same normal 299 of a beam outputting surface of the second grating 222. The normal 299 may be referred to as a second central axis of the second grating 222. The normal 299 may be located between the beams S245 and S246, or between two diffracted output beams S247 and S248. The normal 299 may also be referred to as the normal of a beam outputting (or exiting) surface of the diffractive optical element 220. In some embodiments, the normal 299 may be on the same straight line as the normal 277.

As a result of the diffraction by the second grating 222, the angle $\beta$ between beams S247 and S248 may be smaller than the angle $\gamma$ between the beams S245 and S246. In the embodiment shown in FIG. 2B and FIG. 2D, the angles may satisfy the following relationship: $\alpha>\gamma>\beta$. In the embodiment shown in FIG. 2C and FIG. 2E, the angles may satisfy the following relationship: $\gamma>\alpha>\beta$. In either embodiment, the angle $\beta$ may be smaller than the angle $\alpha$. In some embodiments, as the angle between the two beams (e.g., S243 and S244, S247 and S248) is reduced, the overlapping between the two beams may be increased, and the size of the beam interference zone between the two beams may be increased.

Figure 2F:
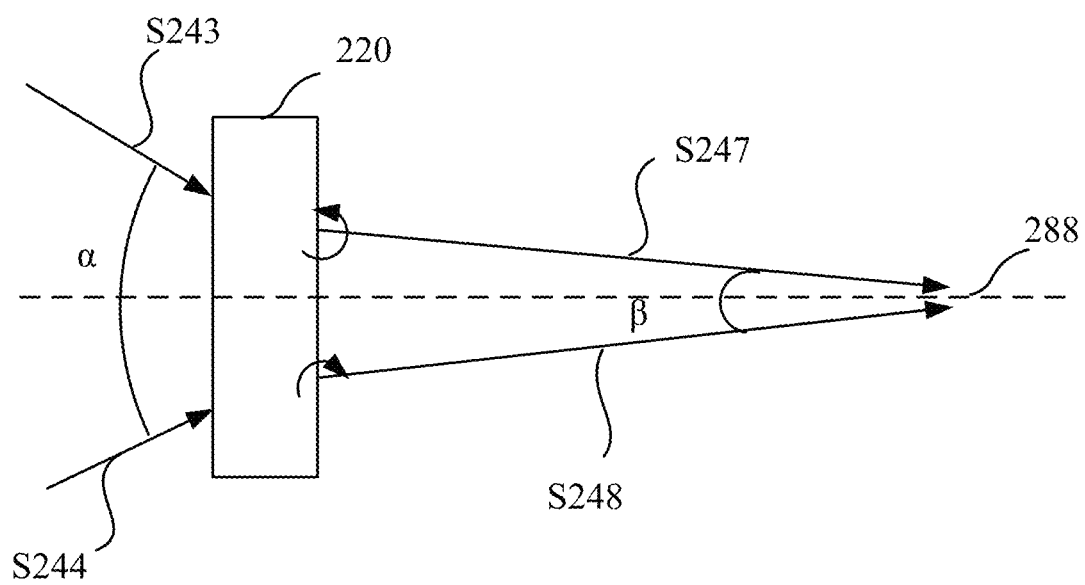
FIG. 2F schematically illustrates diffraction of input beams by a diffractive optical element included in the fringe stabilization mechanism shown in FIGS. 2B and 2C, according to an embodiment of the present disclosure.

FIG. 2F schematically illustrates the diffraction of the beam combiner 220, according to an embodiment of the present disclosure. FIGS. 2B-2E illustrate the detailed diffractions by the first and second gratings 221 and 222 included in the beam combiner 220. FIG. 2F shows the overall diffraction effect of the beam combiner 220. The overall diffraction effect of the beam combiner 220 may be converting, via forward diffraction, the input beams S243 and S244 into the output beams S247 and S248. The beams S247 and S248 may intersect with one another to interfere and generate a second interference pattern. In some embodiments, the beam combiner 220 may be configured to transform, via forward diffraction, the input beams S243 and S244 having a relatively large angle (e.g., the recording angle $\alpha$) therebetween as intersecting output beams S247 and S248 having a relatively small angle (e.g., angle $\beta$) therebetween, where the angle $\beta$ may be smaller than the recording angle $\alpha$ and greater than or equal to zero. For example, the beam combiner 220 may forwardly diffract the first input beam S243 in a counter-clockwise direction relative to a central axis 288 of the beam combiner 220 and output the beam S247.

When the beam combiner 220 includes the first grating 221 and the second grating 222 stacked together, the central axis 288 of the beam combiner 220 may coincide with the first central axis 277 of the first grating 221 and the second central axis 299 of the second grating 222. When the first input beam S243 is diffracted counter-clockwise relative to the central axis 288, the first input beam S243 may be diffracted in a direction away from the central axis 288. In addition, the beam combiner 220 may forwardly diffract the second input beam S244 in a clockwise direction relative to the central axis 288 and output the beam S248. When the second input beam S244 is diffracted clockwise relative to the central axis 288, the second input beam S244 may be diffracted in a direction away from the central axis 288. That is, the output beam S247 may be rotated counter-clockwise relative to the first input beam S243, and the output beam S248 may be rotated clockwise relative to the second input beam S244.

In some embodiments, the output beams S247 and S248 of the beam combiner 220 may substantially overlap with one another, i.e., the angle $\beta$ is small (e.g., smaller than 15°, 10°, 5°, etc.). In some embodiments, although not shown, the beams S247 and S248 may be substantially parallel with one another, i.e., the angle $\beta$ may be substantially zero. In some embodiment, the output beams S247 and S248 may partially overlap with another, i.e., the angle may be greater than or equal to zero, and smaller than the angle $\alpha$ or $\gamma$. The output beams S247 and S248 of the beam combiner 220 may interfere with one another to generate the second interference pattern for detection by the detector 230.

The orientations (or clocking angles) of the first grating 221 and the second grating 222 may be adjustable via independently rotating the first grating 221 and the second grating 222 around the common axis of the first grating 221 and the second grating 222. For a predetermined recording angle $\alpha$, each of the first grating 221 and the second grating 222 may be independently rotated to be positioned in a predetermined orientation (or oriented to have a predetermined clocking angle), such that the beam combiner 220 may combine the input beams S243 and S244 through forward diffraction. When the recording angle $\alpha$ changes, the orientation (or clocking angle) of at least one of the first grating 221 or the second grating 222 may be adjusted, such that the beam combiner 220 may combine the input beams S243 and S244 through forward diffraction to achieve a different or same angle $\beta$ (and a different or same angle $\gamma$).

In some embodiments, when the recording angle $\alpha$ is configured as a first value, the first grating 221 and the second grating 222 may be rotated around the common axis, via the movable stages 231, to have a first clocking angle $\phi1$ and a second clocking angle $\phi2$, respectively. Thus, the beam combiner 220 including the gratings 221 and 222 may combine the input beams S243 and S244 having the recording angle $\alpha$ of the first value therebetween through forward diffraction to achieve an angle $\beta1$ between the beams S247 and S248. Depending on whether the angle $\alpha$ is greater than, equal to, or smaller than a predetermined value, the first clocking angle $\phi1$ may be adjusted such that the input beams S243 and S244 are either diffracted in the counter-clockwise and clockwise directions away from the normal 277, as shown in FIG. 2D, or in the clockwise and counter-clockwise directions toward the normal 277, as shown in FIG. 2E.

When the recording angle $\alpha$ is changed to be a second, different value (e.g., via rotating the movable stage coupled with the reflector 213a or 213b in FIG. 2A), at least one of the first grating 221 or the second grating 222 may be rotated around the common axis, via the corresponding movable stage 231, to change the corresponding clocking angle $\phi1$ and/or $\phi2$. The beam combiner 220 including the gratings 221 and 222 may combine the input beams S243 and S244 having the recording angle $\alpha$ of the second value therebetween through forward diffraction to achieve an angle $\beta2$ between the beams S247 and S248. The angle $\beta2$ may or may not be the same as the angle $\beta1$.

The detector 230 may be coupled with the beam combiner 220, and configured to receive the beams S247 and S248 output from the beam combiner 220. The detector 230 may detect (e.g., directly, or indirectly detect) the second interference pattern generated by the output beams S247 and S248. The detector 230 may include a camera, or a photodiode, etc., such as one or more of a charge-coupled device ("CCD") camera, a complementary metal-oxide-semiconductor ("CMOS") sensor, an N-type metal-oxide-semiconductor ("NMOS") sensor, a pixelated polarized camera, or any other optical sensors. In some embodiments, the detector 230 may also be referred to as an imaging device.

According to the polarizations of the output beams S247 and S248, the second interference pattern generated by the beam S247 and the beam S248 may be an intensity interference pattern or a polarization interference pattern. In some embodiments, the beams S247 and S248 may be coherent beams having the same polarization, and the second interference pattern generated by the beams S247 and S248 may be an intensity interference pattern that may be directly detectable by the detector 230. When the second interference pattern is an intensity interference pattern, the second interference pattern may also be referred to as a detecting interference pattern.

In some embodiments, the beams S247 and S248 may be coherent beams having orthogonal polarizations (e.g., coherent circularly polarized beams having opposite handednesses), and the second interference pattern generated by the beams S247 and S248 may be a polarization interference pattern that may be indirectly detectable by the detector 230. In such an embodiment, the fringe stabilization mechanism 250 may further include the polarizer 245 disposed between the beam combiner 220 and the detector 230. In some embodiments, the polarizer 245 may be a linear polarizer configured to substantially transmit a linearly polarized light having a predetermined polarization direction, and substantially block, via absorption, a linearly polarized light having a polarization direction that is orthogonal to the predetermined polarization direction.

The polarizer 245 may be configured to transform the second interference pattern (e.g., polarization interference pattern) generated by the beams S247 and S248 into a third interference pattern that is an intensity interference pattern. The third interference pattern (e.g., intensity interference pattern) may be directly detectable by the detector 230. The third interference pattern (e.g., intensity interference pattern) that is detected by the detector 230 may also be referred to as a detecting interference pattern. A periodicity of the interference fringes (or the detecting interference pattern) may be referred to as a distance between two neighboring fringes of intensity maxima (or intensity minima). The periodicity of the interference fringes (or the detecting interference pattern) may be referred to as a detecting periodicity.

In some embodiments, the recording interference pattern (or the first interference pattern) generated by the recording beams S241 and S242 may be an intensity interference pattern. The second interference pattern generated by the beams S247 and S248 may be a polarization interference pattern. The second, polarization interference pattern may be converted into the third, intensity interference pattern by the polarizer 245. The third, intensity interference pattern may include a detecting periodicity. The detecting periodicity may be configured to be greater than the recording periodicity.

In some embodiments, the recording interference pattern (or the first interference pattern) generated by the recording beams S243 and S244 may be a polarization interference pattern. The second interference pattern generated by the beams S247 and S248 may also be a polarization interference pattern. A periodicity of the second interference pattern may be configured to be greater than the periodicity of the recording interference pattern (or the first interference pattern). Thus, when the second, polarization interference pattern is converted to an intensity interference pattern by the polarizer 245, the increased periodicity in the intensity interference pattern renders it easier for the detector 230 to detect any changes or vibrations in the recording interference pattern (or the first interference pattern). In some embodiments, the detecting periodicity may be configured to be substantially the same as the periodicity of the second interference pattern. Thus, the detecting periodicity may be configured to be greater than the recording periodicity.

In other words, the beam combiner 220 (and the polarizer 245 when included) may be configured to generate an interference pattern having a detecting periodicity that is greater than a recording periodicity of the recording interference pattern recorded in the recording medium 210. The detector 230 may be configured to generate a signal based on the detected interference pattern (e.g., the intensity interference pattern directly generated by the beams S247 and S248, or the intensity interference pattern converted from a polarization interference pattern generated by the beams S247 and S248). The signal generated by the detector 230 may include information of the vibration of the detecting interference pattern (or variation of the interference fringes), e.g., the locations of the vibration, the amplitude of the vibration, etc. The change in the detecting interference pattern may be detected by the detector 230, or the controller 217.

The controller 217 may be configured to be communicatively coupled with the detector 230. The controller 217 may receive signals from the detector 230, and may transmit control commands or signals to the detector 230. Based on the received signals, the controller 217 may control an operation of the reconfigurable reflector 240, and/or detect a change in the detecting interference pattern that may be caused by, e.g., a vibration in the environment in which the system 200 is located. In some embodiments, the controller 217 may be configured to control a driving mechanism of the reconfigurable reflector 240, to adjust a deformation of the reconfigurable reflector 240, thereby adjusting a wavefront (e.g., correcting a distorted wavefront) of the beam S234 reflected by the reconfigurable reflector 240. Accordingly, the wavefront of the first recording beam S241 for generating the recording interference pattern may be adjusted (or corrected) to stabilize the recording interference pattern.

Further, the wavefront of the beam S247 output from the beam combiner 220 for generating the detecting interference pattern may be adjusted (or corrected) to stabilize the detecting interference pattern. Through continuously receiving the signals (or feedback) from the detector 230, the controller 217 may adjust the deformation of the reconfigurable reflector 240 in real time, thereby adjusting the wavefront (e.g., correcting the distorted wavefront) of the beam S234 reflected by the reconfigurable reflector 240 in real time for stabilizing the recording interference pattern. Through detecting and stabilizing the vibration in the detecting interference pattern, the vibration in the recording interference pattern may be stabilized accordingly.

Figure 3A:
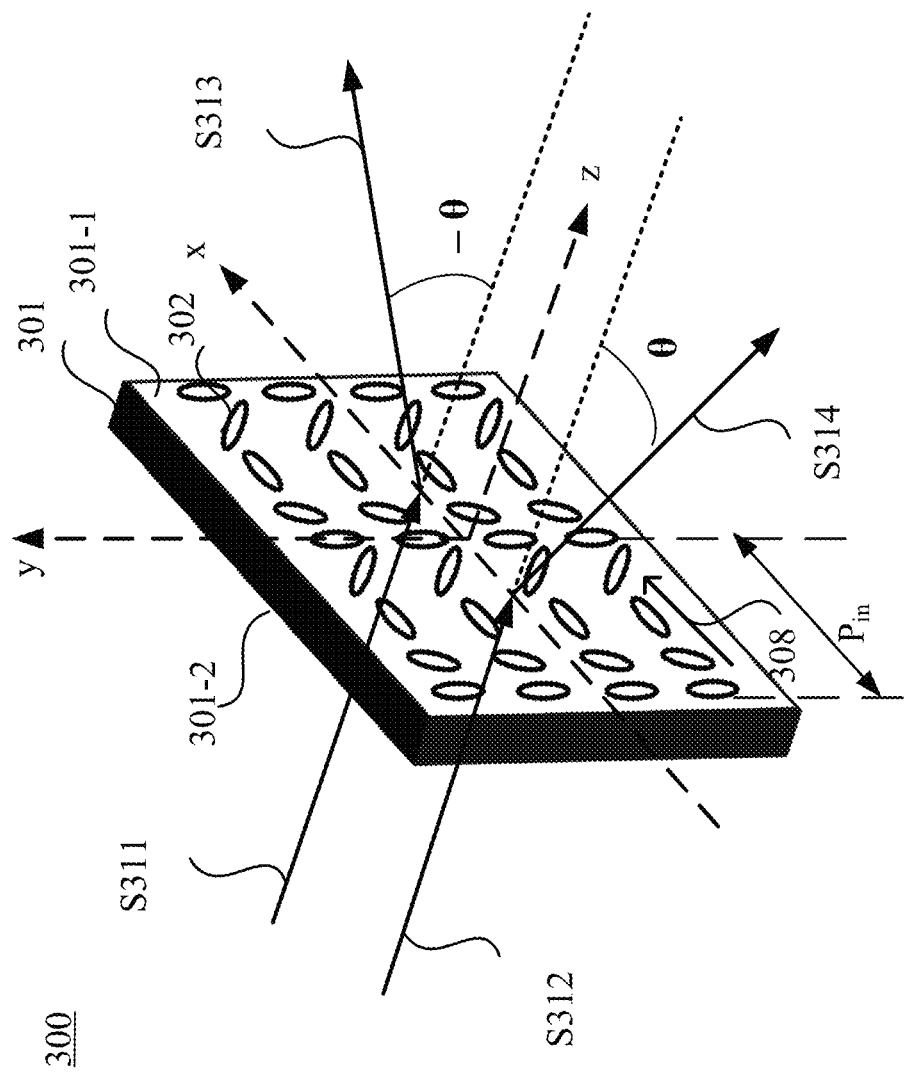
FIG. 3A schematically illustrates a diagram of a geometric phase ("GP") grating or Pancharatnam-Berry phase ("PBP") grating, according to an embodiment of the present disclosure.

In some embodiments, the first grating 221 and the second grating 222 may be GP or PBP gratings. FIG. 3A schematically illustrates a diagram of a GP grating or PBP grating 300, according to an embodiment of the present disclosure. The GP grating or PBP grating 300 may be an embodiment of the first grating 221 or the second grating 222.

As shown in FIG. 3A, the PBP grating 300 may include a birefringent material (e.g., liquid crystals) in a form of a film 301 (also referred to as a birefringent film 301 for discussion purposes). The birefringent film 301 may include optically anisotropic molecules 302 configured to with periodically varying orientations. The orientations of the optically anisotropic molecules 302 may exhibit a period rotation pattern in an in-plane direction. Calamitic (rod-like) LC molecules are used as examples of optically anisotropic molecules 302. The rod-like LC molecule may have a longitudinal direction (or a length direction) and a lateral direction (or a width direction). The longitudinal direction of the LC molecule may be referred to as a director of the LC molecule or an LC director. An orientation of the LC director may represent the orientation of the LC molecule. The orientation of the LC director may determine a local optic axis orientation (or an orientation of the optic axis) at a local point of the birefringent film 301.

The birefringent film 301 may include a first surface 301-1 and a second surface 301-2 in a thickness direction of the birefringent film 301 (e.g., a z-axis in FIG. 3A). In a region substantially close to (including at) a surface (e.g., at least one of the first surface 301-1 or the second surface 301-2) of the birefringent film 301, the LC directors of the LC molecules 302 may be configured with an in-plane orientation pattern, e.g., a periodic in-plane orientation pattern with a uniform (e.g., same) in-plane pitch Pin in a predetermined in-plane direction (e.g., an x-axis direction). In other words, azimuthal angels (not shown) of the LC molecules 302 located in close proximity to or at the surface of the birefringent film 301 may be configured to periodically and continuously change in the predetermined in-plane direction along the surface. The predetermined in-plane direction may be any suitable in-plane direction along the surface (or in a plane parallel with the surface) of the birefringent film 301. For illustrative purposes, FIG. 3A shows that the predetermined in-plane direction is an x-axis direction. The in-plane pitch Pin is defined as a distance along the in-plane direction (e.g., the x-axis direction) over which the LC directors rotate by a predetermined value (e.g., 180°) from a predetermined initial state (or reference state).

Within a volume of the birefringent film 301, along the thickness direction (e.g., the z-axis direction) of the birefringent film 301, the directors (or the azimuth angles φ) of the LC molecules 302 may have a substantially same orientation (or value) from the first surface 301-1 to the second surface 301-2. In some embodiments, the thickness of the birefringent film 301 may be configured as $d=\lambda/(2*\Delta n)$, where $\lambda$ is a design wavelength, $\Delta n$ is the birefringence of the LC material of the birefringent film 301, and $\Delta n=n_e-n_o$, $n_e$ and $n_o$ are the extraordinary and ordinary refractive indices of the LC material, respectively.

In some embodiments, the PBP grating 300 may be configured to operate in a positive state to forwardly diffract a first circularly polarized light having a first predetermined handedness in a positive diffraction angle, and operate in a negative state to forwardly diffract a second circularly polarized light having a second predetermined handedness opposite to the first predetermined handedness in a negative diffraction angle. The PBP grating 300 operating in the positive or negative state may reverse a handedness of a diffracted light. In some embodiments, the PBP grating 300 may be a passive grating, and the optical state of the PBP grating 300 may depend on the handedness of a circularly polarized input beam, the handedness of the rotation of the orientations of the directors of the LC molecules 302 at the surface (e.g., at least one of the first surface 301-1 or the second surface 301-2) of the birefringent film 302.

An orientation of the PBP grating 300 may be referred to as an in-plane direction that is a direction of the periodicity of the grating. Alternatively, the in-plane direction may be a direction parallel to the direction of the periodicity of the PBP grating 300. In FIG. 3A, the orientation of the PBP grating 300 is represented by an arrow 308. A clocking angle of the PBP grating 300 may be referred to as an angle formed between a predetermined in-plane reference direction and the orientation of the PBP grating 300. In FIG. 3A, the predetermined in-plane reference direction is presumed to be the +x-axis direction. Thus, the clocking angle of the PBP grating 300 may be 0°. The orientations 308 (or clocking angles) of the PBP gratings 300 may be adjustable, e.g., via movable stages coupled to the PBP gratings 300.

For example, as shown in FIG. 3A, when the clocking angle of the PBP grating 300 is configured to be 0° or the orientation of the PBP grating 300 is configured to be in the +x-axis direction, the PBP grating 300 may be configured to operate in a positive state to forwardly diffract the RHCP beam S312 in a positive angle (e.g., +θ). The PBP grating 300 may operate in a negative state for an LHCP beam S311 (having a wavelength in a predetermined wavelength range), and may forwardly diffract the LHCP beam S311 in a negative angle (e.g., −θ). The PBP grating 300 operating in the positive state or the negative state may reverse the handedness of a circularly polarized beam transmitted therethrough while diffracting the circularly polarized beam. For example, as shown in FIG. 3A, the PBP grating 300 may forwardly diffract the RHCP beam S312 to an LHCP beam S314 (e.g., $+1^{st}$ order diffracted beam), and forwardly diffract the LHCP beam S311 to an RHCP beam S313 (e.g., $-1^{st}$ order diffracted beam).

In some embodiments, when the clocking angle of the PBP grating 300 is changed to be 180° or the orientation of the PBP grating 300 is rotated to be in the −x-axis direction, the PBP grating 300 may be configured to operate in a positive state for an LHCP beam to forwardly diffract the LHCP beam in a positive angle (e.g., +θ). The PBP grating 300 may operate in a negative state for an RHCP beam to forwardly diffract the RHCP beam in a negative angle (e.g., −θ). When the clocking angle of the PBP grating 300 is gradually changed from 0° to 180° (or the orientation of the PBP grating 300 is gradually changed from along the +x-axis direction to along the −x-axis direction), a diffraction angle of the RHCP beam may be gradually changed from the positive angle (e.g., +θ) to the negative angle (e.g., −θ), and a diffraction angle of the LHCP beam may be gradually changed from the negative angle (e.g., −θ) to the positive angle (e.g., +θ). That is, the diffraction angle of a diffracted beam may change as the clocking angle of the PBP grating 300 is changed.

Figure 3B:
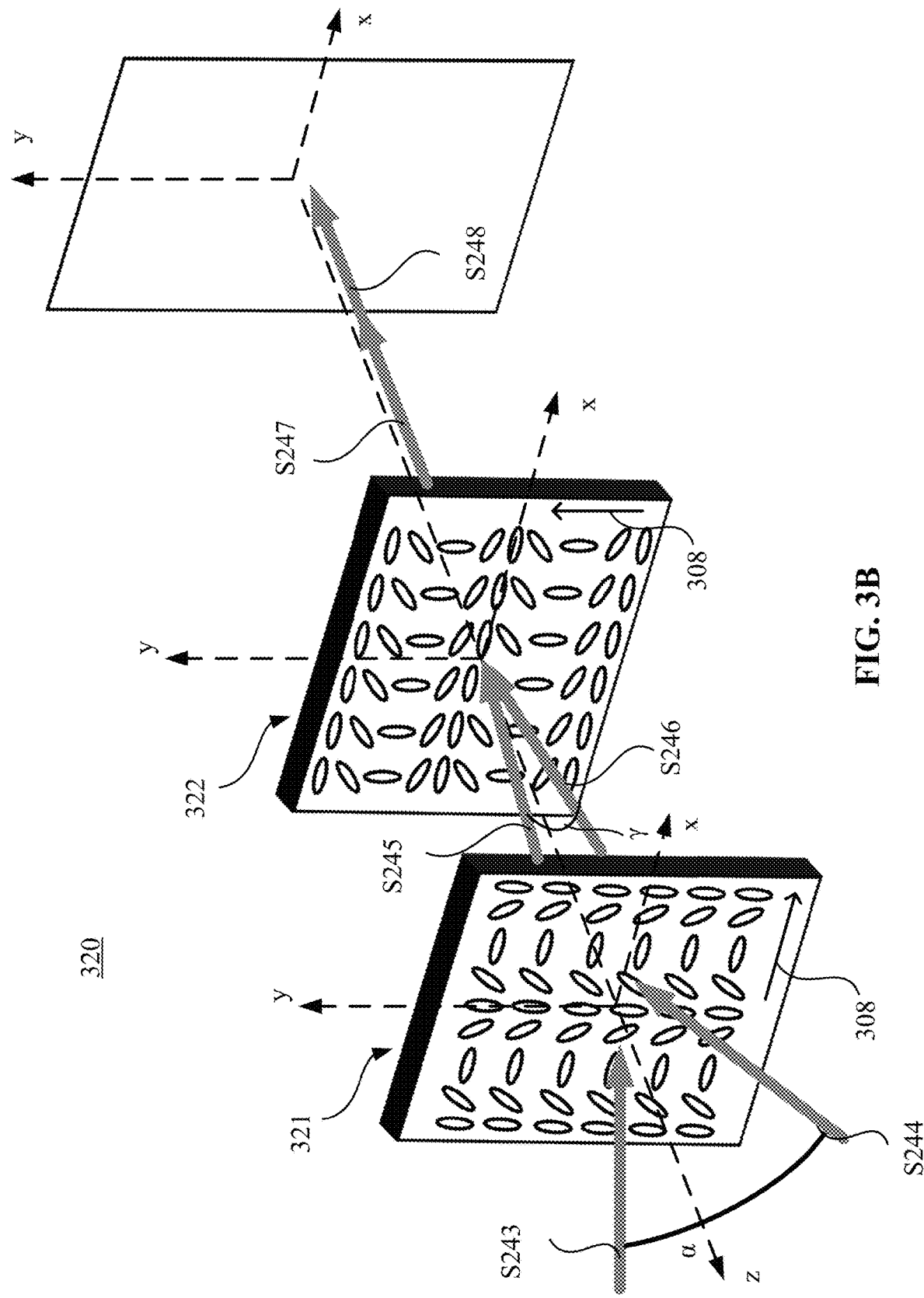
FIG. 3B schematically illustrates a diagram of a diffractive optical element functioning as a beam combiner and including a pair of PBP gratings, according to an embodiment of the present disclosure.

FIG. 3B schematically illustrates a diagram of a beam combiner 320 including a pair of PBP gratings: a first PBP grating 321 and a second PBP grating 322, according to an embodiment of the present disclosure. At least one (e.g., each) of the first PBP grating 321 or the second PBP grating 322 may be an embodiment of the PBP grating 300 shown in FIG. 3A. The beam combiner 320 may be an embodiment of the beam combiner 220 shown in FIG. 2A and other figures. As shown in FIG. 3B, the PBP gratings 321 and 322 may be arranged in parallel. In some embodiments, the PBP gratings 321 and 322 may be physically identical, e.g., have the same parameters and the same optical properties. For example, the PBP gratings 321 and 322 may be configured with the same size and the same in-plane pitch. In some embodiment, the PBP gratings 321 and 322 may be configured with different parameters and/or different optical properties. In the embodiment shown in FIG. 3B, the PBP gratings 321 and 322 may be configured with the same parameters.

An orientation of the PBP grating 321 or 322 may be referred to as an in-plane direction that is a direction of the periodicity of the grating. Alternatively, the in-plane direction may be a direction parallel to the direction of the periodicity of the PBP grating 321 or 322. In FIG. 3B, the orientation of the PBP grating 321 or 322 is represented by an arrow 308. A clocking angle of the PBP grating 321 or 322 may be referred to as an angle formed between a predetermined in-plane reference direction and the orientation of the PBP grating 321 or 322. In FIG. 3B, the predetermined in-plane reference direction is presumed to be the +x-axis direction. The orientations 308 (or clocking angles) of the PBP gratings 321 and 322 may be independently adjustable, e.g., via movable stages coupled to the PBP gratings 321 and 322. Through configuring the orientations 308 (or clocking angles) of the PBP gratings 321 and 322, the beam combiner 320 may be configured to combine the input beams S243 and S244 through forward diffraction, and output the beams S247 and S248. For discussion purposes, in the embodiments shown in FIG. 3B, the orientation 308 of the PBP grating 321 may be configured to be in the x-axis direction, and the clocking angle may be zero degree. The orientation 308 of the PBP grating 322 may be configured to be in the y-axis direction, and the clocking angle may be 90 degrees.

The beam combiner 320 shown in FIG. 3B may be an embodiment of the beam combiner 220 shown in FIG. 2A and other figures, the PBP grating 321 shown in FIG. 3B may be an embodiment of the grating 221 shown in FIG. 2A and other figures, and the PBP grating 322 shown in FIG. 3B may be an embodiment of the grating 222 shown in FIG. 2A and other figures. In some embodiments, the system shown in FIG. 2A may be a polarization interference system, and the recording beams S241 and S242 may be coherent, circularly polarized beams having opposite handednesses. The recording beams S241 and S242 may be transmitted through the recording medium 210 as the beams S243 and S244. The recording medium 210 is presumed to substantially maintain a polarization of a beam transmitted therethrough. Thus, the beams S243 and S244 incident onto the beam combiner 320 (or 220) may be circularly polarized beams having opposite handednesses. For example, the beam S243 may be an RHCP beam, and the beam S244 may be an LHCP beam.

As shown in FIG. 3B, the PBP grating 321 (or the grating 221) may be configured to forwardly diffract the RHCP beam S243 to a beam S245 (e.g., a $+1^{st}$ order diffracted LHCP beam) having a positive diffraction angle, and forwardly diffract the LHCP beam S244 to a beam S246 (e.g., $-1^{st}$ order diffracted RHCP beam) having a negative diffraction angle. In some embodiments, an angle γ between the beam S245 and the beam S246 may be smaller than the angle α between the beam S243 and the beam S244, i.e., γ<α. In some embodiments, referring to FIG. 2C and FIG. 2E, an angle γ between the beam S245 and the beam S246 may be larger than the angle α between the beam S243 and the beam S244, i.e., γ>α.

Referring to FIG. 3B, the PBP grating 322 (or the grating 222) may be configured to forwardly diffract the LHCP beam S245 to a $+1^{st}$ order diffracted RHCP beam S247. The PBP grating 322 (or the grating 222) may forwardly diffract the RHCP beam S246 to a $-1^{st}$ order diffracted LHCP beam S248 substantially overlapping with the $+1^{st}$ order diffracted RHCP beam S247. In some embodiments, the angel β (not shown) between the beams S248 and S247 may be smaller than the angle γ between the beams S245 and S246, i.e., β<γ. In some embodiments, the angles between the pairs of two beams (e.g., beams S243 and S244, beams S245 and S246, and beams S247 and S248) may satisfy the following relationship: β<γ<α. In some embodiments, the angles may satisfy the following relationship: γ>α>β. In some embodiments, the angel β between the beams S248 and S247 may be substantially zero. In some embodiments, the diffraction angles of the beams S248 and S247 may be substantially zero.

The RHCP beam S248 and the LHCP beam S247 output from the beam combiner 320 (or the beam combiner 220) may interfere with one another to generate a polarization interference pattern. The polarizer 245 may be configured to convert the polarization interference pattern to be an intensity interference pattern that is detected by the detector 230. In some embodiments, the angel β between the beams S248 and S247 may be smaller than the angle α between the beam S243 and the beam S244, i.e., β<α, and the angle γ between the beams S245 and S246 may be equal to one of the angel β between the beams S248 and S247 and the angle α between the beam S243 and the beam S244.

Figure 2G:
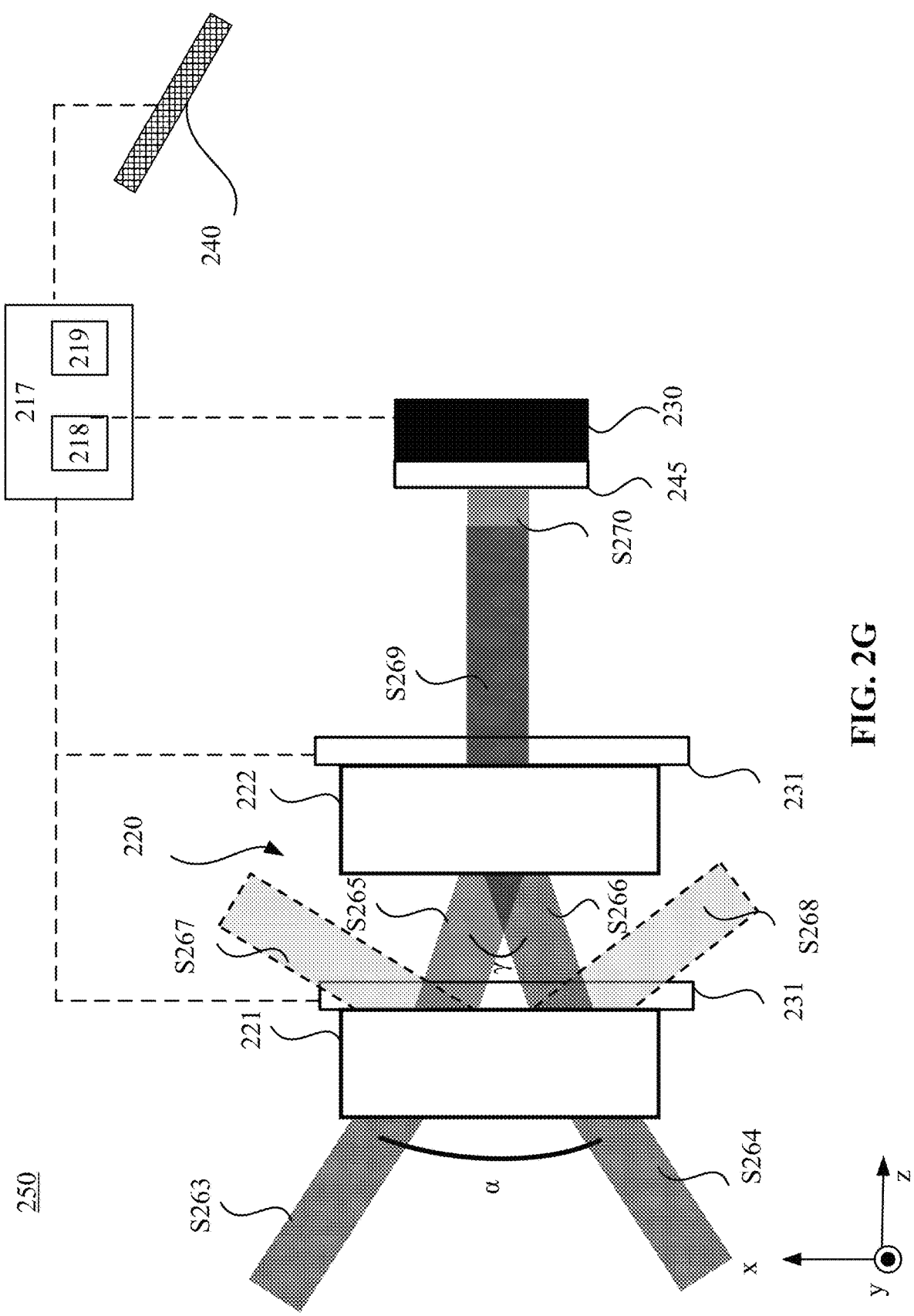
FIG. 2G schematically illustrates diffractions of input beams by the fringe stabilization mechanism shown in FIGS. 2B and 2C, according to an embodiment of the present disclosure.

In some embodiments, the system shown in FIG. 2A may be an intensity interference system, e.g., the recording beams S241 and S242 may be coherent linearly polarized beams having the same polarization direction. FIG. 2G schematically illustrates optical paths in the fringe stabilization mechanism 250 when the system 200 is an intensity interface system. The beam combiner 320 shown in FIG. 3B may be an embodiment of the beam combiner 220 shown in FIG. 2A and FIG. 2G, the PBP grating 321 shown in FIG. 3B may be an embodiment of the grating 221 shown in FIG. 2A and FIG. 2G, and the PBP grating 322 shown in FIG. 3B may be an embodiment of the grating 222 shown in FIG. 2A and FIG. 2G.

Referring to FIG. 2A and FIG. 2G, the recording beams S241 and S242 may propagate through the recording medium 210 as beams S263 and S264 that are incident onto the beam combiner 220. The beams S263 and S264 may be linearly polarized beams having planar wavefronts and the same polarization direction. A linearly polarized beam may include an RHCP component and an LHCP component. For discussion purposes, in FIG. 2G, the PBP grating 221 may be configured to forwardly diffract the RHCP component of the beam S263 to a $+1^{st}$ order diffracted LHCP beam S265 having a positive diffraction angle, and forwardly diffract the LHCP component of the beams S263 to a $-1^{st}$ order diffracted RHCP beam S267 having a negative diffraction angle. The PBP grating 221 may be configured to forwardly diffract the RHCP component of the beam S264 to a $+1^{st}$ order diffracted LHCP beam S268 having a positive diffraction angle, and forwardly diffract the LHCP component of the beam S264 to a $-1^{st}$ order diffracted RHCP beam S266 having a negative diffraction angle. In some embodiments, an angle γ between the beams S265 and S266 may be smaller than the angle α between the beams S263 and S264, i.e., γ<α. In some embodiments, an angle γ between the beams S265 and S266 may be larger than the angle α between the beams S263 and S264, i.e., γ>α.

The PBP grating 222 may be configured with a suitable size and position, such that the grating 222 may receive the LHCP beam S265 and the RHCP beam S266, and may not receive the RHCP beam S267 and the LHCP beam S268. The PBP grating 222 may be configured to diffract the LHCP beam S265 to a $+1^{st}$ order diffracted RHCP beam S269, and diffract the RHCP beam S266 to a $-1^{st}$ order diffracted LHCP beam S270 substantially overlapping with the beam S269. The angel β (similar to that shown in FIG. 2F) between the beams S269 and S270 may be smaller than the angle γ between the beams S265 and S266 (i.e., β<γ), and smaller than the angle α between the beams S263 and S264 (i.e., β<α). In some embodiments, in the embodiment shown in FIG. 2G, the angel β (not shown) between the beams S269 and S270 may be substantially zero (e.g., the beams S269 and S270 may be overlapping collimated beams). In some embodiments, the diffraction angles of the beams S269 and S270 may be substantially zero (i.e., perpendicular to the beam exit surface of the grating 222). The RHCP beam S269 and the LHCP beam S270 output from the beam combiner 220 may interfere with one another to generate a polarization interference pattern. The polarizer 245 may be configured to convert the polarization interference pattern to an intensity interference pattern that is detected by the detector 230.

Figure 2H:
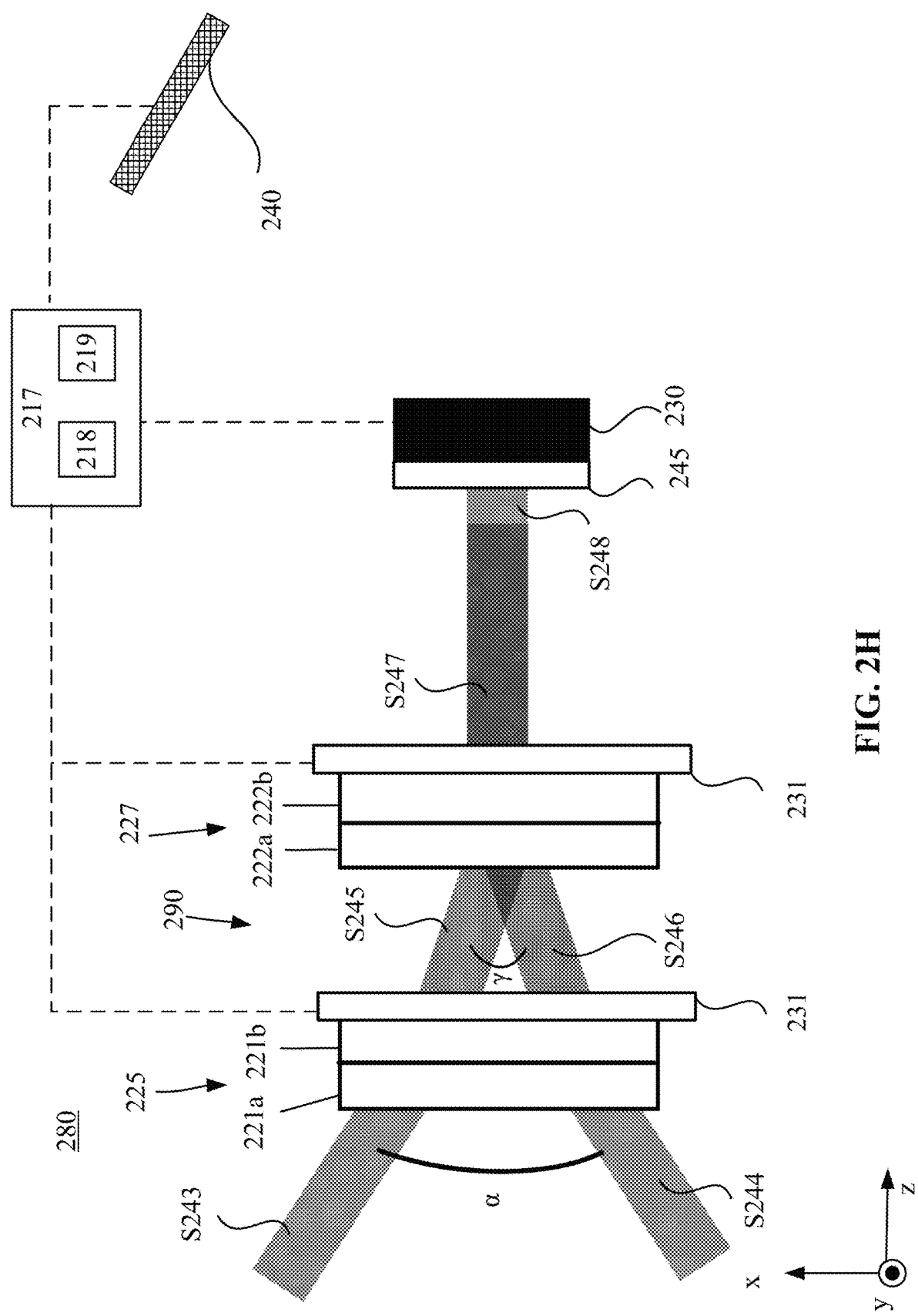
FIG. 2H schematically illustrates diffractions of input beams by a fringe stabilization mechanism that may replace the fringe stabilization mechanism shown in FIGS. 2B and 2C, according to an embodiment of the present disclosure.

In some embodiments, to further increase the adjustment range of the recording angle α of the system 200 (or adjustment range of the recording periodicity provided by the system 200), at least one (e.g., each) of the single grating 221 or the single grating 222 included in the beam combiner 220 shown in FIGS. 2A-2D may be replaced by a grating set including a plurality of gratings. FIG. 2H schematically illustrates a fringe stabilization mechanism 280 that may be included in the interference system 200 shown in FIG. 2A, replacing the fringe stabilization mechanism 250, according to an embodiment of the present disclosure. The fringe stabilization mechanism 280 may include elements, structures, and/or functions that are the same as or similar to those included in the fringe stabilization mechanism 250 shown in FIGS. 2A-2G. Descriptions of the same or similar elements, structures, and/or functions can refer to the above descriptions rendered in connection with FIGS. 2A-2G. For example, the fringe stabilization mechanism 280 may include the reconfigurable reflector 240, a diffractive optical element 290 functioning as a beam combiner (also referred to as a beam combiner 290), the detector 230, and the controller 217. In some embodiments, the fringe stabilization mechanism 280 may also include the polarizer 245 disposed between the detector 230 and the beam combiner 290. In some embodiments, the polarizer 245 may be omitted.

As shown in FIG. 2H, the beam combiner 290 may include a first grating set 225 and a second grating set 227. In some embodiments, each of which may include two or more gratings stacked together. In some embodiments, one of the first grating set 225 and the second grating set 227 may include a single grating, and the other one may include two or more gratings stacked together. For discussion purposes, FIG. 2H shows that the first grating set 225 includes two first gratings 221a and 221b (collectively referred to as first gratings 221) stacked together, and the second grating set 227 includes two second gratings 222a and 222b (collectively referred to as second gratings 222) stacked together. The first grating set 225 or the second grating set 227 may include other suitable number of first gratings or second gratings, such as three, four, five, or six, etc. The number of the first gratings 221 in the first grating set 225 may be equal to or different from the number of the second gratings 222 in the second grating set 227.

In some embodiments, the gratings 221 or 222 included in a corresponding grating set may be structurally identical (e.g. having the same size and the same period). For example, the first gratings 221 in the first grating group 225 may be structurally identical, and the second gratings 222 in the second grating group 227 may structurally identical. In some embodiments, the first gratings 221 and the second gratings 222 included in the grating sets 225 and 227 may have the same or similar structures. Although the embodiment shown in FIG. 2H is based on the embodiment shown in FIG. 2B, it is understood that the grating set embodiment shown in FIG. 2H may be applicable to other embodiments shown in FIG. 2C and FIG. 2G.

In some embodiments, the gratings 221 or 222 included in a corresponding grating set may be oriented in a substantially same orientation, which may be referred to as an orientation of the grating set 225 or 227. A clocking angle of the grating set 225 or 227 may be referred to as an angle formed between a predetermined in-plane reference direction and the orientation of the grating set 225 or 227. The first grating set 225 and the second grating et 227 may be configured to be independently or individually rotatable to adjust orientations (or clocking angles) thereof. For example, the first grating set 225 and the second grating et 227 may be mounted onto respective movable states 231. In some embodiments, the two or more first gratings 221 included in the first grating set 225 may be independently or individually rotatable to adjust an overall clocking angle of the first grating set 225. The two or more second gratings 222 included in the second grating set 227 may be independently or individually rotatable to adjust an overall clocking angle of the second grating set 227.

In some embodiments, as shown in FIG. 2H, each of the first grating set 225 and the second grating set 227 may be mounted on the movable stage 231. The movable stage 231 may be configured to be rotatable, thereby rotating the grating set 225 or 227 around one or more rotation axes (e.g., the yaw, roll, and/or pitch axes) defined locally with respect to the movable stage 231. For example, in FIG. 2H, the orientation of the grating set 225 or 227 may be presumed to be in the x-y plane, and the predetermined in-plane reference direction presumed to be the +x-axis direction. A clocking angle of the grating set 225 or 227 may be referred to as an angle between the orientation of the grating set 225 or 227 and the +x-axis direction. Through rotating, via the movable stage 231, the grating set 225 or 227 around a common axis (e.g., an axis passing through the centers of the grating sets 225 and 227), the orientation (or the clocking angle) of the grating set 225 or 227 may be adjustable. In some embodiments, the movable stage 231 may also be configured to be translatable, thereby translating the grating set 225 or 227 in one or more directions (e.g., in an x-axis direction, a y-axis direction, and/or a z-axis direction). In some embodiments, the controller 217 may be communicatively coupled with the movable stages 231, and may control the orientations and/or movements of the movable stage 231.

The orientations (or clocking angles) of the first grating set 225 and the second grating set 227 may be configured in a way that is similar to the grating 221 and the grating 222 shown in FIGS. 2A-2G, such that the beam combiner 290 including the first grating set 225 and the second grating set 227 may be configured to combine the input beams S243 and S244 through forward diffraction. For example, for a predetermined recording angle α, each of the first grating set 225 and the second grating set 227 may be configured to be oriented in a predetermined orientation (or oriented to have a predetermined clocking angle), such that the beam combiner 290 may be configured to combine the input beams S243 and S244 through forward diffraction. When the value of the recording angle α changes, the orientation (or clocking angle) of at least one of the first grating set 225 or the second grating set 227 may be adjusted, such that the beam combiner 290 may still be configured to combine the input beams S243 and S244 through forward diffraction. For example, when the recording angle α is configured to be a first value, the first grating set 225 and the second grating set 227 may be rotated around the common axis, via the movable stages 231, to be oriented in a first orientation (or oriented to have a first clocking angle) and a second orientation (or oriented to have a second clocking angle), respectively. Thus, the beam combiner 290 may be configured to combine the input beams S243 and S244 having the recording angle α of the first value therebetween through forward diffraction.

When the recording angle α is changed to be a second, different value (e.g., via rotating the movable stage coupled with the reflector 213a or 213b in FIG. 2A), at least one of the first grating set 225 or the second grating set 227 may be rotated around the common axis, via the corresponding movable state 231, thereby changing the orientation (or clocking angle). For example, the first grating set 225 may be rotated to be oriented in a third orientation different from the first orientation, and the second grating set 227 may be rotated to be oriented in a fourth orientation different from the second orientation. Thus, the beam combiner 290 may be configured to combine the input beams S243 and S244 having the recording angle α of the second value therebetween through forward diffraction. Similar to the beam combiner 220 shown in FIGS. 2A-2G, the beam combiner 290 shown in FIG. 2H may be configured to combine two circularly polarized beams or two linearly polarized beams.

The diffractive optical element 220 as shown in FIGS. 2A-2G and the diffractive optical element 290 as shown in FIG. 2H may reduce the size of the fringe (or interference pattern) stabilization mechanism, and increase the adjustment range of the recording angle α, as compared to conventional technologies. With the disclosed fringe (or interference pattern) stabilization mechanism, the adjustment range of the periodicity of the recording interference pattern may not be limited by the size of the diffractive optical element 220 (or the diffractive optical element 290). Thus, the disclosed fringe (or interference pattern) stabilization mechanism may be implemented into interference systems for increasing the adjustment range of the periodicity of the recording interference pattern, and enhancing the accuracy of detecting the vibration in the interference pattern. As a result, a more robust stability control of the interference pattern may be achieved by the disclosed fringe stabilization mechanism. High quality holograms with fine pitches may be fabricated based on the interference system implemented with the disclosed fringe stabilization mechanism.

Referring to FIGS. 2A-2H, for discussion purposes, the first recording beam S241 and the second recording beam S242 are shown as plane recording waves, and the input beams S243, S244, S263, and S264 of the beam combiner 220 or 290 are shown as plane input waves accordingly. Although not shown, in some embodiments, at least one the first recording beam S241 or the second recording beam S242 may be a non-plane wave, e.g., a spherical wave, an aspherical wave, a cylindrical wave, or a freeform wave, etc. For example, the system 200 may include one or more lenses (e.g., spherical lenses, aspherical lenses, cylindrical lenses, or freeform lenses, etc.) disposed between the reflectors 213a and 213b and the recording medium 210, and configured to convert a corresponding recording beam into a non-plane recording wave. Accordingly, at least one of the input beams S243, S244, S263, and S264 of the beam combiner 220 or 290 may be a non-plane input wave. In some embodiments, the non-plane input wave may be directly incident onto the beam combiner 220 or 290. In some embodiments, the fringe stabilization mechanism 250 or 280 may include one or more optical elements configured to transform the non-plane input wave into a plane input wave that is incident onto the beam combiner 220 or 290.

Referring to FIGS. 2A-2H, the interference system shown in FIG. 2A is for illustrative purposes to explain the mechanism for stabilizing the interference pattern via the fringe stabilization mechanism disclosed herein. The mechanism for stabilizing the interference pattern via the fringe stabilization mechanism disclosed herein may be applicable to any suitable intensity interference systems and any suitable polarization interference systems. The PBP gratings shown in FIGS. 3A and 3B are for illustrative purposes. Any suitable polarization selective gratings may be used in the beam combiner to combine two beams, following the same or similar design principles described herein with respect to the embodiments of the PBP gratings. For example, the polarization selective gratings may include suitable subwavelength structures, a birefringent material (e.g., liquid crystals), a photo-refractive holographic material, or any combination thereof.

Referring to FIGS. 2A-2H, in the interference system 200 including the fringe stabilization mechanism, the adjustment range of the recording angle α may not depend on the sizes of the gratings 221 and 222 included in the beam combiner 220 or 290. Instead, the adjustment range of the recording angle α may depend on the diffraction powers of the gratings 221 and 222 included in the beam combiner 220 or 290. Accordingly, the adjustment range of the recording periodicity (or pitch) provided by the interference system 200 may depend on the diffraction powers of the gratings 221 and 222 included in the beam combiner 220 or 290. The adjustment range of the recording angle α (or the recording periodicity (or pitch)) may be increased by using gratings having large diffraction powers (or large diffraction angles), and/or increasing the number of gratings included in the beam combiner 220 or 290.

Compared to conventional interference systems (e.g., the conventional interference system 100 shown in FIG. 1), the disclosed interference system 200 including the fringe stabilization mechanism may be configured to have a large adjustment range of the recording angle α and a small form factor. Thus, the interference system 200 including the fringe stabilization mechanism may be configured to increase the adjustment range of the recording periodicity (or pitch) in both intensity holograms (e.g., holographic optical elements ("HOEs"), volume Bragg gratings ("VBGs"), surface relief gratings ("SRGs"), etc.) and polarization holograms (e.g., GP or PBP elements, PVHs, etc.). In addition, the interference system 200 including the fringe stabilization mechanism may enhance the quality and yield of holograms in mass-production. For example, the interference system 200 including the fringe stabilization mechanism may be used to fabricate high quality holograms with fine pitches (e.g., 200 nm-800 nm). The interference system 200 including the fringe stabilization mechanism may be used to fabricate high quality holograms functioning as various transmissive or reflective optical elements, such as lenses, gratings, waveplates, waveguides, etc.

In the following, polarization holograms (e.g., GP or PBP elements, PVH elements, etc.) are used as examples to explain the mechanism for using an interference system including the disclosed fringe stabilization mechanism to fabricate high quality holograms. A PBP element may modulate a circularly polarized light based on a phase profile provided through a geometric phase. A PVH element may modulate a circularly polarized light based on Bragg diffraction. An optic axis of a PVH element or a PBP element may have a spatially varying orientation in at least one in-plane direction, e.g., periodically or non-periodically varying in at least one in-plane linear direction, at least one in-plane radial direction, at least one in-plane circumferential (e.g., azimuthal) direction, or a combination thereof. The optic axis of a PVH element or a PBP element may also have a spatially varying orientation in an out-of-plane direction.

Polarization holograms have features such as small thickness (~1 um), light weight, compactness, larger aperture, high efficiency, etc. Polarization holograms have gained increasing interests in optical device and system applications, e.g., near-eye displays ("NEDs"), head-up displays ("HUDs"), head-mounted displays ("HMDs"), smart phones, laptops, or televisions, etc. For example, LCPHs may be used for addressing accommodation-vergence conflict, enabling thin and highly efficient eye-tracking and depth sensing in space constrained optical systems, developing optical combiners for image formation, correcting chromatic aberrations for image resolution enhancement of refractive optical elements in compact optical systems, and improving the efficiency and reducing the size of optical systems.

Polarization holograms may be fabricated based on liquid crystals ("LCs") or birefringent photo-refractive holographic materials other than LCs. Polarization holograms fabricated based on liquid crystal materials may be referred to as liquid crystal polarization holograms ("LCPHs"). An interference system including the fringe stabilization mechanism disclosed herein may be used to fabricate polarization holograms based on LCs (i.e., LCPHs) and polarization holograms based on birefringent photo-refractive holographic materials other than LCs.

In some embodiments, referring to FIGS. 2A-2H, the first recording beam S241 and the second recording beam S242 may be configured as two coherent circularly polarized beams having planar wavefronts and opposite handednesses. The interference of the first recording beam S241 and the second recording beam S242 may generate a polarization interference pattern, in which the orientation of the linear polarization periodically may vary in an in-plane direction, e.g., the x-axis direction. Such a polarization interference pattern (e.g., a pattern of the periodic spatial variation of the orientation of the linear polarization) may be used for defining or recording a grating pattern in the recording medium 210. In some embodiments, the first recording beam S241 and the second recording beam S242 may be two coherent circularly polarized beams having opposite handednesses, and at least one of the first recording beam S241 and the second recording beam S242 may have a non-planar wavefront. The interference of the first recording beam S241 and the second recording beam S242 may generate a polarization interference pattern, in which the orientation of the linear polarization may continuously vary in at least two opposite in-plane directions from a center of the pattern to the opposite peripheries of the pattern with a varying (e.g., decreasing) pitch. Such a polarization interference pattern may be configured for defining or recording a lens pattern (e.g., spherical lens pattern) in the recording medium 210.

According to the wavefronts of the first recording beam S241 and the second recording beam S242, the generated polarization interference pattern may be configured for defining or recording various patterns in the recording medium 210 in addition to the grating pattern and lens pattern.

The recording medium 210 may include an optically recordable and polarization sensitive material (e.g., a photo-alignment material) configured to have a photo-induced optical anisotropy when exposed to a polarized light irradiation. Molecules (or fragments) and/or photo-products of the optically recordable and polarization sensitive material may be configured to generate an orientational ordering under a polarized irradiation. When exposed to the polarization interference pattern generated by the first recording beam S241 and the second recording beam S242, molecules (or fragments) and/or photo-products of the recording medium 210 may be aligned according to the local orientations of the linear polarization in the polarization interference pattern. In other words, the recording medium 210 may be optically patterned with an orientation pattern of an optic axis of the recording medium 210. For example, when exposed to the polarization interference pattern, the molecules (or fragments) and/or photo-products of the recording medium 210 may be aligned to have an in-plane orientation pattern corresponding to a grating pattern, or a lens pattern, etc. In some embodiments, the recording medium 210 may include a volume recording medium, and the optically patterned recording medium 210 (or the recorded hologram) itself may function as an polarization selective optical element or device. In some embodiments, the recording medium 210 may include a surface recording medium, and the optically patterned recording medium 210 (or the recorded hologram) may function as an photo-alignment material ("PAM") layer for fabricating a polarization selective optical element or device.

Referring to FIGS. 2A-2H, using the interference system including the disclosed fringe stabilization mechanism, the same polarization interference pattern or different polarization interference patterns may be recorded in different regions or portions of the recording medium 210 through multiple exposures. In some embodiments, the same polarization interference pattern may be recorded at different portions of the recording medium 210 to obtain a large-sized polarization hologram. In some embodiments, different polarization interference patterns may be recorded at different portions of the recording medium 210. For example, between two exposures, the recording portions may be changed by changing the position and/or the orientation of the recording medium 210 relative to a recording beam. For example, a substrate on which the recording medium 210 is disposed may be mounted on a movable stage (e.g., similar to the movable stage 231 shown in FIGS. 2B-2H).

A controller (e.g., the controller 217 shown in FIGS. 2A-2H) may be coupled to the movable stage and control the movable stage to translate and/or rotate to change the position and/or the orientation of the recording medium 210 relative to the recording beam. In some embodiments, changing the polarization interference pattern may include changing an opening area (or an exposed area) of the recording medium 210, such that a size and/a shape of the polarization interference pattern that is recorded in the recording medium 210 may be changed. For example, an iris diaphragm may be coupled to the recording medium 210. In some embodiments, the controller 217 may control an adjustment mechanism coupled with the iris diaphragm to adjust an opening area of the iris diaphragm, thereby adjusting the size and/or the shape of the polarization interference pattern that is recorded into the recording medium 210.

Figure 4A:
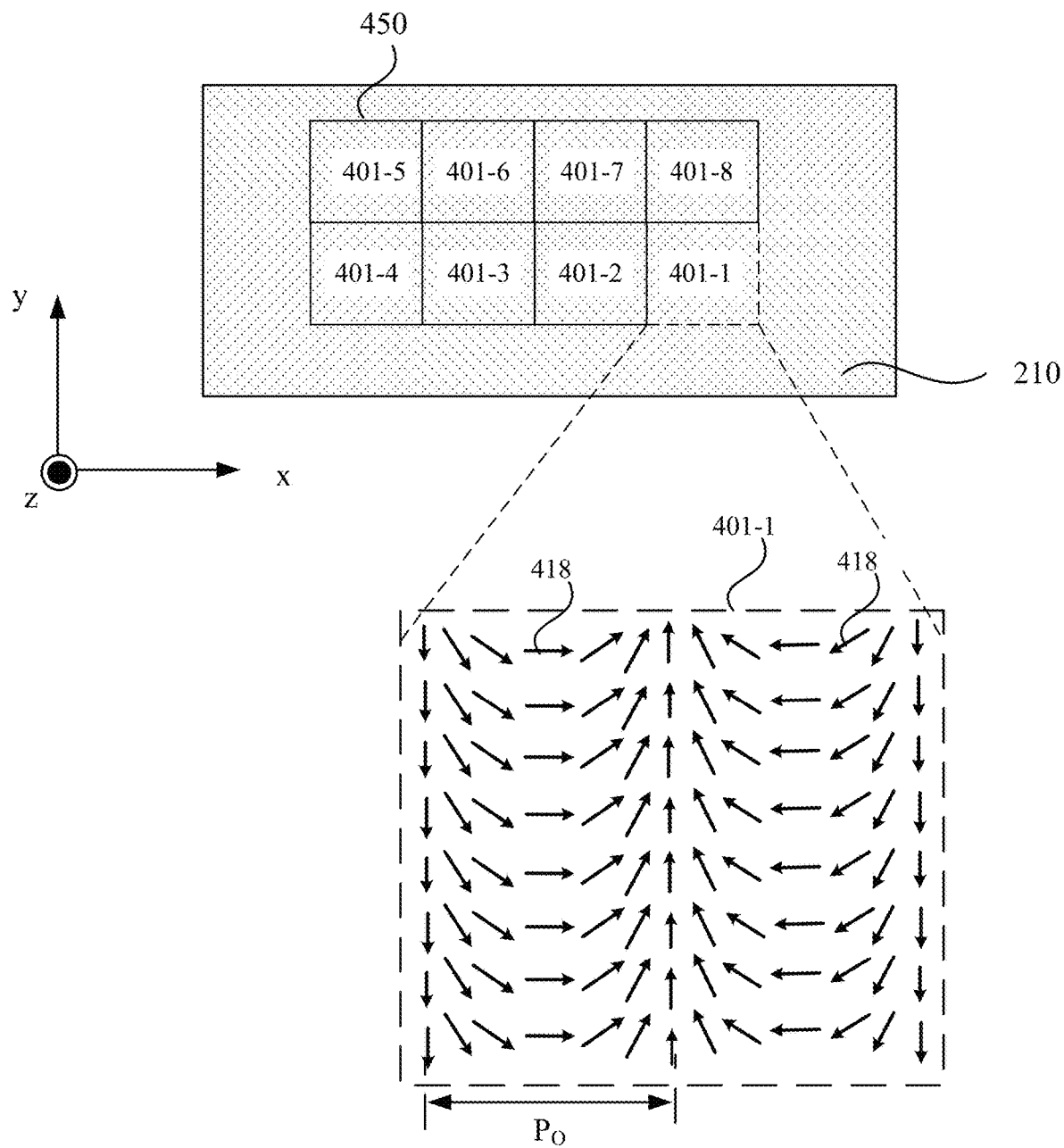
FIGS. 4A-4C schematically illustrate patterns of spatially varying orientations of a linear polarization recorded in different portions of a recording medium layer, according to various embodiments of the present disclosure.
Figure 4B:
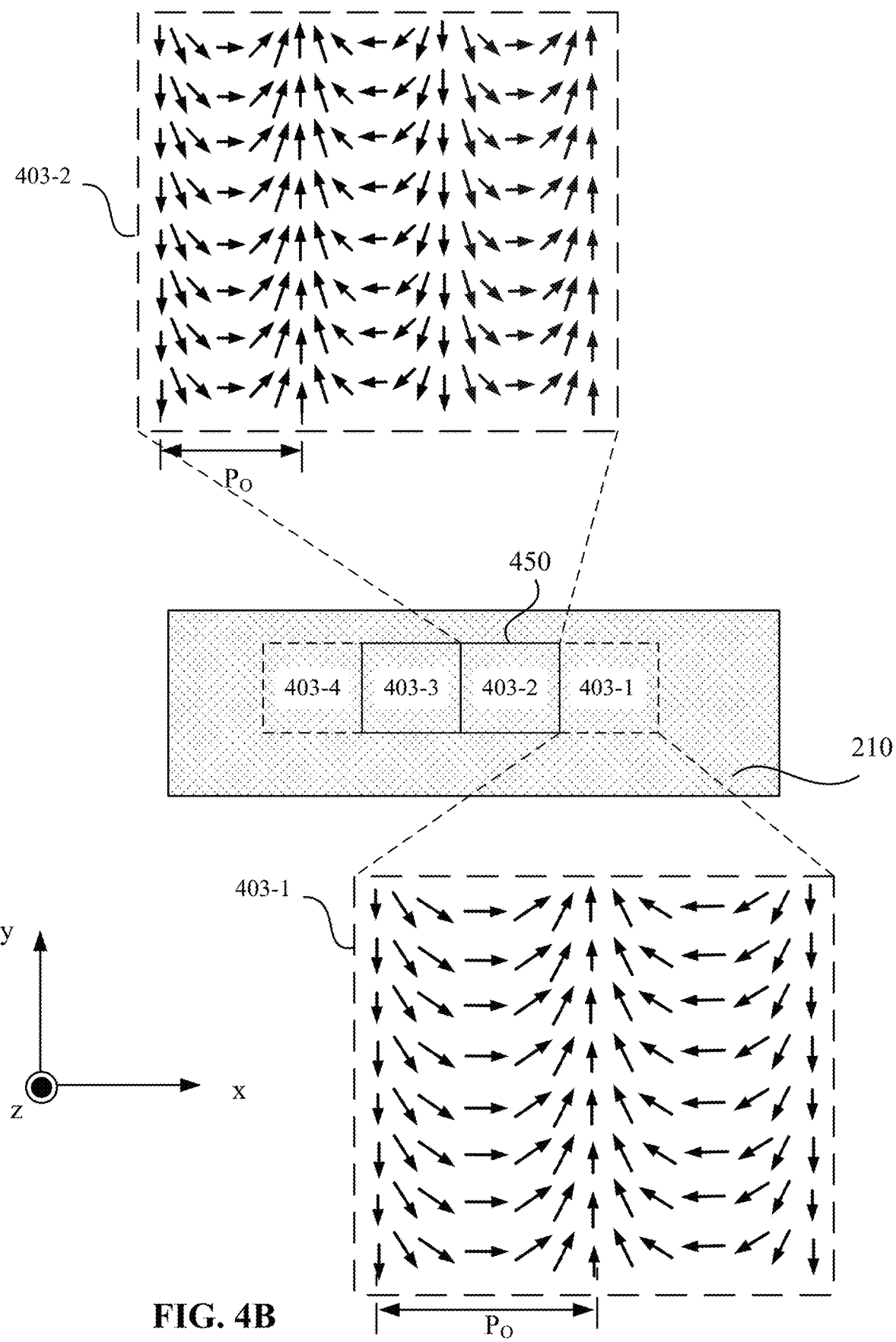
Figure 4C:
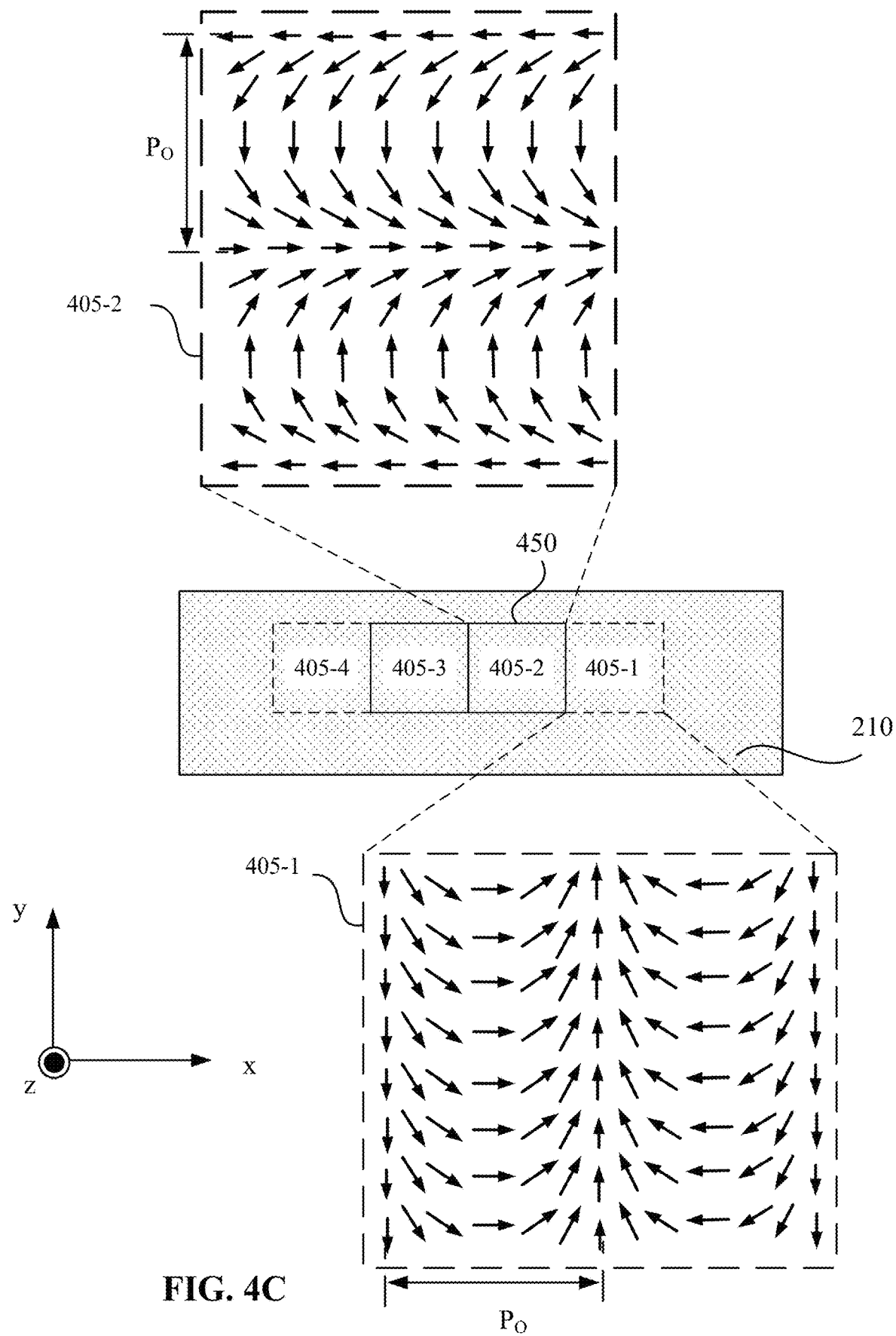

FIGS. 4A-4C schematically illustrate x-y sectional views of orientation patterns of the optic axis of the recording medium 210 defined in different portions of the recording medium layer 210 via an interference system including a disclosed fringe stabilization mechanism, according to various embodiments of the present disclosure. For example, the interference system may include the fringe stabilization mechanism 250 shown in FIGS. 2A-2G or the fringe stabilization mechanism 280 shown in FIG. 2H. The recording medium 210 may be a polarization recording medium in a form of a layer. The recording medium 210 may also be referred to as recording medium layer 210. For discussion purposes, in FIGS. 4A-4C, the orientation patterns of the optic axis of the recording medium layer 210 may correspond to grating patterns. For example, the orientation patterns of the optic axis of the recording medium layer 210 are defined in different portions of the recording medium layer 210, via the system 200 including the fringe stabilization mechanism 250 shown in FIGS. 2A-2G or the fringe stabilization mechanism 280 shown in FIG. 2H.

FIGS. 4A-4C schematically illustrate the periodic variation of the orientations of the optic axis of the recording medium layer 210 in one or two portions of the of the recording medium layer 210. In FIGS. 4A-4C, the arrows 418 represent the optic axis and the orientations of the optic axis. For discussion purposes, in FIGS. 4A-4C, an opening area or aperture size of the recording medium layer 210 may be substantially the same as a size of a predetermined region 450 of the recording medium layer 210 that is exposed to the polarization interference pattern during one exposure. An opening shape or aperture shape of the recording medium layer 210 may be a shape of the predetermined region 450, e.g., a square shape, a rectangular shape, a circular shape, etc.

FIG. 4A shows a plurality of orientation patterns of the optic axis of the recording medium layer 210 defined in a plurality of different portions of the recording medium layer 210 through multiple exposures. The plurality of orientation patterns of the optic axis of the recording medium layer 210 in different portions of the recording medium layer 210 may correspond to a plurality of grating patterns having the same grating period and the same grating orientation. For example, as shown in FIG. 4A, eight orientation patterns 401-1 to 401-8 of the optic axis of the recording medium layer 210 may be defined and/or recorded in eight different portions of the recording medium layer 210 through eight exposures. For different exposures, a substrate on which the recording medium layer 210 is disposed may be translated by the movable stage in the x-axis direction and y-axis direction. The eight patterns 401-1 to 401-8 may be arranged in a 2D array.

For illustrative purposes, FIG. 4A also shows the periodic variation of the orientation of the optic axis in the orientation pattern 401-1 in the enlarged view. For example, the orientations of the optic axis may periodically vary in an in-plane direction, e.g., the x-axis direction. In some embodiments, a pitch Po of the orientation pattern 401-1 may be referred to as a distance in the in-plane direction, over which the orientation of the optic axis exhibits a rotation by a predetermined angle (e.g., 180°). In some embodiments, the pitch Po of the orientation pattern 401-1 may correspond to an in-plane pitch Pin of a corresponding grating pattern. The eight orientation patterns 401-1 to 401-8 may correspond to eight grating patterns have the same size, the same in-plan pitch (or grating period), and the same grating orientation.

FIG. 4B shows a plurality of orientation patterns of the optic axis of the recording medium layer 210 defined and/or recorded in a plurality of different portions of the recording medium layer 210 through multiple exposures. The plurality of orientation patterns of the optic axis defined in different portions of the recording medium layer 210 may correspond to a plurality of grating patterns having different in-plane pitches (or grating periods) and the same grating orientation. For example, as shown in FIG. 4B, four orientation patterns 403-1 to 403-4 of the optic axis of the recording medium layer 210 may be defined in four different portions of the recording medium layer 210 through four exposures. For each exposure, the substrate on which the recording medium layer 210 is disposed may be translated by the movable stage in the x-axis direction.

The four orientation patterns 403-1 to 403-4 may be arranged in a 1D array. At least two of the four orientation patterns 403-1 to 403-4 may have different pitches. For illustrative purposes, FIG. 4B also shows the periodic variation of the orientations of the optic axis in the orientation pattern 403-1 and the orientation pattern 403-2 in the enlarged views. The pitch Po of the orientation pattern 403-1 may be different from (e.g., greater than) the pitch Po of the orientation pattern 403-2. Accordingly, the in-plane pitch of the grating pattern corresponding to the orientation pattern 403-1 may be different from (e.g., greater than) the in-plane pitch of the grating pattern corresponding to the orientation pattern 403-2.

FIG. 4C shows a plurality of orientation patterns of the optic axis of the recording medium layer 210 defined and/or recorded in a plurality of different portions of the recording medium layer 210 through multiple exposures. The plurality of orientation patterns of the optic axis defined in different portions (or regions) of the recording medium layer 210 may correspond to a plurality of grating patterns having different grating orientations and the same in-plane pitch (or grating period). For example, as shown in FIG. 4C, four orientation patterns 405-1 to 405-4 of the optic axis of the recording medium layer 210 may be defined in four different portions of the recording medium layer 210 through four exposures. For each exposure, the substrate on which the recording medium layer 210 is disposed may be translated by the movable stage in the x-axis direction. The four orientation patterns 405-1 to 405-4 may be arranged in a 1D array. At least two of the four orientation patterns 405-1 to 405-4 may have orientations of the optic axis periodically varying in different in-plane directions. The in-plane direction in which the orientations of the optic axis periodically varying may correspond to a grating orientation of a corresponding grating pattern.

For illustrative purposes, FIG. 4C also shows the periodic variations of the orientations of the optic axis in the orientation pattern 405-1 and the orientation pattern 405-2 in the enlarged views. For example, the orientation pattern 405-1 may have the orientation of the optic axis periodically varying in a first in-plane direction, e.g., the x-axis direction, and the orientation pattern 405-2 may have the orientation of the optic axis periodically varying in a second, different in-plane direction, e.g., the y-axis direction. Accordingly, the grating orientation of the grating pattern corresponding to the orientation pattern 405-1 may be different from the grating orientation of the grating pattern corresponding to the orientation pattern 405-2.

FIGS. 5A-5D schematically illustrate processes for fabricating an LCPH element through an interference system including a disclosed fringe stabilization mechanism, such as the fringe stabilization mechanism 250 shown in FIGS. 2A-2G, or the fringe stabilization mechanism 280 shown in FIG. 2H. The fabrication process shown in FIGS. 5A-5D may include holographic recording of an alignment pattern in a photo-aligning film, and alignment of an anisotropic material (e.g., an LC material) by the photo-aligning film. The holographic recording of an alignment pattern in a photo-aligning film may also be referred to as surface recording. This alignment process may be referred to as a surface-mediated photo-alignment. For illustrative purposes, the substrate and different layers, films, or structures formed thereon are shown as having flat surfaces. In some embodiments, the substrate and different layers or films or structures may have curved surfaces.

Figure 5A:
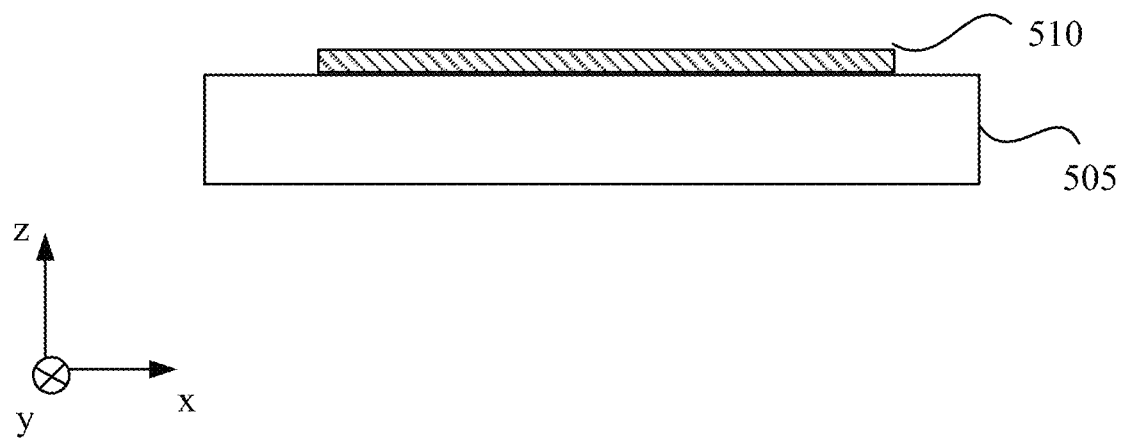
FIGS. 5A-5D schematically illustrate processes for fabricating a liquid crystal polarization hologram ("LCPH") element, according to an embodiment of the present disclosure.

As shown in FIG. 5A, a recording medium layer 510 may be formed on a surface (e.g., a top surface) of a substrate 505 by dispensing, e.g., coating or depositing, a polarization sensitive material on the surface of the substrate 505. Thus, the recording medium layer 510 may be referred to as a polarization sensitive recording medium layer. The polarization sensitive material included in the recording medium layer 510 may be an optically recordable and polarization sensitive material (e.g., a photo-alignment material) configured to have a photo-induced optical anisotropy when exposed to a polarized light irradiation. Molecules (or fragments) and/or photo-products of the optically recordable and polarization sensitive material may be configured to generate an orientational ordering under the polarized light irradiation. In some embodiments, the polarization sensitive material may be dissolved in a solvent to form a solution. The solution may be dispensed on the substrate 505 using any suitable solution coating process, e.g., spin coating, slot coating, blade coating, spray coating, or jet (ink-jet) coating or printing. The solvent may be removed from the coated solution using a suitable process, e.g., drying, or heating, thereby leaving the polarization sensitive material on the substrate 505 to form the recording medium layer 510.

The substrate 505 may provide support and protection to various layers, films, and/or structures formed thereon. In some embodiments, the substrate 505 may be transparent in a wavelength range including the recoding wavelength (i.e., a wavelength of recoding beams). In some embodiments, the substrate 505 may also be transparent in the visible wavelength band (e.g., about 380 nm to about 700 nm). In some embodiments, the substrate 505 may also be at least partially transparent in at least a portion of the infrared ("IR") band (e.g., about 700 nm to about 1 mm). The substrate 505 may include a suitable material that is at least partially transparent to lights of the above-listed wavelength ranges, such as, a glass, a plastic, a sapphire, or a combination thereof, etc. The substrate 505 may be rigid, semi-rigid, flexible, or semi-flexible. The substrate 505 may include a flat surface or a curved surface, on which the different layers or films may be formed. In some embodiments, the substrate 505 may be a part of another optical element or device (e.g., another opto-electrical element or device). For example, the substrate 505 may be a solid optical lens, a part of a solid optical lens, or a light guide (or waveguide), etc. In some embodiments, the substrate 505 may be a part of a functional device, such as a display screen. In some embodiments, the substrate 505 may be used to fabricate, store, or transport the fabricated LCPH. In some embodiments, the substrate 505 may be detachable or removable from the fabricated LCPH after the LCPH is fabricated or transported to another place or device. That is, the substrate 505 may be used in fabrication, transportation, and/or storage to support the LCPH provided on the substrate 505, and may be separated or removed from the LCPH when the fabrication of the LCPH is completed, or when the LCPH is to be implemented in an optical device. In some embodiments, the substrate 505 may not be separated from the LCPH.

Figure 5B:
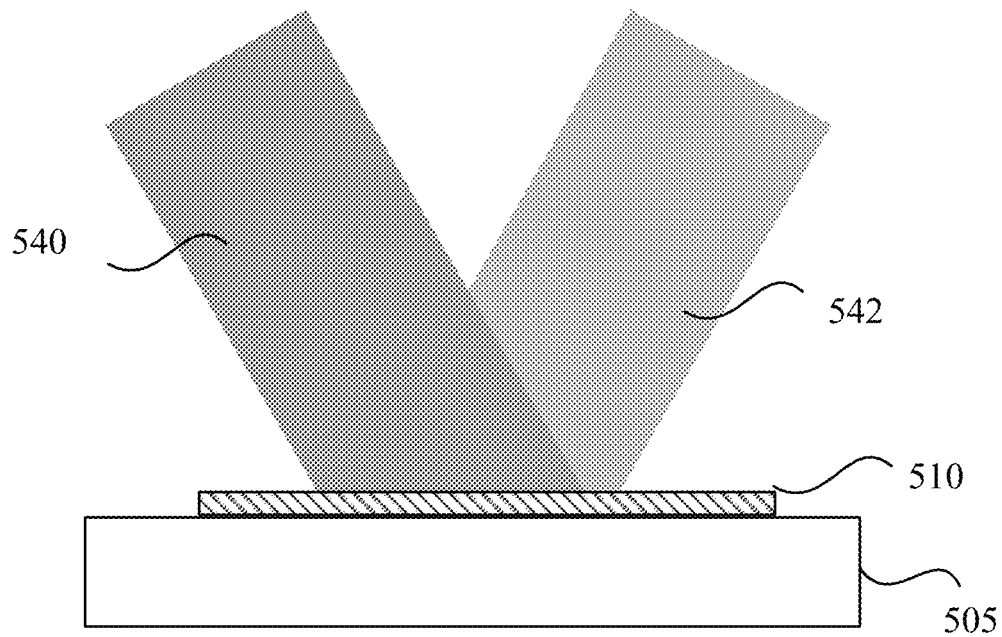

After the recording medium layer 510 is formed on the substrate 505, as shown in FIG. 5B, the recording medium layer 510 may be exposed to a polarization interference pattern generated based on two recording beams 540 and 542 (also referred to as a first recording beam 540 and a second recording beam 542). The two recording beams 540 and 542 may be two coherent, circularly polarized beams with opposite handednesses. For discussion purposes, the two recording beams 540 and 542 may represent, respectively, the recording beam S241 and the recording beam S242 shown in FIG. 2A. The recording medium layer 510 may be optically patterned when exposed to the polarization interference pattern generated based on the two recording beams 540 and 542 during the polarization interference exposure process. An orientation pattern of an optic axis of the recording medium layer 510 in an exposed region may be defined by the polarization interference pattern under which the recording medium layer 510 is exposed. In some embodiments, different regions of the recording medium layer 510 may be exposed to the same or different polarization interference patterns. The same or different orientation patterns of the optic axis of the recording medium 510 may be defined in respective exposed regions during the respective polarization interference exposure processes.

In some embodiments, the recording medium layer 510 may include elongated anisotropic photo-sensitive units (e.g., small molecules or fragments of polymeric molecules). After being subjected to a sufficient exposure of the polarization interference pattern generated based on the two recording beams 540 and 542, local alignment directions of the anisotropic photo-sensitive units may be induced in the recording medium layer 510 by the polarization interference pattern, resulting in an alignment pattern (or in-plane modulation) of an optic axis of the recording medium layer 510 due to a photo-alignment of the anisotropic photo-sensitive units. In some embodiments, multiple alignment patterns (which may be the same or different) may be recorded in different portions or regions of the recording medium layer 510 through multiple polarization interference exposure processes. After the recording medium layer 510 is optically patterned, the recording medium layer 510 may be referred to as a patterned recording medium layer with an alignment pattern.

Figure 5C:
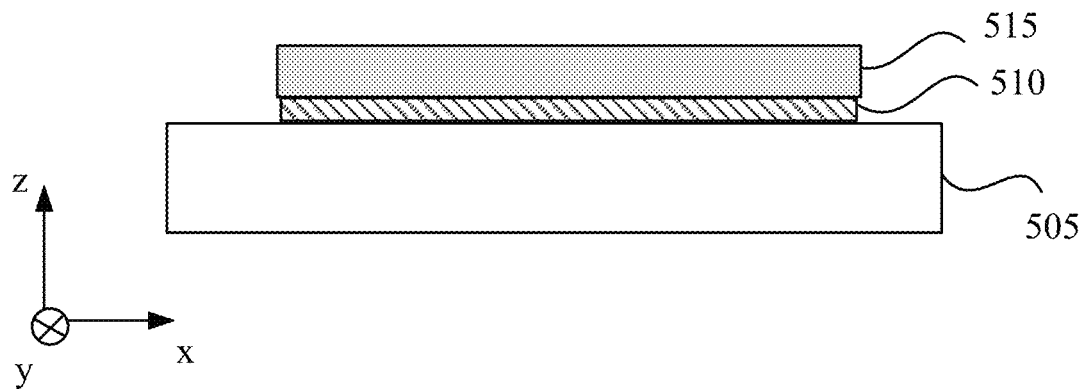

In some embodiments, as shown in FIG. 5C, a birefringent medium layer 515 may be formed on the patterned recording medium layer 510 by dispensing, e.g., coating or depositing, a birefringent medium onto the patterned recording medium layer 510. The birefringent medium may include one or more birefringent materials having an intrinsic birefringence, such as non-polymerizable LCs or polymerizable LCs (e.g., RMs). For discussion purposes, in the following descriptions, the term "liquid crystal(s)" or "LC(s)" may encompass both mesogenic and LC materials. In some embodiments, the birefringent medium may also include or be mixed with other ingredients, such as solvents, initiators (e.g., photo-initiators or thermal initiators), chiral dopants, or surfactants, etc. In some embodiments, the birefringent medium may not have an intrinsic or induced chirality. In some embodiments, the birefringent medium may have an intrinsic or induced chirality. For example, in some embodiments, the birefringent medium may include a host birefringent material and a chiral dopant doped into the host birefringent material at a predetermined concentration. The chirality may be introduced by the chiral dopant doped into the host birefringent material, e.g., chiral dopant doped into nematic LCs, or chiral reactive mesogens ("RMs") doped into achiral RMs. RMs may be also referred to as a polymerizable mesogenic or liquid-crystalline compound, or polymerizable LCs. In some embodiments, the birefringent medium may include a birefringent material having an intrinsic molecular chirality, and chiral dopants may not be doped into the birefringent material. The chirality of the birefringent medium may result from the intrinsic molecular chirality of the birefringent material. For example, the birefringent material may include chiral liquid crystal molecules, or molecules having one or more chiral functional groups. In some embodiments, the birefringent material may include twist-bend nematic LCs (or LCs in twist-bend nematic phase), in which LC directors may exhibit periodic twist and bend deformations forming a conical helix with doubly degenerate domains having opposite handednesses. The LC directors of twist-bend nematic LCs may be tilted with respect to the helical axis. Thus, the twist-bend nematic phase may be considered as the generalized case of the conventional nematic phase in which the LC directors are perpendicular to the helical axis.

In some embodiments, a birefringent medium may be dissolved in a solvent to form a solution. A suitable amount of the solution may be dispensed (e.g., coated, or sprayed, etc.) on the patterned recording medium layer 510 to form the birefringent medium layer 515, as shown in FIG. 5C. In some embodiments, the solution containing the birefringent medium may be coated on the patterned recording medium layer 510 using a suitable process, e.g., spin coating, slot coating, blade coating, spray coating, or jet (ink-jet) coating or printing. In some embodiments, the birefringent medium may be heated to remove the remaining solvent. This process may be referred to as a pre-exposure heating. The patterned recording medium layer 510 may be configured to provide a surface alignment (e.g., planar alignment, or homeotropic alignment, etc.) to optically anisotropic molecules (e.g., LC molecules, RM molecules, etc.) in the birefringent medium. For example, the patterned recording medium layer 510 may at least partially align the LC molecules or RM molecules in the birefringent medium that are in contact with the patterned recording medium layer 510 to form the grating pattern. In other words, the LC molecules or RM molecules in the birefringent medium may be at least partially aligned along the local alignment directions of the anisotropic photo-sensitive units in the patterned recording medium layer 510 to form the grating pattern. Thus, the grating pattern recorded in the patterned recording medium layer 510 (or the in-plane orientation pattern of the optic axis of the recording medium layer 510) may be transferred to the birefringent medium, and hence to the birefringent medium layer 515. That is, the patterned recording medium layer 510 may function as a photo-alignment material ("PAM") layer for the LCs or RMs in the birefringent medium. Such an alignment procedure may be referred to as a surface-mediated photo-alignment. The recording medium included in the recording medium layer 510 for a surface-mediated photo-alignment may also be referred to as a surface recording medium or surface PAM.

In some embodiments, after the LCs or RMs in the birefringent medium are aligned by the patterned recording medium layer 510, the birefringent medium may be heat treated (e.g., annealed) in a temperature range corresponding to a nematic phase of the LCs or RMs in birefringent medium to enhance the alignments (or orientation pattern) of the LCs and/or RMs (not shown in FIG. 5C). This process may be referred to as a post-exposure heat treatment (e.g., annealing). In some embodiments, the heat treatment of the birefringent medium may be omitted.

Figure 5D:
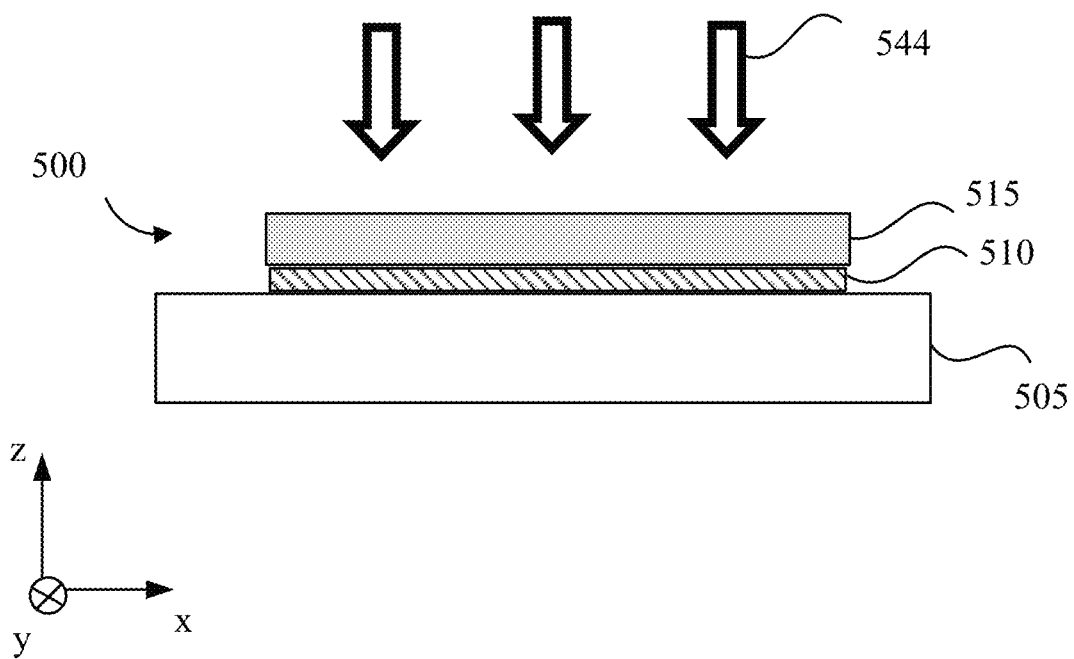

In some embodiments, when the birefringent medium includes polymerizable LCs (e.g., RMs), after the RMs are aligned by the patterned recording medium layer 510, the RMs may be polymerized, e.g., thermally polymerized or photo-polymerized, to solidify and stabilize the orientational pattern of the optic axis of the birefringent medium, thereby forming the birefringent medium layer 515. In some embodiments, as shown in FIG. 5D, the birefringent medium may be irradiated with, e.g., a UV light 544. Under a sufficient UV light irradiation, the birefringent medium may be polymerized to stabilize the orientational pattern of the optic axis of the birefringent medium. In some embodiments, the polymerization of the birefringent medium under the UV light irradiation may be carried out in air, or in an inert atmosphere formed, for example, by nitrogen, argon, carbon-dioxide, or in vacuum. Thus, an LCPH element (e.g., an LCPH grating) 500 may be obtained based on the polarization interference exposure process and surface-mediated photo-alignment. In some embodiments, the LCPH element (e.g., LCPH grating) 500 fabricated based on the fabrication processes shown in FIGS. 5A-5D may be a passive LCPH element, e.g., a passive PBP element, a passive PVH element, etc. The passive LCPH element may be a transmissive LCPH element (e.g., a PBP element, a transmissive PVH element, etc.) or a reflective LCPH element (e.g., a reflective PVH element). In some embodiments, the process of thermo- or photo-polymerization of the birefringent medium may be omitted for fabricating an active LCPH element. Exemplary fabrication processes of active LCPH elements are explained in FIGS. 6A-6D.

In some embodiments, as shown in FIG. 5D, the substrate 505 and/or the recording medium layer 510 may be used to fabricate, store, or transport the LCPH element 500. In some embodiments, the substrate 505 and/or the recording medium layer 510 may be detachable or removable from other portions of the LCPH element 500 after the other portions of the LCPH element 500 are fabricated or transported to another place or device. That is, the substrate 505 and/or the patterned recording medium layer 510 may be used in fabrication, transportation, and/or storage to support the birefringent medium layer 515, and may be separated or removed from the birefringent medium layer 515 when the fabrication of the LCPH element 500 is completed, or when the LCPH element 500 is to be implemented in an optical device. In some embodiments, the substrate 505 and/or the recording medium layer 510 may not be separated from the LCPH element 500.

Figure 6A:
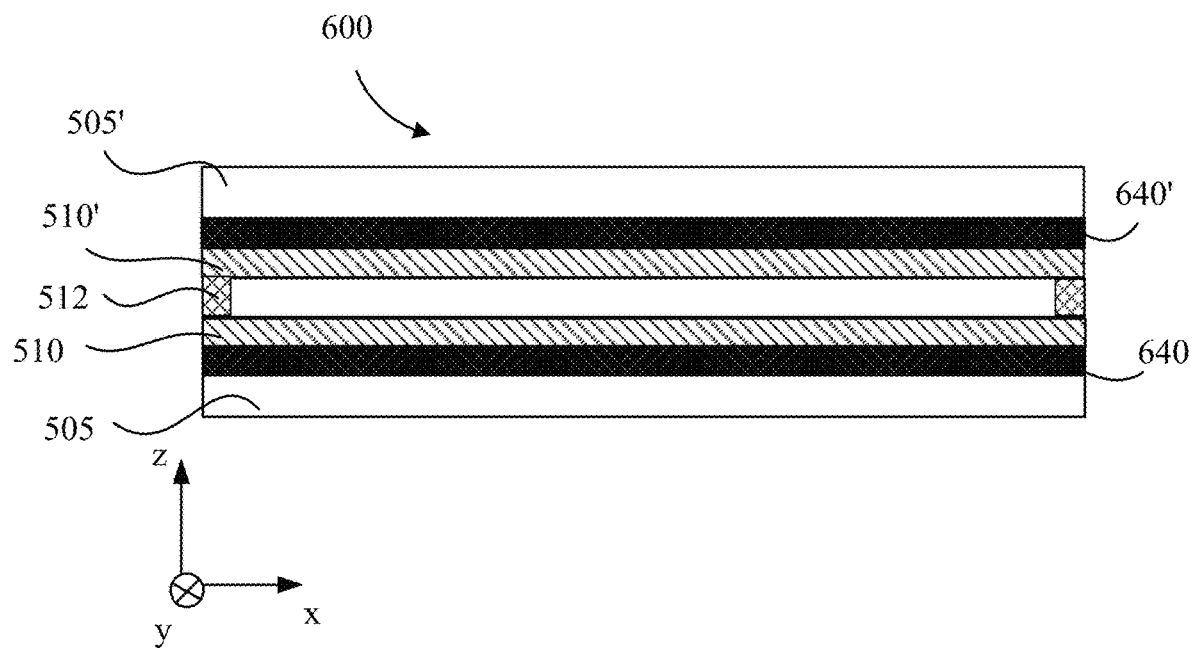
FIGS. 6A and 6B schematically illustrate processes for fabricating an LCPH element and a fabricated LCPH element, according to an embodiment of the present disclosure.
Figure 6B:
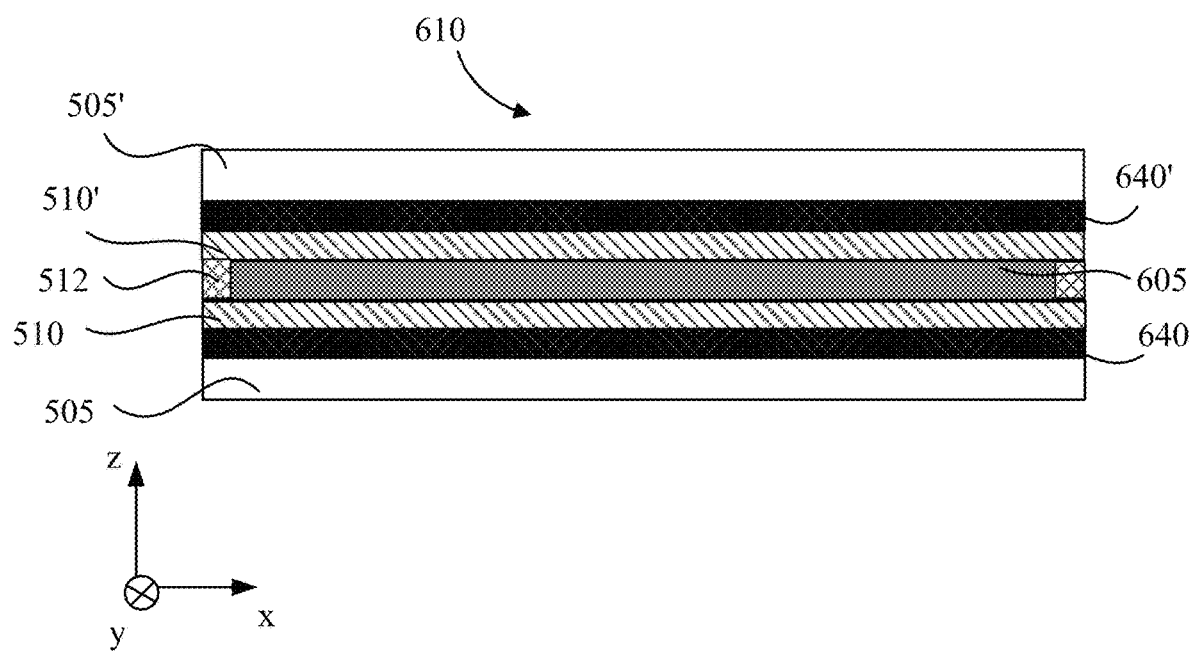

FIGS. 6A and 6B schematically illustrate processes for fabricating an LCPH element, according to an embodiment of the present disclosure. The fabrication processes shown in FIGS. 6A and 6B may include steps or processes similar to those shown in FIGS. 5A-5D. The LCPH element fabricated based on the processes shown in FIGS. 6A and 6B may include elements similar to those included in the LCPH element fabricated based on the processes shown in FIGS. 5A-5D. Descriptions of the similar steps and similar elements can refer to the descriptions rendered above in connection with FIGS. 5A-5D. The LCPH element fabricated based on the fabrication processes shown in FIGS. 6A and 6B may be an active LCPH element, such as an active PBP element or an active PVH element, etc. The active LCPH element may be a transmissive LCPH element (e.g., a PBP element, a transmissive PVH element, etc.) or a reflective LCPH element (e.g., a reflective PVH element). Although the substrate and layers are shown as having flat surfaces, in some embodiments, the substrate and layers formed thereon may have curved surfaces.

As shown in FIG. 6A, two substrates, a first substrate 505 and a second substrate 505', may be assembled to form an LC cell 600. For example, the two substrates 505 and 505' may be bonded to each other via an adhesive 512 (e.g., optical adhesive 512) to form the LC cell 600. At least one (e.g., each) of the two substrates 505 and 505' may be provided with one or more conductive electrode layers and a patterned recording medium layer. For example, two conductive electrode layers 640 and 640' may be formed at opposing surfaces of the substrates 505 and 505', and two patterned recording medium layer 510 and 510' may be formed on opposing surfaces of the two conductive electrode layers 640 and 640'. The patterned recording medium layers 510 and 510' may be fabricated at the opposing surfaces of the conductive electrode layers 640 and 640' following steps or processes similar to those shown in FIGS. 5A and 5B, using the disclosed system with the fringe stabilization mechanism. The conductive electrode layer 640 or 640' may be transmissive or reflective at least in the same spectrum band as the substrate 505 or 505'. The conductive electrode layer 640 or 640' may be a planar continuous electrode layer or a patterned electrode layer. As shown in FIG. 6A, a gap or space may exist between the patterned recording medium layers 510 and 510'.

After the LC cell 600 is assembled, as shown in FIG. 6B, active LCs reorientable by an external field, e.g., an electric field, may be filled into the LC cell 600, i.e., into the space formed between the patterned recording medium layers 510 and 510', forming an active LC layer 605. The patterned recording medium layer 510 or 510' may function as a PAM layer for the active LCs filled into the LC cell 600, such that the active LCs may be at least partially aligned by the patterned recording medium layer 510 or 510'. The patterned recording medium layer 510 or 510' may also be referred to as PAM layer 510 or 510'. The LC cell 600 filled with the active LCs may be sealed via, e.g., the adhesive 512, and an active LCPH element 610 may be obtained. The active LCPH 610 may be switchable by a voltage applied to the conductive electrode layers 640 and 640'. For example, the switching of the active LCPH 610 may be controlled by a controller (not shown) similar to the controller 217 shown in FIG. 2A.

For illustrative purposes, FIGS. 6A and 6B show that the patterned recording medium layers 510 and 510' (or PAM layers 510 and 510') may be disposed at opposing inner surfaces of the two substrates 505 and 505'. In some embodiments, each of the PAM layers 510 and 510' disposed at the two substrates 505 and 505' may be configured to provide a planar alignment (or an alignment with a small pretilt angle). The PAM layers 510 and 510' may provide parallel or anti-parallel surface alignments. In some embodiments, the PAM layers 510 and 510' disposed at the two substrates 505 and 505' may be configured to provide hybrid surface alignments. For example, the PAM layer 510 disposed at the substrate 505 may be configured to provide a planar alignment (or an alignment with a small pretilt angle), and the PAM layer 510' disposed at the other substrate 505' may be configured to provide a homeotropic alignment. Although not shown, in some embodiments, only one of the substrates 505 and 505' may be provided with the PAM layer 510 or 510'.

For illustrative purposes, FIGS. 6A and 6B show that conductive electrode layers 640 and 640' may be disposed at the two substrates 505 and 505'. The conductive electrode layer (640 or 640') may be disposed between the patterned recording medium layer (510 or 510') and the substrate (505 or 505'). In the embodiment shown in FIGS. 6A and 6B, each of the conductive electrode layers 640 and 640' may be a continuous planar electrode layer. A driving voltage may be applied to the conductive electrode layers 640 and 640' to generate a vertical electric field to reorient the LC molecules, thereby switching the optical properties of the active LCPH element 610. As shown in FIG. 6B, the conductive electrode layers 640 and 640' may be disposed at two sides of the active LC layer 605.

Figure 6C:
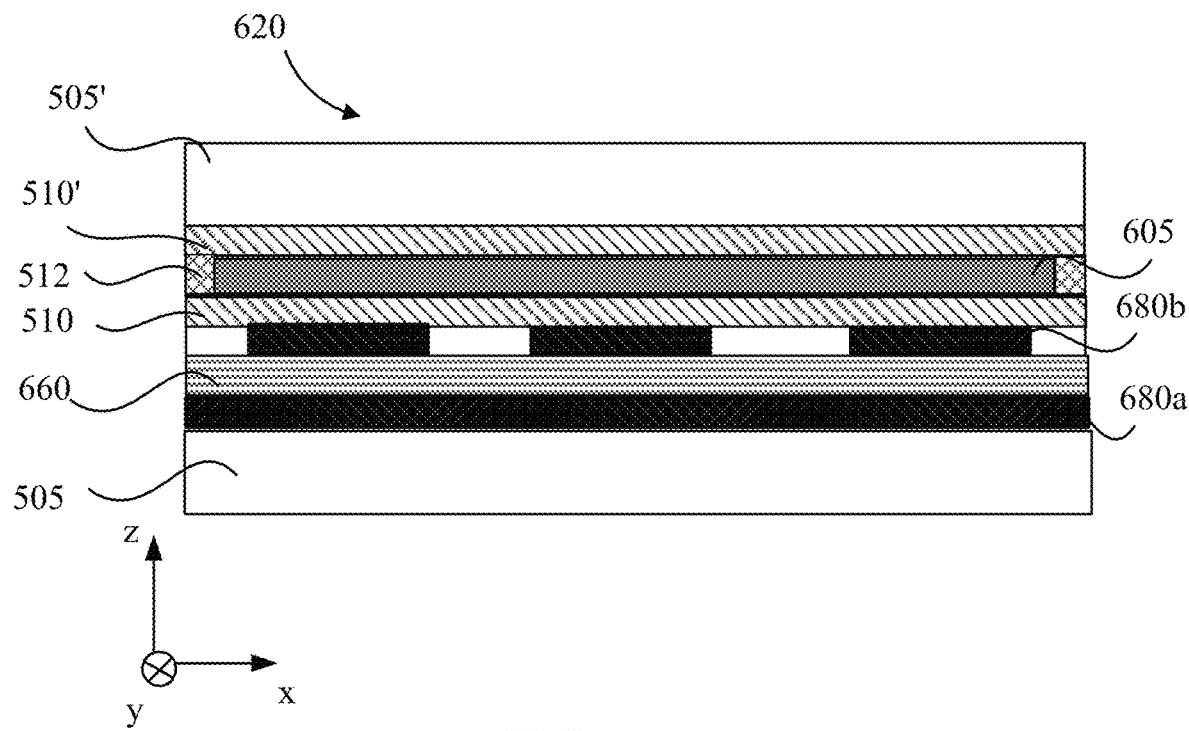
FIG. 6C schematically illustrates processes for fabricating an LCPH element and a fabricated LCPH element, according to an embodiment of the present disclosure.

In some embodiments, the two conductive electrode layers 640 and 640' may be disposed at the same side of the active LC layer 605. For example, as shown in FIG. 6C, two substrates 505 and 505' may be assembled to form an LC cell 620. One substrate 505' (e.g., an upper substrate) may not be provided with a conductive electrode layer, while the other substrate 505 (e.g., a lower substrate) may be provided with two conductive electrode layers (e.g., 680a and 680b) and an electrically insulating layer 660 disposed between the two conductive electrode layers. In other words, the two conductive electrode layers 680a and 680b may be disposed at the same side of the active LC layer 605. The two conductive electrode layers 680a and 680b may be a continuous planar electrode layer 680a and a patterned electrode layer 680b. The patterned electrode layer 680b may include a plurality of striped electrodes arranged in parallel in an interleaved manner. After the LC cell 620 is filled with active LCs to form the active LC layer 605, an active LCPH element may be obtained. A voltage may be applied between the continuous planar electrode layer 680a and the patterned electrode layer 680b disposed at the same side of the active LC layer 605 to generate a horizontal electric field to reorient the LC molecules, thereby switching the optical properties of the fabricated active LCPH element.

Figure 6D:
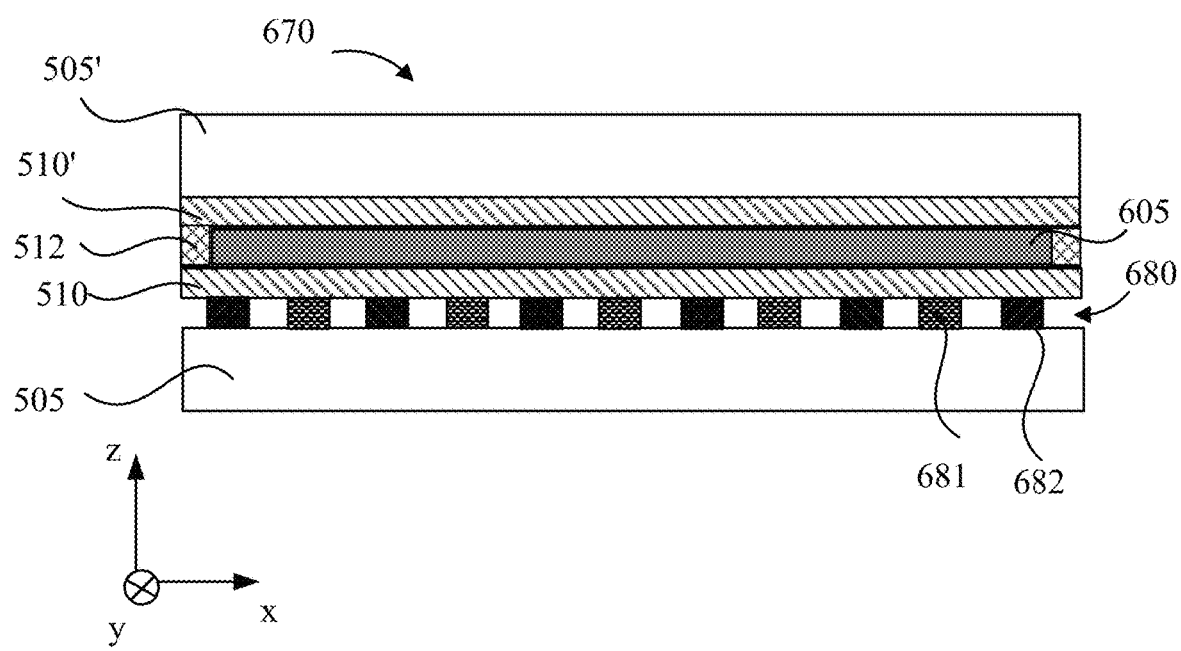
FIG. 6D schematically illustrates processes for fabricating an LCPH element and a fabricated LCPH element, according to an embodiment of the present disclosure.

In some embodiments, as shown in FIG. 6D, two substrates 505 and 505' may be assembled to form an LC cell 670. One substrate 505' (e.g., an upper substrate) may not be provided with a conductive electrode layer, while the other substrate 505 (e.g., a lower substrate) may be provide with a conductive electrode layer 680. The conductive electrode layer 680 may include interdigitated electrodes, which may include two individually addressable comb-like microelectrode arrays 681 and 682. After the LC cell 660 is filled with active LCs to form the active LC layer 605, an active LCPH element may be obtained. A voltage may be applied between the microelectrode arrays 681 and 682 disposed at the same side of the active LC layer 605 to generate a horizontal electric field to reorient the LC molecules in the active LC layer 605, thereby switching the optical properties of the fabricated active LCPH element.

Referring back to FIGS. 6A-6D, in some embodiments, the recording medium layer(s) may not be optically patterned before the LC cell is assembled. Instead, the recording medium layer(s) may be optically patterned after the LC cell is assembled. For example, two substrates 505 and 505' may be assembled to form an LC cell. At least one of the two substrates 505 and 505' may be provided with one or more conductive electrode layers and a recording medium layer (that has not been optically patterned yet). Then the LC cell may be exposed to a polarization interference pattern, which may be similar to that shown in FIG. 5B, using the disclosed interference system having the fringe stabilization mechanism. Accordingly, the recording medium layer disposed at the substrate may be optically patterned to provide an alignment pattern. After the LC cell is filled with active LCs and sealed, an active LCPH element may be obtained.

Figure 7A:
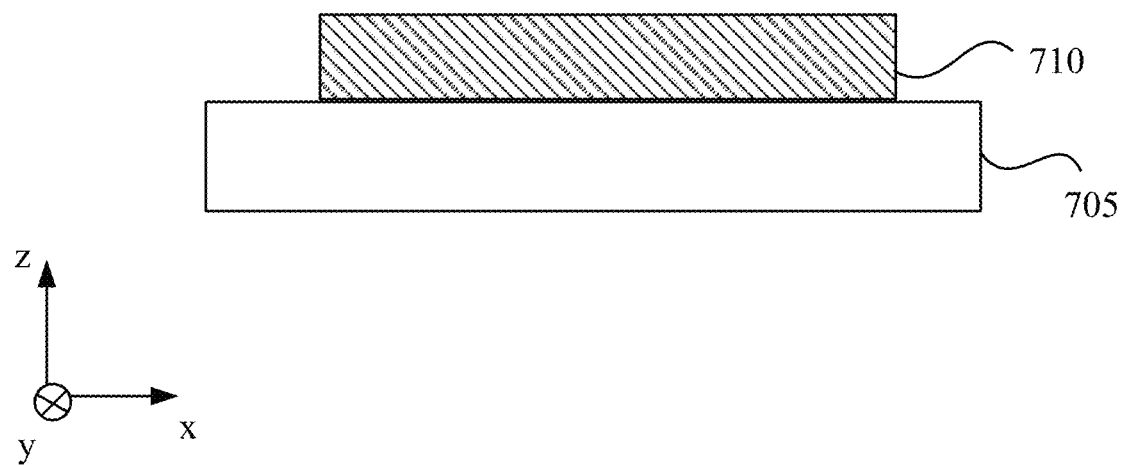
FIGS. 7A and 7B schematically illustrate processes for fabricating an LCPH element, according to an embodiment of the present disclosure.
Figure 7B:
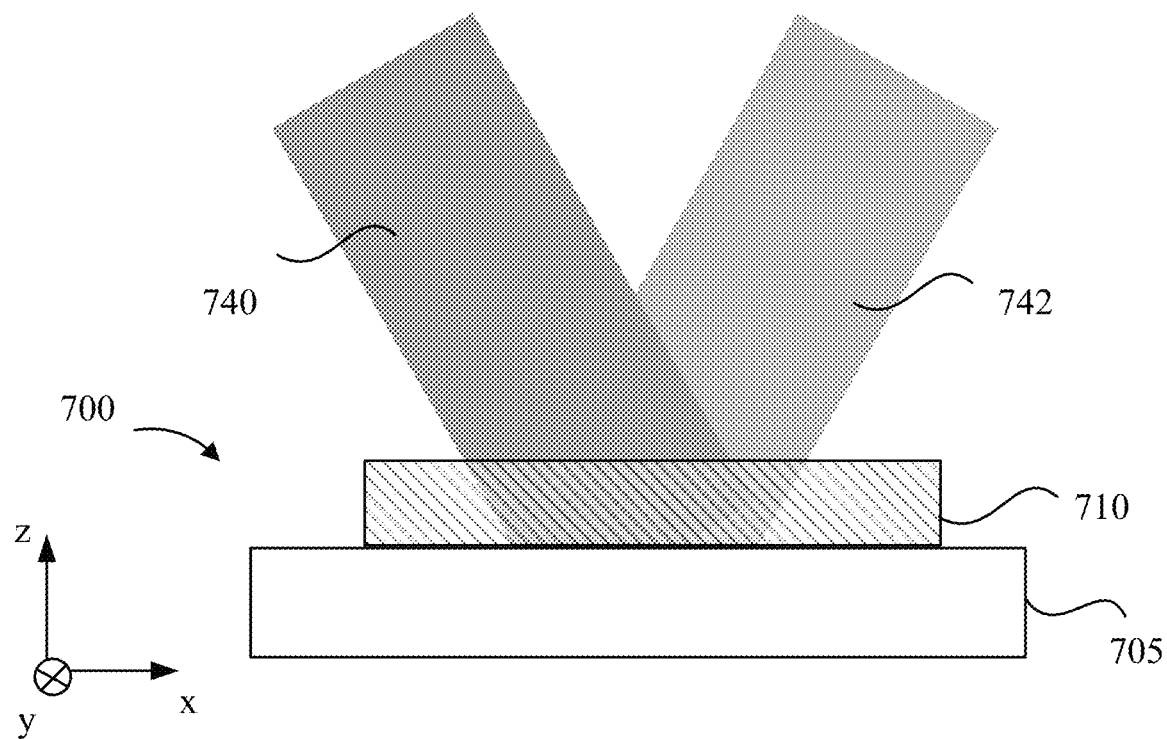

FIGS. 7A and 7B schematically illustrate processes for fabricating an LCPH element through an interference system including a disclosed fringe stabilization mechanism, such as the fringe stabilization mechanism 250 shown in FIGS. 2A-2G, or the fringe stabilization mechanism 280 shown in FIG. 2H. The fabrication process shown in FIGS. 7A and 7B may include holographic recording and bulk-mediated photo-alignment (also referred to as volume recording). The fabrication processes shown in FIGS. 7A and 7B may include steps similar to those shown in FIGS. 5A and 5B. The LCPH element fabricated based on the processes shown in FIGS. 7A and 7B may include elements similar to the LCPH element fabricated based on the processes shown in FIGS. 5A and 5B. Descriptions of the similar steps and similar elements, structures, or functions can refer to the descriptions rendered above in connection with FIGS. 5A and 5B. Although the substrate and layers are shown as having flat surfaces, in some embodiments, the substrate and layers formed thereon may have curved surfaces.

Similar to the embodiment shown in FIGS. 5A and 5B, the processes shown in FIGS. 7A and 7B may include dispensing (e.g., coating, depositing, etc.) a recording medium on a surface (e.g., a top surface) of a substrate 705 to form a recording medium layer 710. The substrate 705 may be similar to the substrate 505 shown in FIGS. 5A and 5B. The recording medium may be a polarization sensitive recording medium. The recording medium may include an optically recordable and polarization sensitive material (e.g., a photo-alignment material) configured to have a photoinduced optical anisotropy when exposed to a polarized light irradiation. Molecules (or fragments) and/or photo-products of the optically recordable and polarization sensitive material may generate anisotropic angular distributions in a film plane of a layer of the recording medium under a polarized light irradiation. In some embodiments, the recording medium may include or be mixed with other ingredients, such as a solvent in which the optically recordable and polarization sensitive materials may be dissolved to form a solution, and photo-sensitizers. The solution may be dispensed on the substrate 705 using a suitable process, e.g., spin coating, slot coating, blade coating, spray coating, or jet (ink-jet) coating or printing. The solvent may be removed from the coated solution using a suitable process, e.g., drying, or heating, leaving the recording medium on the substrate 705.

After the recording medium layer 710 is formed on the substrate 705, as shown in FIG. 7B, the recording medium layer 710 may be exposed to a polarization interference pattern generated based on two recording beams 740 and 742. The two recording beams 740 and 742 may be two coherent, circularly polarized beams with opposite handednesses. For discussion purposes, the two recording beams 740 and 742 may represent, respectively, the recording beam S241 and the recording beam S242 shown in FIG. 2A. The recording medium layer 710 may be optically patterned when exposed to the polarization interference pattern generated based on the two recording beams 740 and 742 during the polarization interference exposure process. An orientation pattern of an optic axis of the recording medium layer 710 in an exposed region may be defined during the polarization interference exposure process.

In the embodiment shown in FIGS. 7A and 7B, the recording medium may include a photo-sensitive polymer. Molecules of the photo-sensitive polymer may include one or more polarization sensitive photo-reactive groups embedded in a main polymer chain or a side polymer chain. During the polarization interference exposure process of the recording medium layer 710, a photo-alignment of the polarization sensitive photo-reactive groups may occur within (or in, inside) a volume of the recording medium layer 710. That is, a 3D polarization field generated by the interface of the two recording beams 740 and 742 may be directly recorded within (or in, inside) the volume of the recording medium layer 710. Such an alignment procedure shown in FIG. 7B may be referred to as a bulk-mediated photo-alignment. The recording medium included in the recording medium layer 710 for a bulk-mediated photo-alignment shown in FIG. 7B may also be referred to as a volume recording medium or bulk PAM. The recording medium layer 710 for a bulk-mediated photo-alignment shown in FIG. 7B may be relatively thicker than the recording medium layer 510 for a surface-mediated photo-alignment shown in FIGS. 5A-5D.

In some embodiments, the photo-sensitive polymer included in the recording medium layer 710 may include an amorphous polymer, an LC polymer, etc. The molecules of the photo-sensitive polymer may include one or more polarization sensitive photo-reactive groups embedded in a main polymer chain or a side polymer chain. In some embodiments, the polarization sensitive photo-reactive group may include an azobenzene group, a cinnamate group, or a coumarin group, etc. In some embodiments, the photo-sensitive polymer may be an amorphous polymer, which may be initially optically isotropic prior to undergoing the polarization interference exposure process, and may exhibit an induced (e.g., photo-induced) optical anisotropy after being subjected to the polarization interference exposure process. In some embodiments, the photo-sensitive polymer may be an LC polymer, in which the birefringence and in-plane orientation pattern may be recorded due to an effect of photo-induced optical anisotropy. In some embodiments, the photo-sensitive polymer may be an LC polymer with a polarization sensitive cinnamate group embedded in a side polymer chain. In some embodiments, when the recording medium layer 710 includes an LC polymer, the patterned recording medium layer 710 may be heat treated (e.g., annealed) in a temperature range corresponding to a liquid crystalline state of the LC polymer to enhance the photo-induced optical anisotropy of the LC polymer (not shown in FIG. 7B).

In the embodiment shown in FIGS. 7A and 7B, an in-plane orientation pattern of the optic axis may be directly recorded in the recording medium layer 710 via the bulk-mediated photo-alignment in an exposed region. A step of disposing an additional birefringent medium layer on the patterned recording medium layer 710 may be omitted. The patterned recording medium layer 710 may function as an LCPH element 700. In some embodiments, multiple in-plane orientation patterns of the optic axis may be recorded in different regions of the recording medium layer 710 through multiple polarization interference exposure processes. The LCPH element fabricated based on the fabrication processes shown in FIGS. 7A and 7B may be a passive LCPH element, such as a passive transmissive PVH element. The Bragg period in the patterned recording medium layer 710 may be determined by the recording wavelength $\lambda_0$ and the refractive index of the recording medium layer 710 (or recording medium), instead of the concentration of the chiral dopants used in surface recording. In some embodiments, the Bragg period in the patterned recording medium layer 710 may be proportional to the recording wavelength, and inversely proportional to the refractive index of the recording medium layer 710 (or recording medium).

In some embodiments, the substrate 705 may be used to fabricate, store, or transport the LCPH element 700. In some embodiments, the substrate 705 may be detachable or removable from the LCPH element 700 after the LCPH element 700 is fabricated or transported to another place or device. That is, the substrate 705 may be used in fabrication, transportation, and/or storage to support the LCPH element 700 provided on the substrate 705, and may be separated or removed from the LCPH element 700 when the fabrication of the LCPH element 700 is completed, or when the LCPH element 700 is to be implemented in an optical device. In some embodiments, the substrate 705 may not be separated from the LCPH element 700.

The LCPH elements fabricated based on the disclosed systems and processes may have numerous applications in a large variety of fields, e.g., near-eye displays ("NEDs"), head-up displays ("HUDs"), head-mounted displays ("HMDs"), smart phones, laptops, televisions, vehicles, etc. For example, the LCPH elements fabricated based on the disclosed systems and processes may be implemented in various systems for augmented reality ("AR"), virtual reality ("VR"), and/or mixed reality ("MR") applications, to address accommodation-vergence conflict, to enable thin and highly efficient eye-tracking and depth sensing in space constrained optical systems, to extend the detecting range of sensors, to increase detecting resolution or accuracy of sensors, to develop optical combiners for image formation, to correct chromatic aberrations for image resolution enhancement of refractive optical elements in compact optical systems, and to enhance the efficiency and reducing the size of optical systems.

Figure 8A:
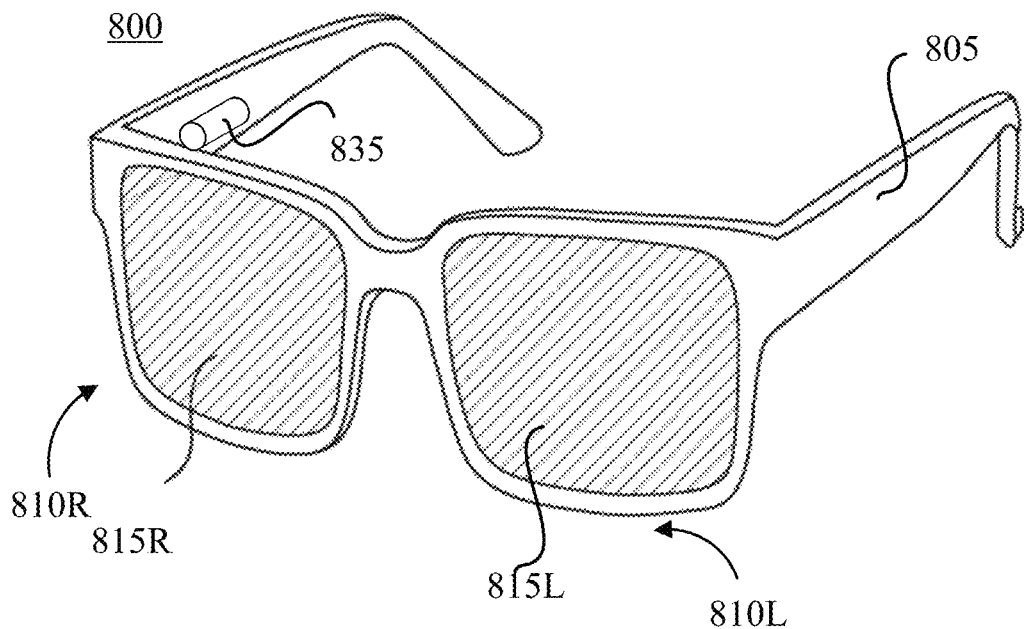
FIG. 8A illustrates a schematic diagram of a near-eye display ("NED"), according to an embodiment of the present disclosure.
Figure 8B:
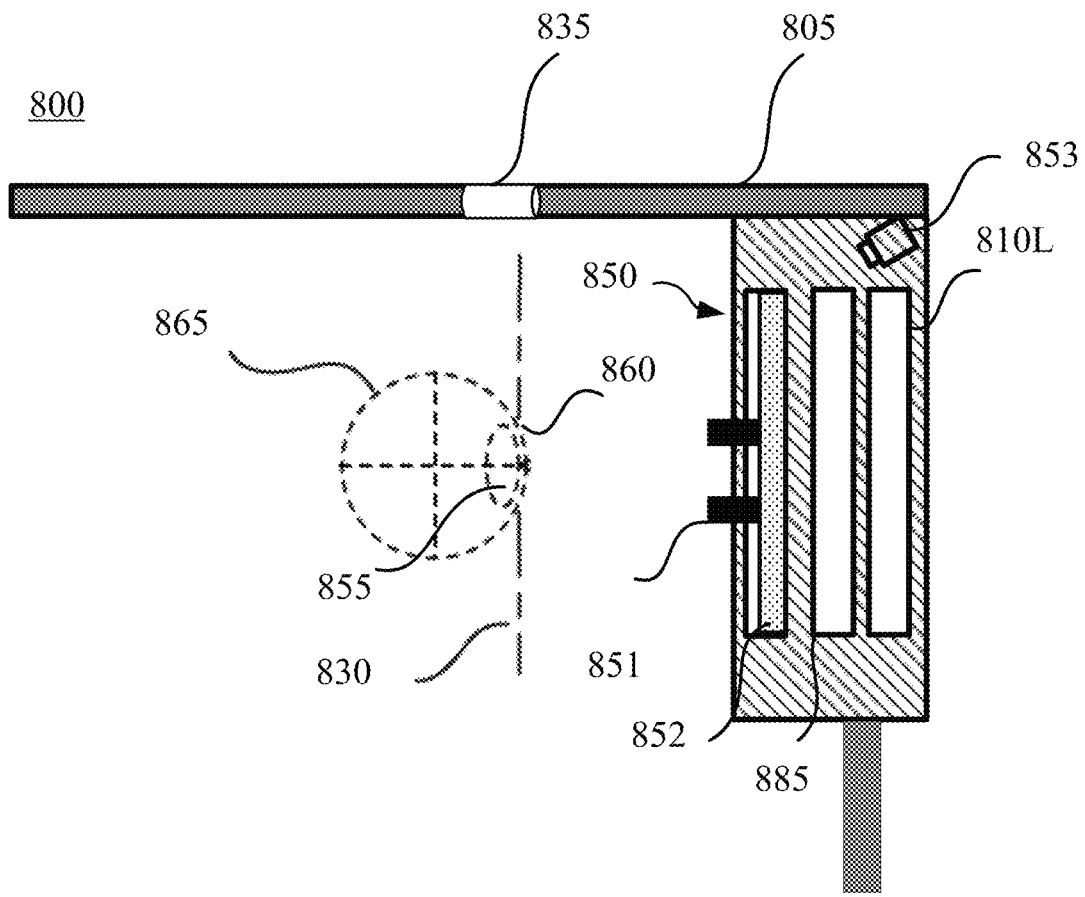
FIG. 8B illustrates a schematic cross sectional view of half of the NED shown in FIG. 8A, according to an embodiment of the present disclosure.

FIG. 8A illustrates a schematic diagram of a near-eye display ("NED") 800 according to an embodiment of the disclosure. FIG. 8B is a cross-sectional view of half of the NED 800 shown in FIG. 8A according to an embodiment of the disclosure. For purposes of illustration, FIG. 8B shows the cross-sectional view associated with a left-eye display system 810L. The NED 800 may include a controller (e.g., the controller 217), which is not shown in FIG. 8A or 8B. The NED 800 may include a frame 805 configured to mount to a user's head. The frame 805 is merely an example structure to which various components of the NED 800 may be mounted. Other suitable fixtures may be used in place of or in combination with the frame 805. The NED 800 may include right-eye and left-eye display systems 810R and 810L mounted to the frame 805. The NED 800 may function as a VR device, an AR device, an MR device, or any combination thereof. In some embodiments, when the NED 800 functions as an AR or an MR device, the right-eye and left-eye display systems 810R and 810L may be entirely or partially transparent from the perspective of the user, which may provide the user with a view of a surrounding real-world environment. In some embodiments, when the NED 800 functions as a VR device, the right-eye and left-eye display systems 810R and 810L may be opaque, such that the user may be immersed in the VR imagery based on computer-generated images.

The right-eye and left-eye display systems 810R and 810L may include image display components configured to project computer-generated virtual images into left and right display windows 815L and 815R in a field of view ("FOV"). The right-eye and left-eye display systems 810R and 810L may be any suitable display systems. For illustrative purposes, FIG. 8A shows that the right-eye and left-eye display systems 810R and 810L may include a projector 835 coupled to the frame 805. The projector 835 may generate an image light representing a virtual image. In some embodiments, the right-eye and left-eye display systems 810R and 810L may include one or more LCPH elements fabricated based on the disclosed systems and processes as shown in FIGS. 2A-7B, and as described above. As shown in FIG. 8B, the NED 800 may also include a lens system (or viewing optical system) 885 and an object tracking system 850 (e.g., eye tracking system and/or face tracking system). The lens system 885 may be disposed between the object tracking system 850 and the left-eye display system 810L. The lens system 885 may be configured to guide the image light output from the left-eye display system 810L to an exit pupil 860. The exit pupil 860 may be a location where an eye pupil 855 of an eye 865 of the user is positioned in an eye-box region 830 of the left-eye display system 810L.

In some embodiments, the lens system 885 may be configured to correct aberrations in the image light output from the left-eye display system 810L, magnify the image light output from the left-eye display system 810L, or perform another type of optical adjustment to the image light output from the left-eye display system 810L. The lens system 885 may include multiple optical elements, such as lenses, waveplates, reflectors, etc. In some embodiments, the lens system 885 may include a pancake lens configured to fold the optical path, thereby reducing the back focal distance in the NED 800. In some embodiments, the lens system 885 may include one or more LCPH elements fabricated based on the disclosed systems and processes. The object tracking system 850 may include an IR light source 851 configured to illuminate the eye 865 and/or the face, a deflecting element 852 configured to deflect the IR light reflected by the eye 865, and an optical sensor 853 configured to receive the IR light deflected by the deflecting element 852 and generate a tracking signal for tracking the eye and/or the face. In some embodiments, the object tracking system 850 may include one or more LCPH elements fabricated based on the disclosed systems and processes.

The present disclosure also provides methods for stabilizing an interference pattern. The methods may be performed by one or more components included in the disclosed systems. FIG. 9 illustrates a flowchart showing a method 900 for stabilizing an interference pattern, according to an embodiment of the present disclosure. As shown in FIG. 9, the method 900 may include guiding a first beam and a second beam to a diffractive optical element, the first beam and the second beam interfering with one another to generate a first interference pattern (Step 910). The first beam and the second beam may be coherent beams. In some embodiments, the first beam and the second beam may be polarized beams having the same polarization, e.g., the same linear polarization. In some embodiments, the first beam and the second beam may be polarized beams having opposite handednesses, e.g., the first beam and the second beam may be circularly polarized beams having opposite handednesses. In some embodiments, the first interference pattern may be an intensity interference pattern. In some embodiments, the first interference pattern may be a polarization interference pattern. The first interference pattern may be recorded in a recording medium disposed in a beam interference zone and exposed to the first interference pattern.

The method 900 may include forwardly diffracting, by the diffractive optical element, the first beam and the second beam to output a third beam and a fourth beam at least partially overlapping with one another, wherein the third beam and the fourth beam interfere with one another to generate a second interference pattern (Step 920). The third beam and the fourth beam may be coherent beams. In some embodiments, the third beam and the fourth beam may be polarized beams having opposite handednesses, e.g., the third beam and the fourth beam may be circularly polarized beams having opposite handednesses. In some embodiments, the third beam and the fourth beam may substantially overlap with one another.

The method 900 may include detecting, by a detector, the second interference pattern (Step 930). In some embodiments, the detector may include a camera, or a photodiode, etc., such as one or more of a CCD camera, a CMOS sensor, an NMOS sensor, a pixelated polarized camera, or any other optical sensors. Detecting, by the detector, the second interference pattern may include directly or indirectly directing, by the detector, the second interference pattern.

In some embodiments, the method 900 may include additional steps that are not shown in FIG. 9. In some embodiments, forwardly diffracting, by the diffractive optical element, the first beam and the second beam to output the third beam and the fourth beam may include: forwardly diffracting the first beam in a counter-clockwise direction toward a normal of a beam outputting surface of the diffractive optical element; and forwardly diffracting the second beam in a clockwise direction toward the same normal.

In some embodiments, the diffractive optical element may include a first grating and a second grating arranged in parallel with one another. In some embodiments, the first grating and the second grating may be polarization selective gratings. In some embodiments, the first grating and the second grating may include at least one of a surface relief grating, a transmissive polarization volume hologram grating, or a geometric phase polarization grating. In some embodiments, the first grating and the second grating may be transmissive polarization volume hologram gratings. In some embodiments, the diffractive optical element may include a first grating set and a second grating set arranged in parallel with one another, and at least one of the first grating set or the second grating set may include two or more stacked gratings.

In some embodiments, the first grating may be mounted on a first movable stage, and the second grating may be mounted on a second movable stage, and each of the first movable stage and the second movable stage may be independently controllable to adjust an orientation of the first grating or the second grating. In some embodiments, forwardly diffracting, by the diffractive optical element, the first beam in the counter-clockwise direction toward the normal of the beam outputting surface of the diffractive optical element; and forwardly diffracting, by the diffractive optical element, the second beam in the clockwise direction toward the same normal may include adjusting, by at least one of the first movable stage or the second movable stage, an orientation of at least one of the first grating or the second grating.

In some embodiments, forwardly diffracting, by the diffractive optical element, the first beam and the second beam to output the third beam and the fourth beam may include: forwardly diffracting, by the first grating, the first beam in a counter-clockwise direction away from (or in a clockwise direction toward) a first normal of a beam outputting surface of the first grating, and outputting a fifth beam toward the second grating; forwardly diffracting, by the first grating, the second beam in the clockwise direction away from (or in a counter-clockwise direction toward) the first normal, and outputting a sixth beam toward the second grating; forwardly diffracting, by the second grating, the fifth beam in the counter-clockwise direction away from a second normal of a beam outputting surface of the second grating, and outputting the third beam; and forwardly diffracting, by the second grating, the sixth beam in the clockwise direction away from the second normal, and outputting the fourth beam.

In some embodiments, a first angle α between the first beam and the second beam may be greater than a second angle β between the third beam and the fourth beam. In some embodiments, the first angle α between the first beam and the second beam may be greater than or equal to a third angle γ between the fifth beam and the sixth beam, and the second angle between the third beam and the fourth beam may be smaller than or equal to the third angle γ between the fifth beam and the sixth beam. In some embodiments, the first angle α between the first beam and the second beam may be smaller than or equal to the third angle γ between the fifth beam and the sixth beam, and the second angle β between the third beam and the fourth beam may be smaller than or equal to the third angle γ between the fifth beam and the sixth beam.

In some embodiments, the method 900 may also include transforming, by a polarizer disposed between the diffractive optical element and the detector, the second interference pattern to a third interference pattern. In some embodiments, the method 900 may also include detecting, by the detector, the second interference pattern through detecting the third interference pattern. In some embodiments, the polarizer may be a linear absorption polarizer. In some embodiments, the second interference pattern may be a polarization interference pattern, and the third interference pattern may be an intensity interference pattern. In some embodiments, the first interference pattern may be an intensity interference pattern, and a periodicity of the third interference pattern may be greater than a periodicity of the first interference pattern. In some embodiments, the first interference pattern may be a polarization interference pattern, and a periodicity of the second interference pattern may be greater than a periodicity of the first interference pattern.

In some embodiments, guiding the first beam and the second beam to the diffractive optical element may include: guiding, by a plurality of optical elements, the first beam and the second beam to the diffractive optical element. In some embodiments, the method 900 may include generating, by the detector, a signal based on the detected second interference pattern; controlling, by a controller, a reconfigurable reflector disposed in an optical path of the first beam based on the signal received from the detector; and adjusting, by the reconfigurable reflector, a wavefront of the first beam while reflecting the first beam.

Any of the steps, operations, or processes described herein may be performed or implemented with one or more hardware and/or software modules, alone or in combination with other devices. In one embodiment, a software module is implemented with a computer program product including a computer-readable medium containing computer program code, which can be executed by a computer processor for performing any or all of the steps, operations, or processes described. In some embodiments, a hardware module may include hardware components such as a device, a system, an optical element, a controller, an electrical circuit, a logic gate, etc.

Further, when an embodiment illustrated in a drawing shows a single element, it is understood that the embodiment or an embodiment not shown in the figures but within the scope of the present disclosure may include a plurality of such elements. Likewise, when an embodiment illustrated in a drawing shows a plurality of such elements, it is understood that the embodiment or an embodiment not shown in the figures but within the scope of the present disclosure may include only one such element. The number of elements illustrated in the drawing is for illustration purposes only, and should not be construed as limiting the scope of the embodiment. Moreover, unless otherwise noted, the embodiments shown in the drawings are not mutually exclusive, and they may be combined in any suitable manner. For example, elements shown in one figure/embodiment but not shown in another figure/embodiment may nevertheless be included in the other figure/embodiment. In any optical device disclosed herein including one or more optical layers, films, plates, or elements, the numbers of the layers, films, plates, or elements shown in the figures are for illustrative purposes only. In other embodiments not shown in the figures, which are still within the scope of the present disclosure, the same or different layers, films, plates, or elements shown in the same or different figures/embodiments may be combined or repeated in various manners to form a stack.

Various embodiments have been described to illustrate the exemplary implementations. Based on the disclosed embodiments, a person having ordinary skills in the art may make various other changes, modifications, rearrangements, and substitutions without departing from the scope of the present disclosure. Thus, while the present disclosure has been described in detail with reference to the above embodiments, the present disclosure is not limited to the above described embodiments. The present disclosure may be embodied in other equivalent forms without departing from the scope of the present disclosure. The scope of the present disclosure is defined in the appended claims.

What is claimed is:

1. A system, comprising:
    a diffractive optical element configured to:
        receive a first beam and a second beam at a first side of the diffractive optical element, the first beam and the second beam being configured to interfere with one another to generate a first interference pattern at the first side of the diffractive optical element; and
        forwardly diffract the first beam and the second beam to output a third beam and a fourth beam at a second side of the diffractive optical element, the third beam and the fourth beam being configured to interfere with one another to generate a second interference pattern at the second side of the diffractive optical element;
    a detector disposed at the second side of the diffractive optical element, and configured to detect the second interference pattern;
    a plurality of optical elements configured to guide the first beam and the second beam to the diffractive optical element;
    a reconfigurable reflector disposed in an optical path of the first beam and configured to control a wavefront of the first beam while reflecting the first beam; and
    a controller coupled with the detector and the reconfigurable reflector,
    wherein the detector is configured to generate a signal based on the detected second interference pattern, and
    wherein the controller is configured to control the reconfigurable reflector based on the signal received from the detector to stabilize the first interference pattern.

2. The system of claim 1, wherein the third beam and the fourth beam substantially overlap with one another.

3. The system of claim 1, wherein the diffractive optical element comprises:

a first grating and a second grating disposed in parallel with one another.

4. The system of claim 3, wherein the first grating is mounted on a first movable stage, and the second grating is mounted on a second movable stage, and each of the first movable stage and the second movable stage is independently controllable to adjust an orientation of the first grating or the second grating.

5. The system of claim 3, wherein the first grating and the second grating are polarization selective gratings.

6. The system of claim 3, wherein the first grating and the second grating include at least one of a surface relief grating, a transmissive polarization volume hologram grating, or a geometric phase polarization grating.

7. The system of claim 3, wherein the first grating and the second grating are transmissive polarization volume hologram gratings.

8. The system of claim 1, wherein the diffractive optical element comprises:
a first grating set and a second grating set arranged in parallel with one another,
wherein at least one of the first grating set or the second grating set includes two or more stacked gratings.

9. The system of claim 1, further comprising a polarizer disposed between the diffractive optical element and the detector.

10. The system of claim 9, wherein the polarizer is configured to transform the second interference pattern to a third interference pattern, and the detector is configured to detect the second interference pattern through detecting the third interference pattern.

11. The system of claim 10, wherein the second interference pattern is a polarization interference pattern, and the third interference pattern is an intensity interference pattern.

12. The system of claim 11, wherein the first interference pattern is an intensity interference pattern, and a periodicity of the third interference pattern is greater than a periodicity of the first interference pattern.

13. The system of claim 11, wherein the first interference pattern is a polarization interference pattern, and a periodicity of the second interference pattern is greater than a periodicity of the first interference pattern.

14. A method, comprising:
guiding a first beam and a second beam to a diffractive optical element from a first side of the diffractive optical element, the first beam and the second beam being configured to interfere with one another to generate a first interference pattern at the first side of the diffractive optical element;
forwardly diffracting, by the diffractive optical element, the first beam and the second beam to output a third beam and a fourth beam at a second side of the diffractive optical element, the third beam and the fourth beam being configured to interfere with one another to generate a second interference pattern at the second side of the diffractive optical element;
detecting, by a detector disposed at the second side of the diffractive optical element, the second interference pattern, and generating, by the detector, a signal relating to the detected second interference pattern; and
stabilizing the first interference pattern based on the signal relating to the detected second interference pattern received from the detector,
wherein guiding the first beam and the second beam to the diffractive optical element further comprises: guiding, by a plurality of optical elements, the first beam and the second beam to the diffractive optical element,
wherein stabilizing the first interference pattern based on the signal relating to the detected second interference pattern received from the detector further comprises:
controlling, by a controller, a reconfigurable reflector disposed in an optical path of the first beam based on the signal relating to the detected second interference pattern received from the detector; and
adjusting, by the reconfigurable reflector, a wavefront of the first beam while reflecting the first beam.

15. The method of claim 14, wherein the diffractive optical element includes a first grating and a second grating arranged in parallel with one another, and forwardly diffracting, by the diffractive optical element, the first beam and the second beam to output the third beam and the fourth beam comprises:
forwardly diffracting, by the first grating, the first beam as a fifth beam propagating toward the second grating;
forwardly diffracting, by the first grating, the second beam as a sixth beam propagating toward the second grating;
forwardly diffracting, by the second grating, the fifth beam as the third beam; and
forwardly diffracting, by the second grating, the sixth beam as the fourth beam,
wherein a first angle formed between the first beam and the second beam is greater than a second angle formed between the third beam and the fourth beam.

16. The method of claim 14, further comprising:
transforming, by a polarizer disposed between the diffractive optical element and the detector, the second interference pattern to a third interference pattern; and
detecting, by the detector, the second interference pattern through detecting the third interference pattern.

17. The method of claim 14, wherein the first interference pattern is a polarization interference pattern, the second interference pattern is a polarization interference pattern, and a periodicity of the second interference pattern is greater than a periodicity of the first interference pattern.

18. The method of claim 14, further comprising:
transforming, by a polarizer disposed between the diffractive optical element and the detector, the second interference pattern to a third interference pattern;
wherein the first interference pattern is an intensity interference pattern, the second interference pattern is a polarization interference pattern, and the third interference pattern is an intensity interference pattern, and
wherein a periodicity of the third interference pattern is greater than a periodicity of the first interference pattern.

* * * * *